United States Patent
Smith et al.

(10) Patent No.: US 12,097,973 B2
(45) Date of Patent: Sep. 24, 2024

(54) COMPOSITE WING PANELS AND FABRICATION METHOD

(71) Applicant: The Boeing Company, Chicago, IL (US)

(72) Inventors: Daniel R. Smith, Woodinville, WA (US); Darrell Darwin Jones, Mill Creek, WA (US)

(73) Assignee: The Boeing Company, Chicago, IL (US)

( * ) Notice: Subject to any disclaimer, the term of this patent is extended or adjusted under 35 U.S.C. 154(b) by 251 days.

(21) Appl. No.: 17/454,267

(22) Filed: Nov. 10, 2021

(65) Prior Publication Data

US 2022/0153435 A1    May 19, 2022

Related U.S. Application Data

(60) Provisional application No. 63/115,167, filed on Nov. 18, 2020.

(51) Int. Cl.
| | |
|---|---|
| B64F 5/10 | (2017.01) |
| B29C 70/30 | (2006.01) |
| B29L 31/30 | (2006.01) |
| B64C 3/18 | (2006.01) |
| B64C 3/26 | (2006.01) |

(52) U.S. Cl.
CPC ............... *B64F 5/10* (2017.01); *B29C 70/30* (2013.01); *B64C 3/182* (2013.01); *B64C 3/26* (2013.01); *B29L 2031/3085* (2013.01)

(58) Field of Classification Search
CPC ... B64F 5/00; B64F 5/10; B29C 70/00; B29C 70/30; B29C 70/34; B29C 70/54; B64C 3/00; B64C 3/10; B64C 3/18; B64C 3/182; B64C 3/20; B64C 3/26; B29L 2031/3085; Y02P 70/50; Y02T 50/40
See application file for complete search history.

(56) References Cited

U.S. PATENT DOCUMENTS

| | | |
|---|---|---|
| 2003/0102596 A1 | 6/2003 | Miller |
| 2017/0008197 A1* | 1/2017 | Baeurle ................. B29C 70/382 |
| 2018/0036966 A1 | 2/2018 | Boge et al. |

FOREIGN PATENT DOCUMENTS

| | | |
|---|---|---|
| EP | 3106280 A1 | 12/2016 |
| WO | 2014175799 A1 | 10/2014 |

OTHER PUBLICATIONS

Netherlands Patent Office Written Opinion and Search Report with English Translation, dated Jun. 10, 2021, regarding Application No. NL2027396, 10 pages.
"Glossary of Terms", Composites, ASM International, vol. 21, Dec. 2001, 13 pages.
European Office Action, dated May 16, 2023, regarding European Application No. 21207363.9, 4 pages.

* cited by examiner

*Primary Examiner* — Cynthia L Schaller
(74) *Attorney, Agent, or Firm* — Yee & Associates, P.C.

(57) ABSTRACT

Wing panels having composite wing skins and stringers are produced on a moving production line. The wing panels are formed on mandrels that move through workstations along the production line where laminators layup the wing skins and pick-and-place machines place stringers on the wing skins that are supplied by stringer feeder lines.

31 Claims, 39 Drawing Sheets

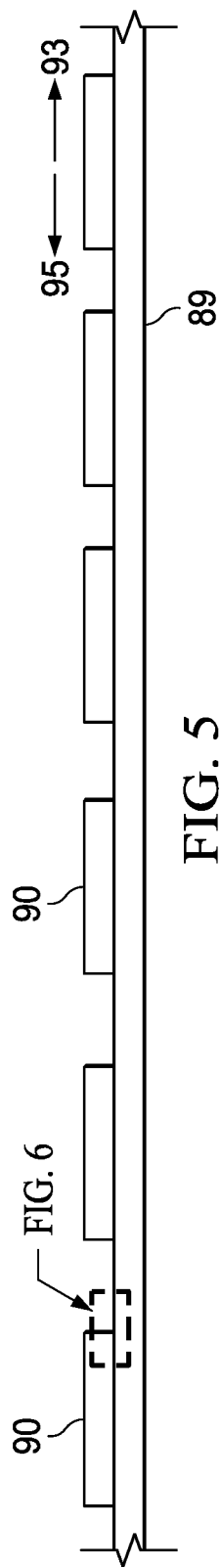
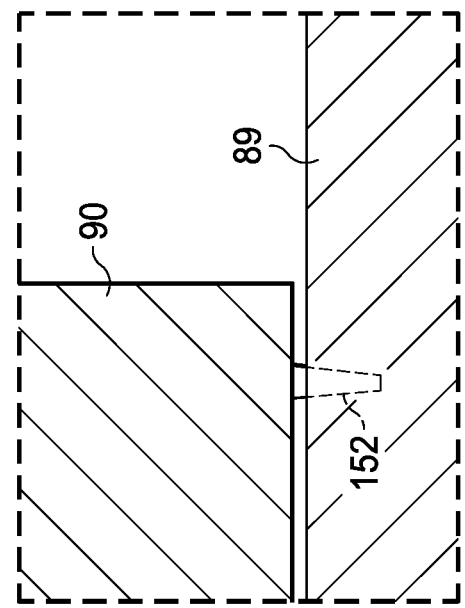

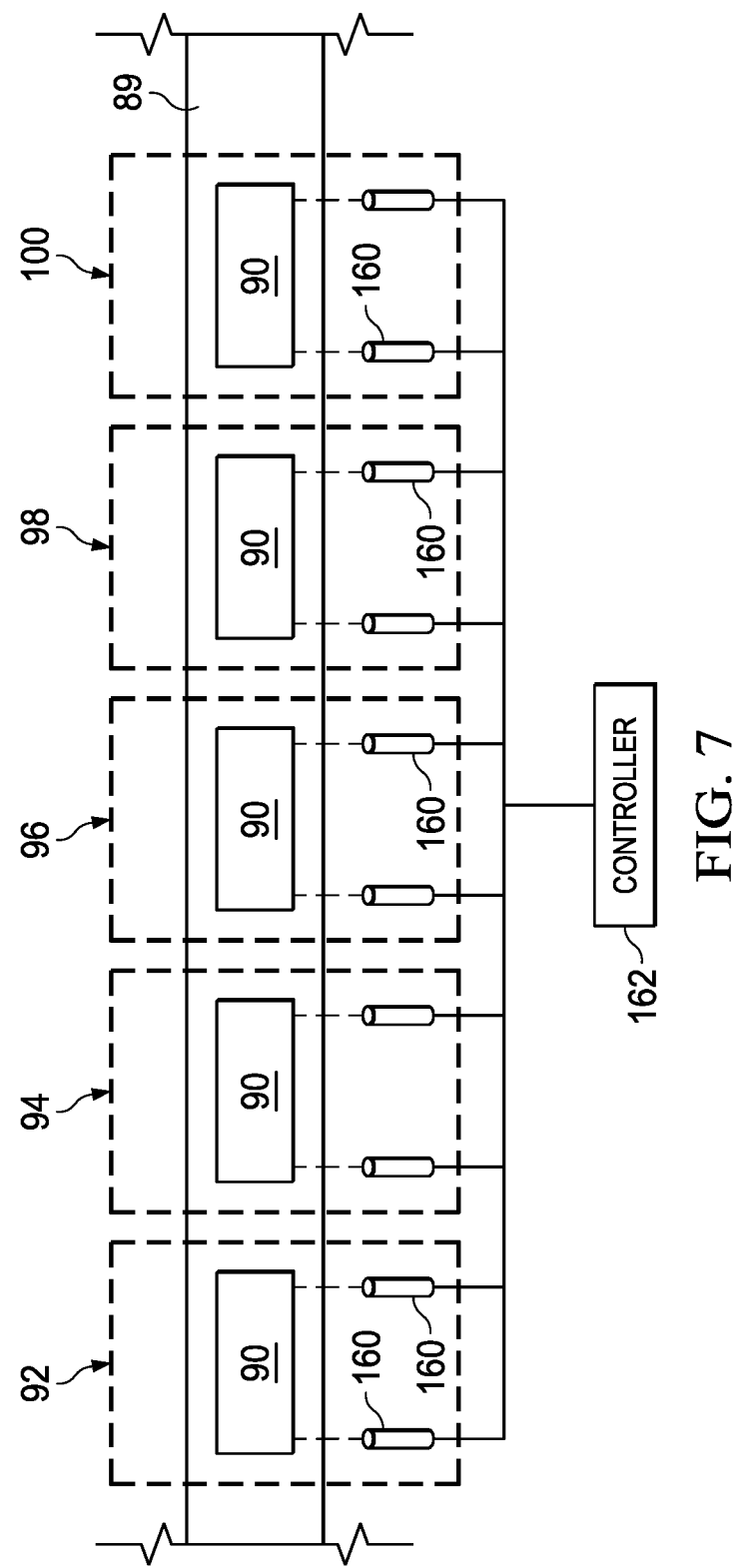

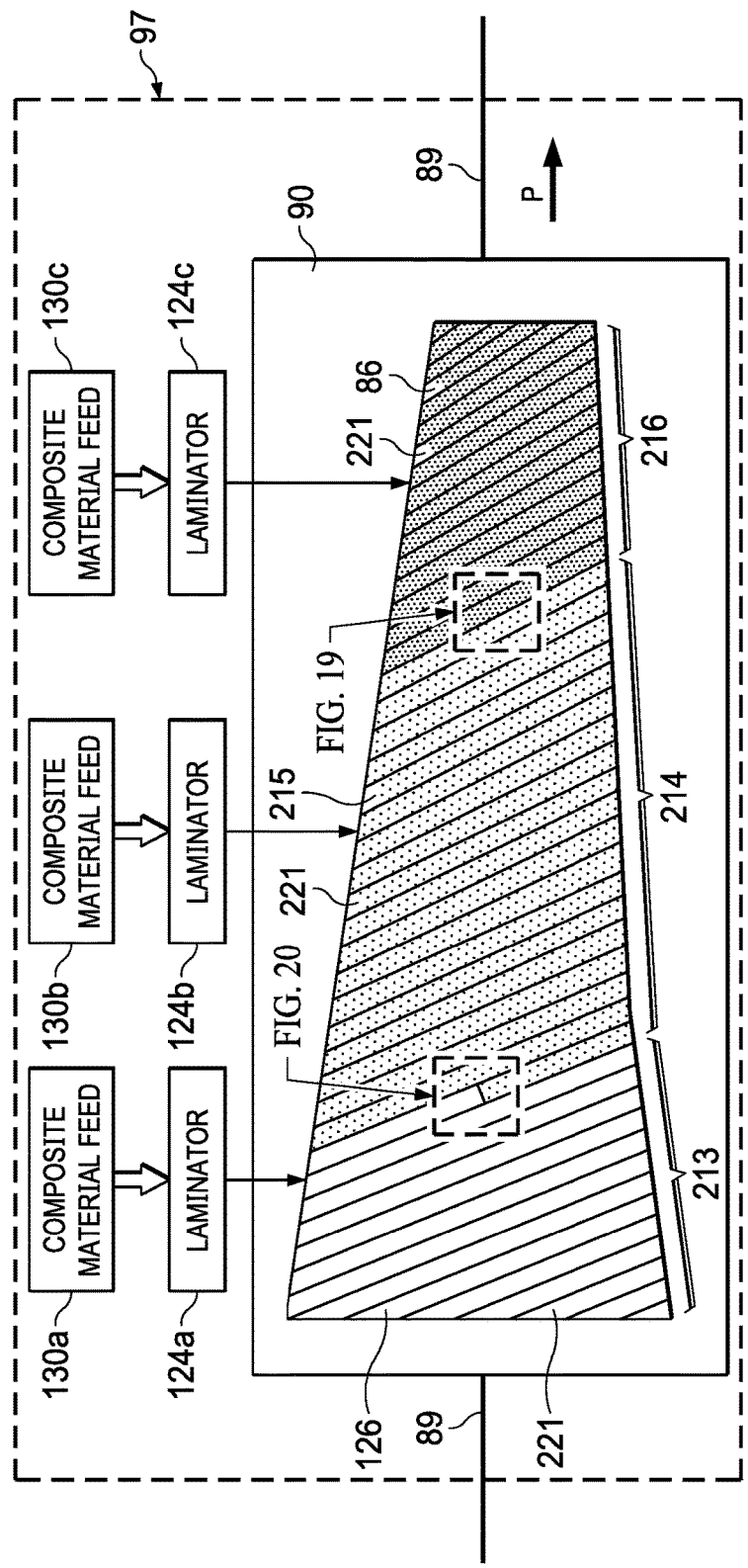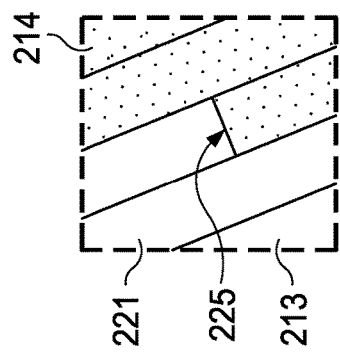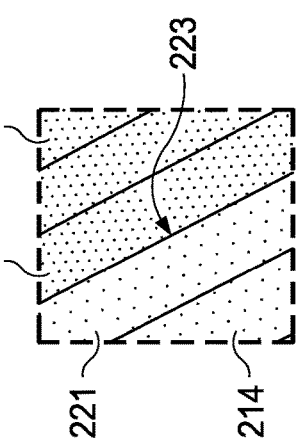
FIG. 18
FIG. 19
FIG. 20

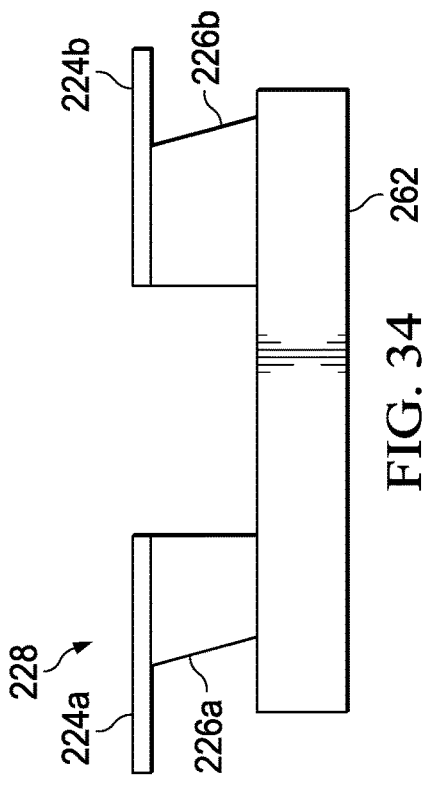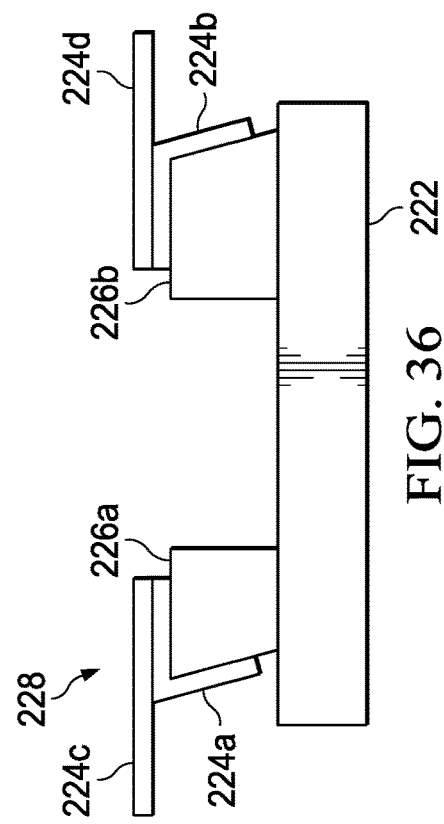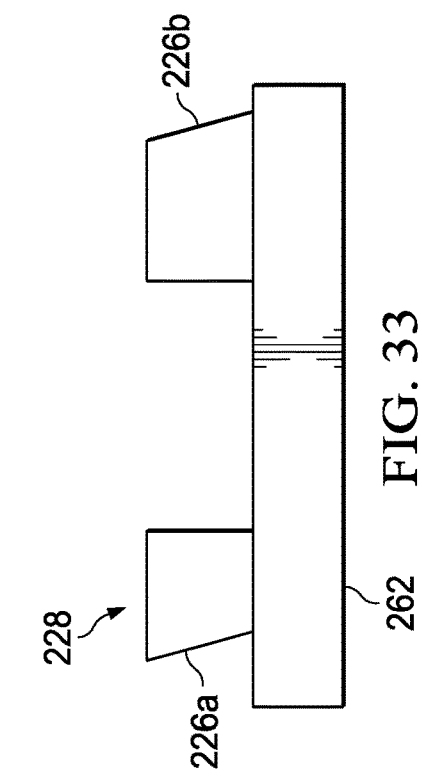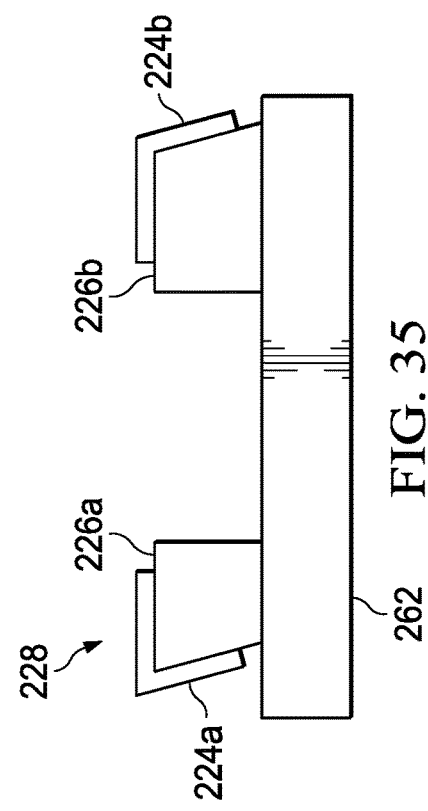

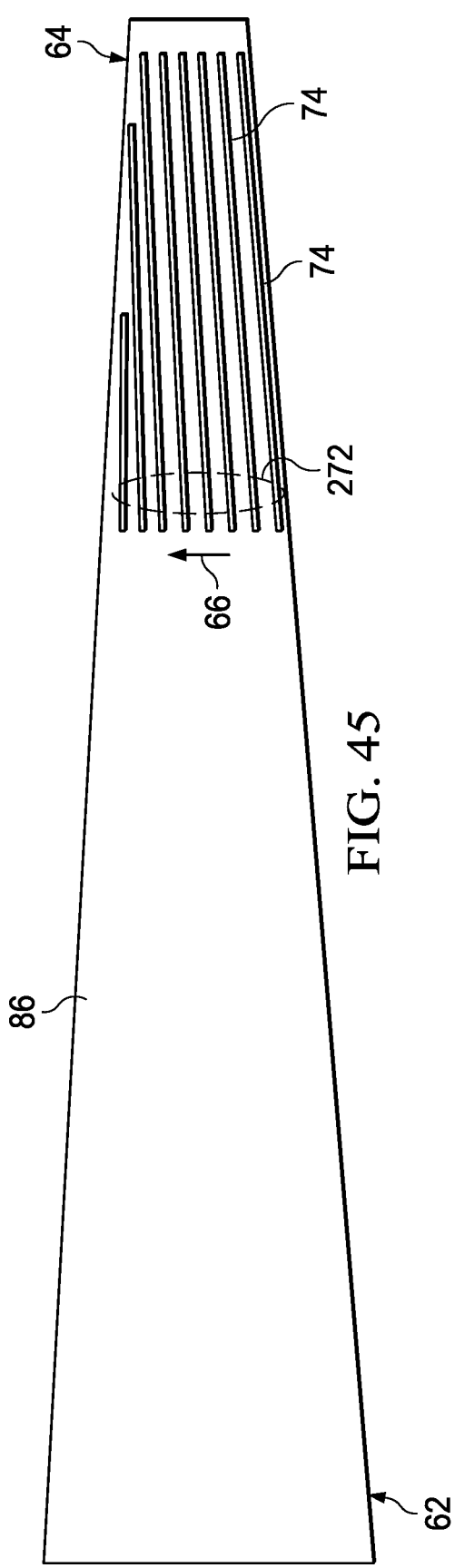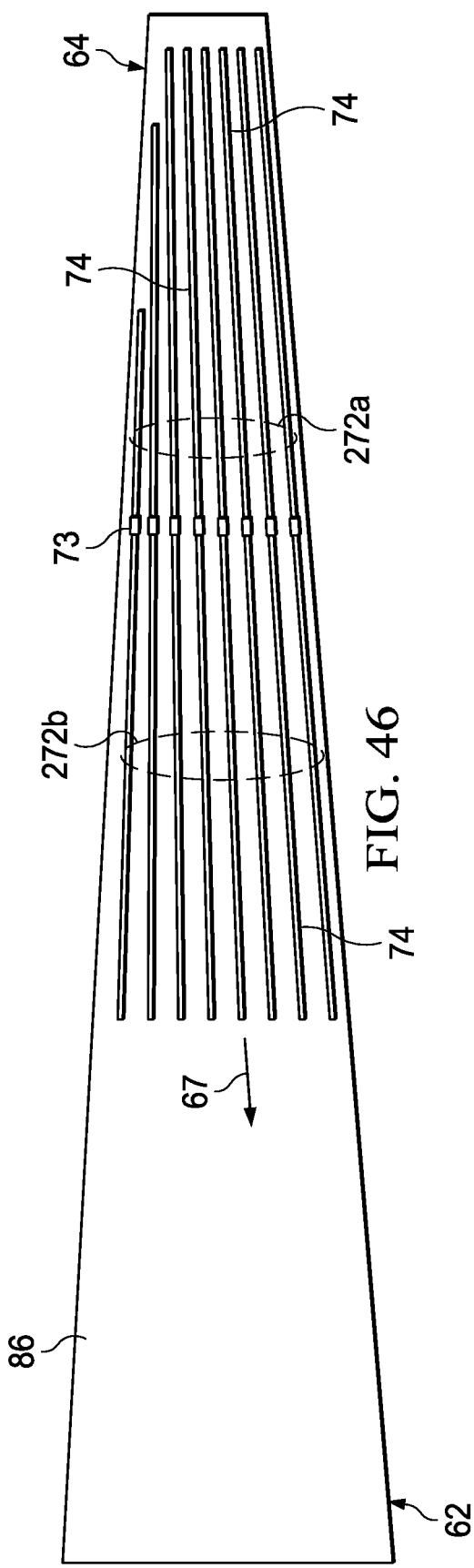

COMPOSITE WING PANELS AND FABRICATION METHOD

CROSS-REFERENCE TO RELATED APPLICATION

This application claims the benefit of U.S. Provisional Patent Application Ser. No. 63/115,167, filed Nov. 18, 2020, and entitled "Composite Wing Panels and Fabrication Method;" which is incorporated herein by reference in its entirety.

BACKGROUND INFORMATION

1. Field

The present disclosure generally relates to the fabrication of composite structures, and deals more particularly with composite wing panels for aircraft as well as a method of fabricating such panels.

2. Background

The production of large composite structures such as aircraft wings spanning up to 100 feet or more requires a substantial amount of factory floor space. In a volume production environment, such structures are often fabricated and assembled in individual work cells on a factory floor, each dedicated to a particular task or process. For example, in the case of wing panels, a layup mandrel may be cleaned and prepared for use in a work cell, and then transferred to different work cell elsewhere in the factory where a composite wing skin is laid up on the mandrel by a laminator such as an automatic fiber placement (AFP) machine. Similarly, composite stringers used to reinforce the wing skin are produced in different cells dedicated to composite material layup, forming, inspection and trimming operations. The stringers are then transported to the location of wing skins where they are individually placed on a wing skin, following which the resulting wing panel is transported to an autoclave where it is cured for a desired cure period.

Although the wing panel production method described is reliable, it is less than fully efficient. The need to move wing panel components between work cells and delays experienced in individual cells adds to flow times and reduces throughput.

Accordingly, there is a need for a more efficient production method which reduces flow times by minimizing delays and transportation times, while better utilizing factory floor space.

SUMMARY

The disclosure relates in general to composite structures, and more specifically to fabrication of composite aircraft structures such as wing panels on a production line.

According to one aspect, apparatus is provided for making composite wing panels, comprising a production line, and a plurality of mandrels coupled with the production line. The apparatus also includes a production line drive configured to move the mandrels along the production line, and a plurality of work stations along the production line. The workstations are configured to perform work on the mandrels, and include at least one wing skin lamination workstation. The apparatus also includes at least one laminator at the wing skin lamination workstation for laying up composite wing skins on the mandrels. The apparatus further includes a controller coupled with the production line drive and configured to control movement of the mandrels along the production line.

According to another aspect, a system is provided for making composite wing panels, comprising a production line that includes a plurality of workstations each configured to produce a portion of the wing panels. The system also includes a plurality of mandrels on which the wing panels are produced. The mandrels are movable along the production line. The system also includes a plurality of feeder lines respectively configured to feed materials to the workstations. The system further includes a control system for controlling movement the manuals along the production and feeding the material to the workstations.

According to still another aspect, a method is provided for making composite wing panels for aircraft. The method comprises moving a plurality of mandrels along a production line, and laying up composite wing skins on the mandrels at a lamination workstation along the production line. The method further includes placing composite stringers on the composite wing skins at a stringer placement workstation along the production line. The method also includes moving the mandrels along the production line through the lamination workstation and the stringer placement workstation according to takt times that result in a desired wing panel production rate.

According to another aspect, a method is provided of making wing panel for aircraft. The method includes moving mandrels along a production line through at least one lamination workstation and at least one stringer placement workstation. The method includes indexing into the mandrels to the lamination workstation and laying up composite wing skins respectively on the mandrel at the lamination workstation. The method further includes synchronizing moving of the mandrels through the lamination workstation with laying up the composite wing skins using the indexing of each of the mandrels to the lamination workstation. The method also includes indexing each of the mandrels to the stringer placement workstation and placing composite stringers respectively the wing skins at the stringer placement workstation. The method further includes synchronizing moving the mandrels through the stringer placement workstation with placing the composite stringers on the wing skins using indexing of each of the mandrels to the stringer placement workstation.

According to a further aspect, a method is provided of making wing panels for aircraft comprising moving each of a plurality of mandrels along a production line, and laying up composite wing skins respectively on each of the mandrels. The method includes fabricating a plurality of composite stringers on a stringer feeder line, and feeding the composite stringers from the stringer feeder line to the stringer placement workstation. The method further includes placing the composite stringers on each of the composite wing skins at the stringer placement workstation. In one example, the method includes moving the mandrels along the production line through at least two stringer placement workstations.

According to another aspect, a method is provided of making wing skins for aircraft comprising moving layup mandrels along a production line, and laying up different sections of a wing skin on each of the layup mandrels respectively using different laminators as the layup mandrels move along the production line.

According to still another aspect, a method is provided of making wing panels for aircraft comprising moving composite wing skins along the production line, and placing composite stringer preforms on each of the wing skins at a stringer placement workstation along the production line as the wing skins move along the production line.

According to still another aspect, a method is provided of making different wing panels for aircraft, comprising moving differently configured composite wing skins along a production line, and producing different sets of stringer preforms on a stringer feeder line, wherein each of the sets of the stringer preforms is associated with one of the differently configured wing skins. The method also includes feeding the sets of stringer preforms to a stringer placement workstation along the production line such that each of the sets of stringer preforms arrives just-in-time at the stringer placement station to be placed on an associated wing skin, and placing the each of the sets of stringer preforms on the respectively associated wing skins at the stringer placement station.

According to still another aspect, a method is provided of making different wing panels for aircraft, comprising moving different composite wing skins along a production line and producing stringer preforms on a stringer feeder line. The method also includes feeding the stringer preforms individually to a stringer placement workstation along the production line such that individual stringer preforms arrive just-in-time at the stringer placement workstation to be placed on a composite wing skin. The method also includes placing the stringer preforms on the composite wing skins at the stringer placement workstation.

According to another aspect, a method of making wing panels is provided comprising moving composite wing skins along a production line, and placing at least a first group of composite stringer preforms on each of the composite wing skins, wherein all of the composite stringer preforms in the first group are placed on the composite skin simultaneously.

According to a further aspect, a method is provided of making composite wing panels for aircraft. The method includes moving a plurality of mandrels through a plurality of workstations along a production line that includes a lamination station. The method also includes laying up composite wing skins on the mandrels at the lamination station, and placing indexing features on each of the mandrels that index the mandrels to the lamination workstation.

According to still another aspect, a method is provided of making a plurality of differently configured composite wing panels. The method includes moving layup mandrels along the production line through a plurality of workstations, and selecting configurations of composite wing panels to be made. The method further includes making wing skin preform by laying up composite material on each of the mandrels based on the selected configurations, and placing composite stringer preforms on the wing skin preform s based on the selected configurations.

According to another aspect, a wing panel is provided for aircraft comprising a pair of composite wing skins and a plurality of composite stringers located between and attached to the composite wing skins. The composite stringers include stringer blade extending substantially parallel to each other.

One of the advantages of the disclosed fabrication methods is that composite aircraft structures such as composite wing panels can be made more efficiently. Another advantage is that the amount of time required to fabricate composite wing panels can be reduced. A further advantage is that composite wing panels can be fabricated with improved consistency and quality. Still another advantage is that the labor content of composite wing panels can be reduced. Another advantage is that available factory floor space can be utilized more efficiently. A further advantage of the disclosed fabrication methods is the composite aircraft structures such as wing panels can be fabricated at higher rates of production and with greater consistency.

The features, functions, and advantages can be achieved independently in various examples of the present disclosure or may be combined in yet other examples in which further details can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and advantages thereof, will best be understood by reference to the following detailed description of an illustrative examples of the present disclosure when read in conjunction with the accompanying drawings, wherein:

FIG. 5 illustration of a side of a portion of the production line of FIG. 4, showing mandrels on a moving track.

FIG. 6 is an illustration of the area designated as "FIG. 6" in FIG. 5.

FIG. 7 is an illustration of a combined block and diagrammatic view of a system for monitoring the movement of mandrels along the production line.

FIG. 18 is an illustration of a plan view of a workstation showing how multiple laminators at the workstation may layup different sections of a wing skin preform.

FIG. 19 is an illustration of the area designated as "FIG. 19" in FIG. 18.

FIG. 20 is an illustration of the area designated as "FIG. 20" in FIG. 18.

FIGS. 33-40 are illustrations showing how the stringer preform is fabricated on the stringer feeder line.

FIG. 45 is an illustration of a combined block and diagrammatic view showing how groups of stringer sections can be placed on a wing skin in a chord-wise order.

FIG. 46 is an illustration of a combined block and diagrammatic view showing how groups of the stringer sections can be placed on a wing skin in a span-wise order.

DETAILED DESCRIPTION

The figures and the following description provide specific illustrative examples of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific example or examples described below, but by the claims and their equivalents.

The wing panels described herein comprise one or more composite parts. Composite parts, such as Carbon Fiber Reinforced Polymer (CFRP) parts, are initially laid-up in multiple layers that together are referred to as a preform. Individual fibers within each layer of the preform are aligned parallel with each other, but different layers exhibit different fiber orientations in order to increase the strength of the resulting composite part along different dimensions. The parts are produced from thermoset resins, or thermoplastic resins or a combination of thermoset and thermoplastic resins, sometimes referred to as hybrid material systems. In the case of parts made from a thermoset, the preform includes a viscous thermosetting resin that solidifies in order to irreversibly harden the preform into a composite part (e.g., for use in an aircraft wing). Carbon fiber that has been impregnated with an uncured thermoset resin or a thermoplastic resin is referred to as "prepreg." Other types of carbon fiber include "dry fiber" which has not been impregnated with thermoset resin but may include a tackifier or binder. Dry fiber is infused with resin prior to hardening. For thermoset resins, the hardening is a one-way process referred to as curing, while for thermoplastic resins, the resin reaches a viscous form if it is re-heated, after which it can be consolidated to a desired shape and solidified. As used herein, the umbrella term for the process of transitioning a preform to a final hardened shape (i.e., transitioning a preform into a composite part) is referred to as "hardening," and this term encompasses both the curing of thermoset preforms and the forming/solidifying of thermoplastic preforms into a final desired shape.

Figure 1:
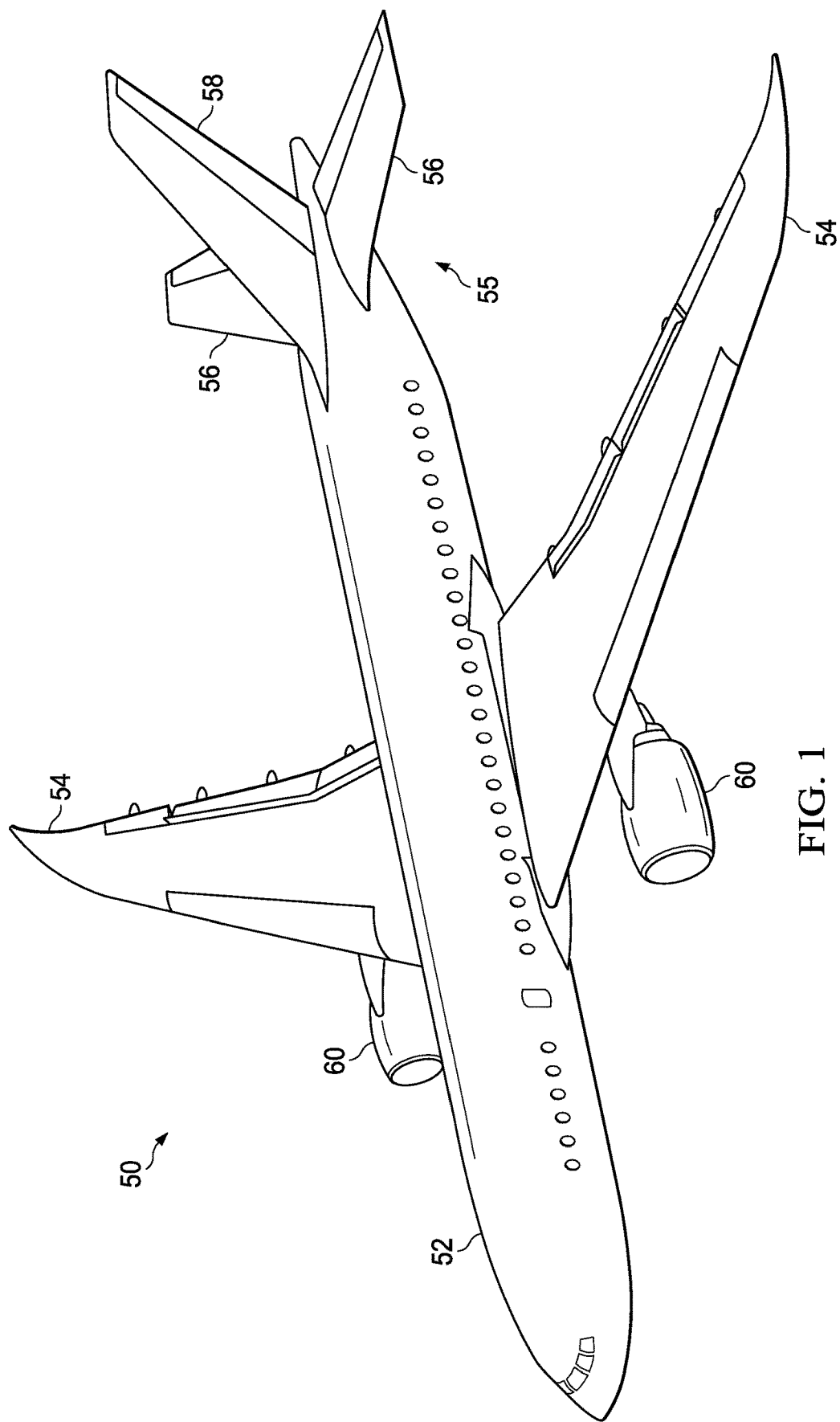
FIG. 1 is a perspective view of an airplane.
Figure 2:
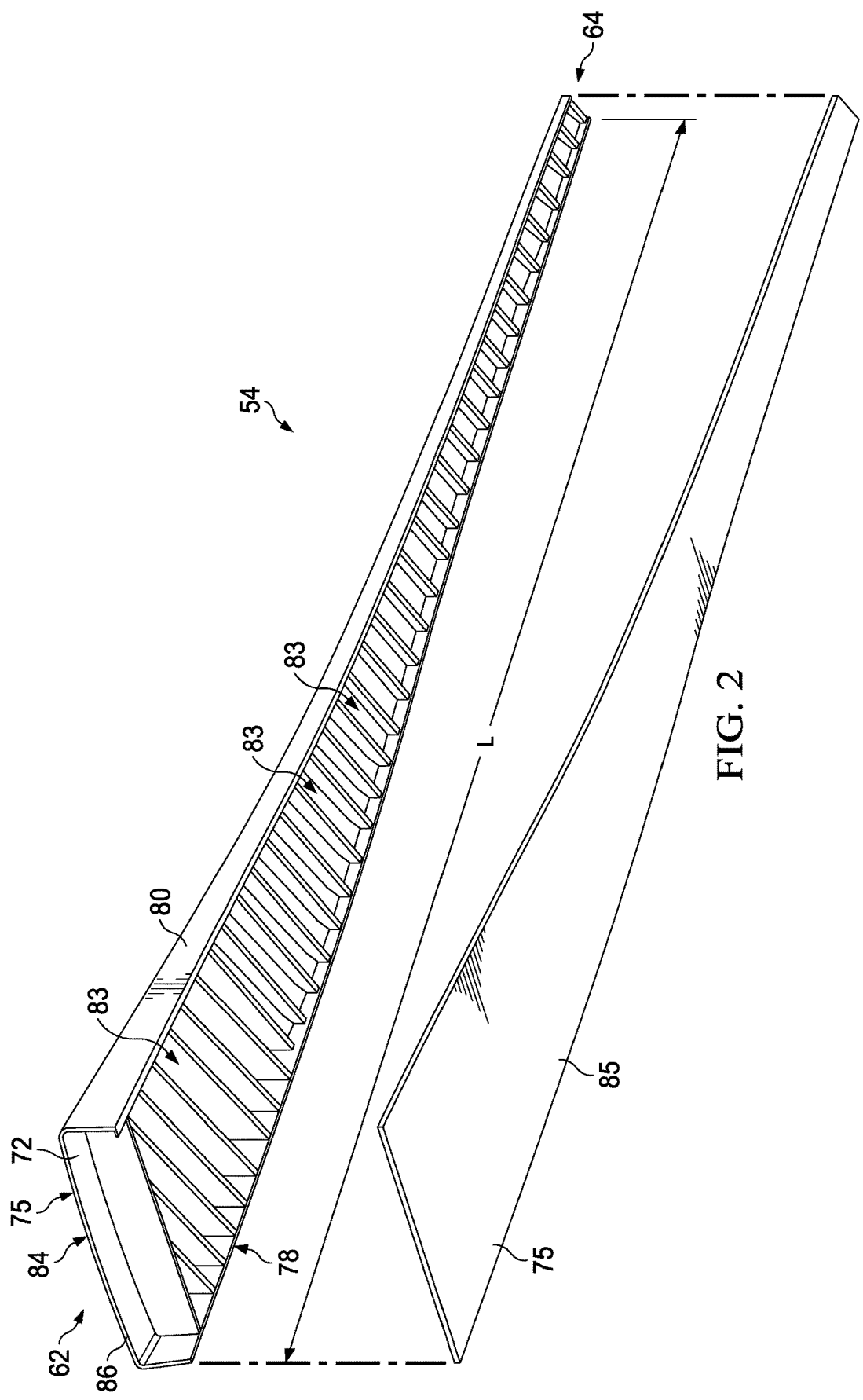
FIG. 2 is an illustration of a perspective view of the starboard wing of the aircraft shown in FIG. 1, partially exploded to reveal inner components of the wing.
Figure 3:
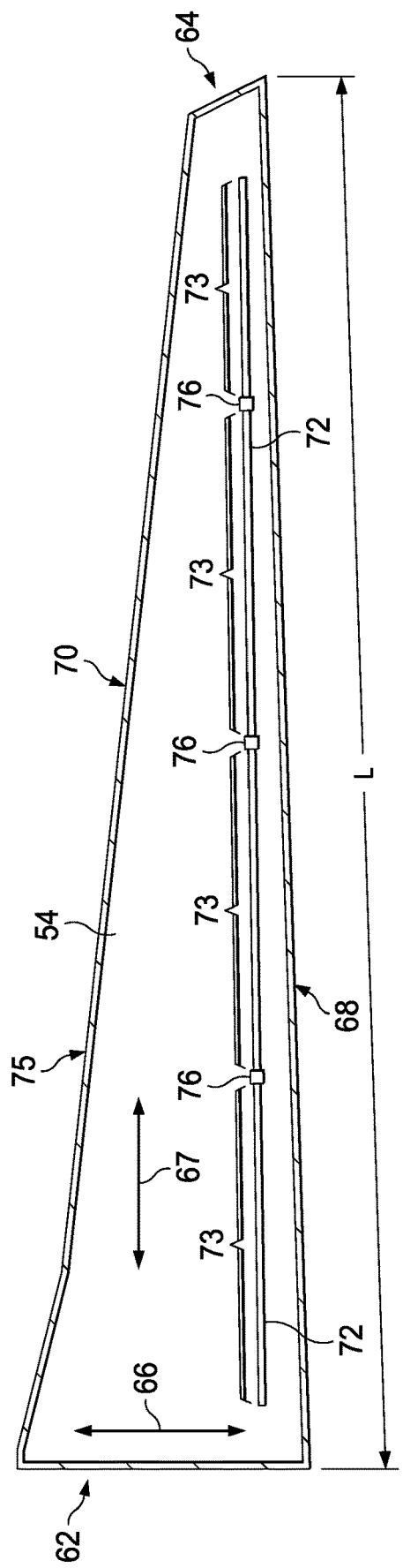
FIG. 3 is an illustration of a diagrammatic plan view of a wing panel, showing the placement of typical stringer sections.

Referring first to FIG. 1, an aircraft 50 comprises a fuselage 52, a pair of wings 54 and an empennage 55. The empennage 55 includes a pair of horizontal stabilizers 56, and a vertical stabilizer 58. Jet or other types of engines 60 are mounted on the wings 54. Referring now also to FIGS. 2 and 3, each of the wings 54 comprises a forward spar 78 and a rear spar 80 that extend from an inboard end 62 to an outboard end 64 of the wing 54. The spars 78, 80 are connected together by ribs 82 that extend in a chord-wise direction 66 and are spaced apart from each other in a span-wise direction 67. The spars 78, 80 and ribs 82 are sandwiched between and attached to top and bottom wing panels 75 that form the outer surfaces of the wing 54.

Each of the wing panels 75 comprises upper and lower wing panels 84, 85 respectively, which are attached to the spars 78, 80 and to the ribs 82. Each of the upper and lower wing panels 84, 85 comprises a wing skin 86 attached to a series of composite stringers 72. For convenience of description, each of the upper and lower wing panels 84, 85 (both port and starboard sides) may sometimes hereinafter be referred to as a wing panel 75. A series of bays 83 are formed by the space bounded by the ribs 82 on the sides, spars 78, 80 lengthwise, and the wing panels 75. The composite stringers 72 are spaced apart in the chord-wise direction 66 from the leading edge 68 of the wing 54 to the trailing edge 70, and function to transfer loads on the wing skins 86 to the structure formed by the spars 78, 80 and ribs 82.

As will be discussed below, the wing skins 86 are formed of a composite material, such as CFRP laid up in bandwidths of strips having various fiber orientations to provide the desired strength and flexibility. The composite stringers 72 are attached to the wing skins 86 typically by co-curing. As best seen in FIG. 3, each of the composite stringers 72 may comprise a series of stringer sections 73 extending in the span-wise direction 67 that are connected together by splices 76. Although only 3 spices 76 are shown in FIG. 3, less than three or more than 3 spices 76 may be necessary or desirable, depending on the number of stringer sections 73 and/or length L of the wing 54 or other factors.

Figure 4:
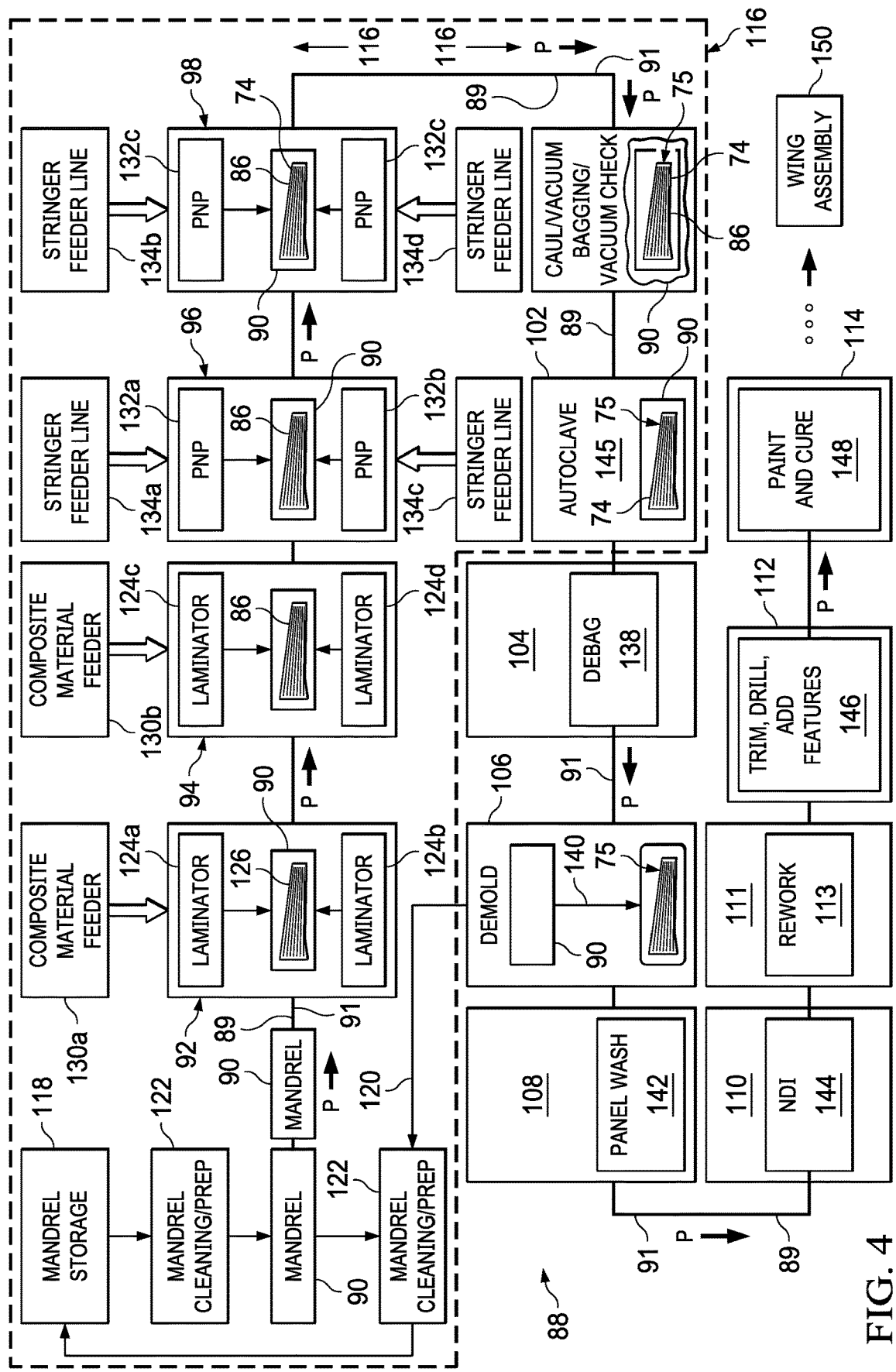
FIG. 4 is an illustration of a combined block and diagrammatic view of a production line for producing composite wings.

Attention is now directed to FIG. 4 which broadly illustrates an automated, moving production line 88 for producing wing panels 75 of the type described above, as well as other types of airfoils such as horizontal and vertical stabilizers 56, 58 comprising stiffener reinforced composite wing skins. The wing panels 75 are respectively laid up and assembled on a plurality of mandrels 90 (FIG. 5) which move in a process direction P along a predetermined path 91 through a series of workstations 92-114 where value added production work is performed. Any number of the mandrels 90 may be used, depending upon the desired wing panel production rate. The mandrels 90 may be supplied from a mandrel storage location 118 or may be returned 120 and recycled after the wing panel 75 is demolded 140 at workstation 106. In either case, the mandrels 90 are cleaned and prepared at 122 before being placed on the production line 88.

Figure 17:
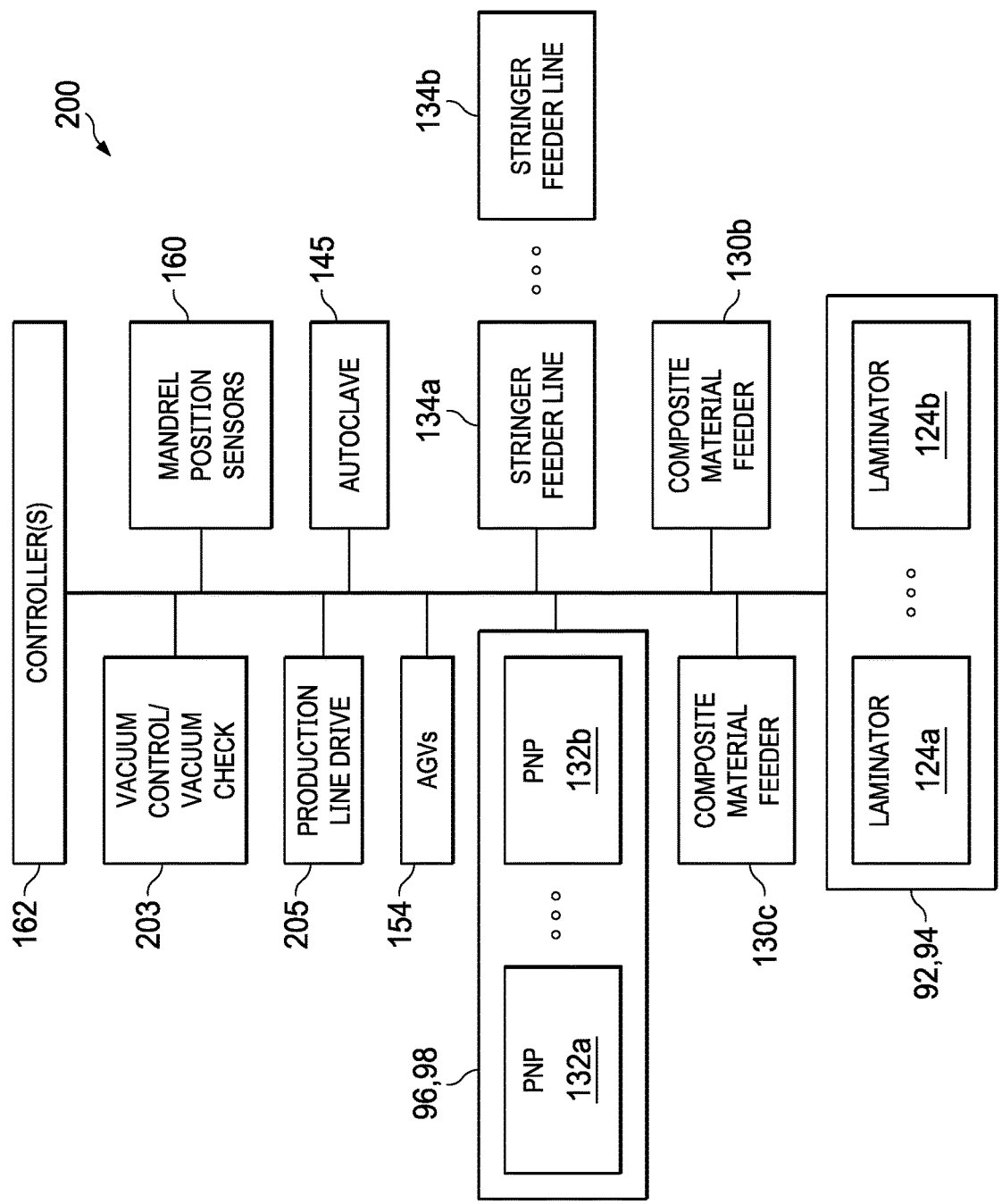
FIG. 17 is an illustration of a block diagram of control and operating components of workstations along the production line performing operations prior to hardening of the wing panels.

Any of various techniques may be used to move the mandrels 90 in the process direction P along the predetermined path 91 through the workstations body 92-114. For example, referring to FIGS. 5 and 6, the mandrels 90 may be placed on a moving track 89 that moves along the predetermined path 91 at a rate determined by a later discussed controller 162 (FIG. 17). As used herein, the terms "move" and "moving" the mandrels 90 mean moving the mandrels 90 along the production line 88 either continuously, or incrementally in pulses, or in micro-pulses, or in any combination thereof. As will be discussed below in more detail, a "pulse" represents the incremental or pulsed movement of a part such as the wing panel 75 a distance substantially equal to its length. A micro-pulse may be a rib pitch-distance between ribs or a multiple or fraction thereof. Work can be completed during a pause during a pulse and/or micro-pulses and/or during the pulse/micro-pulses, or in any combination thereof. In some examples, the mandrels 90 move only forwardly 93 along the production line 88, however in other examples the mandrels 90 may pause and move rearwardly 95 for a period of time before resuming their forward movement in order to allow certain types of work to be performed at the workstation. In the preceding example, work such as lamination is performed as the mandrels 90 are moving while the laminators 124a-124d remain stationary. However, in other examples, the laminators 124a-124d may be moving along with the mandrels 90. It may be also possible to manually move the mandrels 90 incrementally by a pulse or by micro-pulses through any of the workstations 96-114.

The mandrels 90 are indexed to the separate lamination workstations 92-94 in order to inform the workstation 96-114 of the loft of the mandrel 90 within the purview of the lamination workstation 92-94 and the type of lamination (ply orientation) needed at the particular lamination workstation 92-94. This information is conveyed by at least one indexing feature such as a slot, hole, pin or some other device such as an RFID tag added to the mandrel 90. In one example, the mandrels 90 may be removably mounted at predetermined locations on the moving track 89 by indexing pins 152. In other examples, the moving track 89 may comprise a conveyor belt (not shown), a self-propelled AGV (automated guided vehicle) or a similar conveyance. In some examples, the mandrel 90 is indexed to the workstation 96-114 and moved in pulses, micro-pulses or continuously. In other examples, multiple workstations 96-114 are indexed to the mandrel 90 at the same time, and work is performed on the mandrel 90 at the same time.

Figure 8:
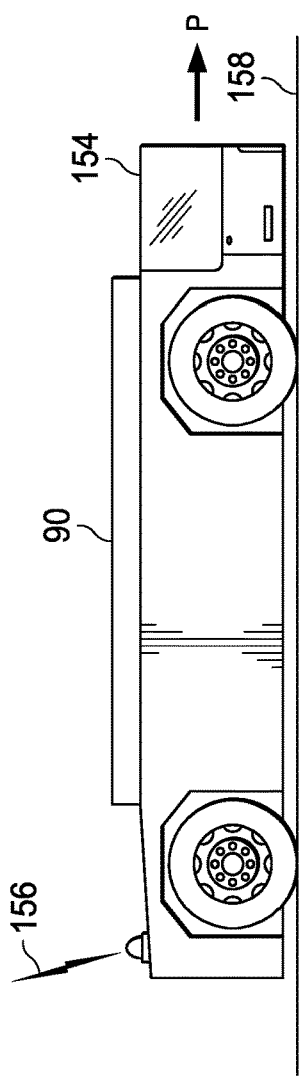
FIG. 8 is an illustration of a diagrammatic side view of an AGV having a mandrel carried thereon.

Referring to FIG. 7, in some examples, it may be possible to avoid the need for physical indexing of the mandrels 90 by using at least one position sensor 160 along the moving track 89 which continuously monitor the locations of the mandrels 90. The sensor 160, which may be of the non-contact type, sends signals to the controller 162 representing the identity and location of the mandrels 90. Referring to FIG. 8, in still other examples, in lieu of a moving track 89, the mandrels 90 may be conveyed along the predetermined path 91 by AGVs (automated guided vehicles) 154 that are operated by the controller 162 via radio frequency communication 156.

Figure 9:
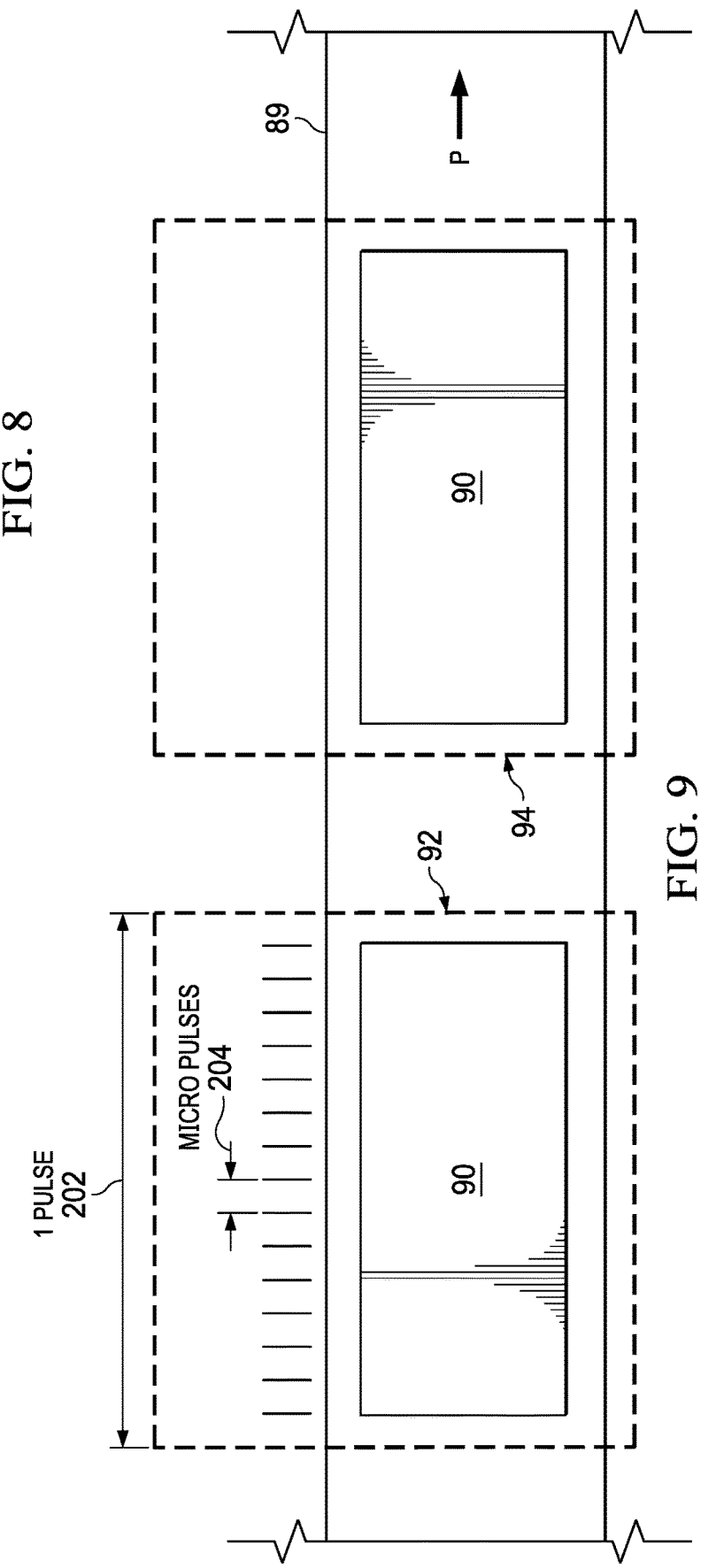
FIG. 9 is an illustration of a diagrammatic plan view of a portion of the production line, useful in explaining pulsing of the mandrels along the production line.

In one example, the mandrels 90 are moved continuously in the process direction P, while in other examples, the mandrels 90 are pulsed or moved in micro-pulses in the process direction P. Referring to FIG. 9, incremental movement of the mandrels 90 by less than their length is referred to as a "micro-pulse" 204, while movement of the mandrels 90 by equal to or greater than their length is referred to as a "full pulse" 202. In pulsed examples (FIG. 3), the workstations 92-114 are capable of performing work on the mandrels 90 during pauses between micro-pulses 204, and multiple workstations 92-114 may perform work on the same mandrel 90 during the same pause between micro-pulses 202. It is also possible to perform work on a mandrel 90 during pulses or micro-pulses as well as while pausing between pulse/micro pulses, or during pauses between pulse/micro pulses and during pulse/micro pulses. In examples where the mandrels 90 move continuously, the workstations 92-114 can perform operations as the mandrels 90 are moving. In still other examples, the mandrels 90 may move through some of the workstations 92-114 in pulses, but may move through other of the workstations 92-114 continuously.

Figure 10:
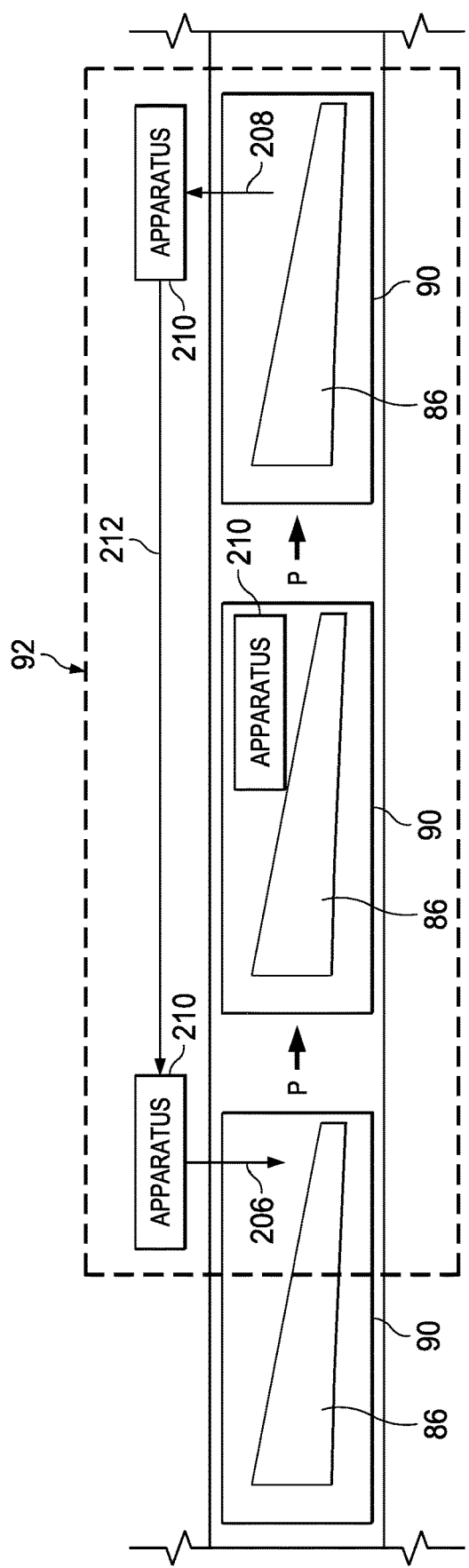
FIG. 10 is an illustration of a plan view of workstations on the production line, useful in explaining a technique of piggybacking apparatus on the mandrels.
Figure 11:
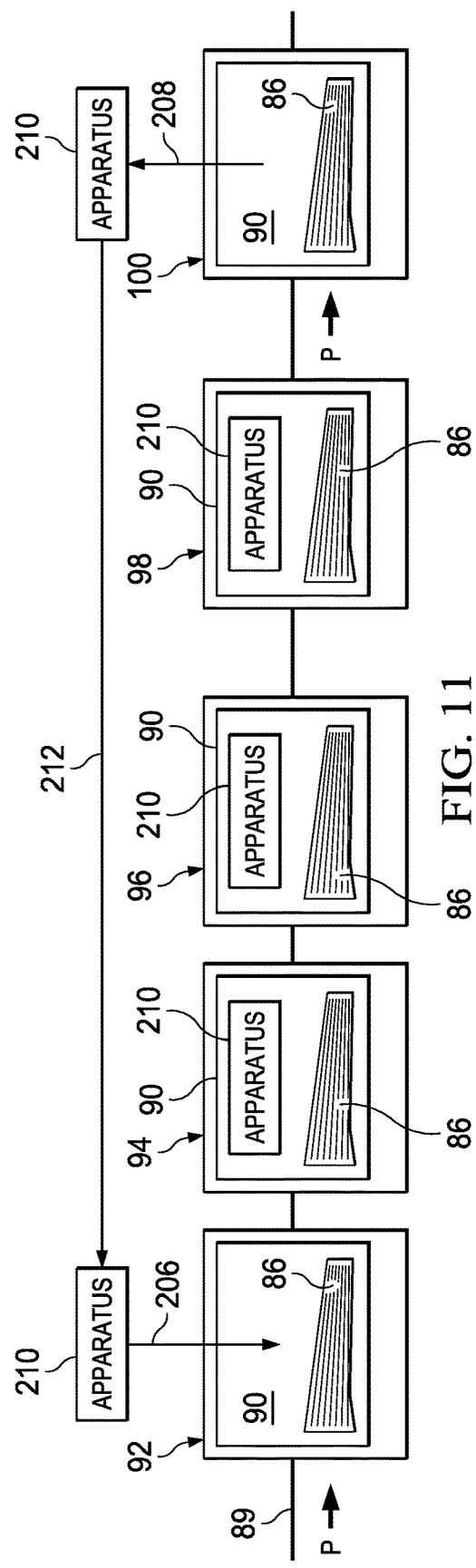
FIG. 11 is an illustration of a plan view showing use of the piggybacking technique across multiple workstations.

In further examples, two separate versions can be implemented. A first version is a "drive by" version wherein where the machines or apparatus performing the work is fixed at the workstation 92-114 and performs work on a mandrel 90 while the mandrel 90 moves through or past the workstation 92-114. Referring to FIG. 10, in a second "hitch hiker" version, the apparatus 210 performing the work is physically coupled 206 with the mandrel 90 and performs the work while both the apparatus 210 and the mandrel 90 are moving together, until a point is reached where the apparatus 210 is uncoupled 208 from the mandrel 90 returns 212 to the beginning of the workstation 92-114. As shown in FIG. 11, in some examples, the apparatus 210 may travel along with the mandrel 90 as the mandrel 90 moves through multiple workstations 92-100 before uncoupling from the mandrel 90 at a downstream workstation 100 and returning to an earlier workstation 92. Both versions referred to above can be implemented to perform work on the same mandrel at the same time, depending on the type of production process and work being performed. Multiple ones of the workstations 92-114 operating in either the "drive by" or "hitch hiker" modes are capable of performing work on the mandrel 90 at the same time. Typically, this work would be carried out on different portions of the mandrel 90 at the same time.

Referring again to FIG. 4, the wing skins 86, also sometimes referred to below before hardening as a wing skin preform 86, are laid up on the mandrels 90 at one or more lamination workstations 92, 94, sometimes hereinafter referred to as lamination workstations. One or more laminators 124a-124d at each of the separate lamination workstations 92, 94 lay down composite material on the mandrels 90 according to a ply schedule defining the number and fiber orientations of the plies. Each of the laminators 124a-124d may a comprise, for example, an AFP (automatic fiber placement) machine that lays down parallel bandwidths of fiber reinforced plastic in the form of tape or slit tape referred to as "tows". The laminators 124a-124d at each of the lamination workstations 92, 94 are supplied with composite material by composite material supply feeds 130a-130b respectively located at the lamination workstations 92, 94. Composite material is supplied to the laminators 124a-124d and composite material is laid down on the mandrels 90 at rates that achieve desired takt times at each of the lamination workstations 92, 94. Indexing features mentioned above may be placed on or formed into the laminate before it is cured.

As previously indicated, in some examples, a wing skin preform 86 may be entirely laid up at a single lamination workstation 92, 94 using one or more laminators 124a-124d, while in other examples the wing skin preform 86 may be laid up using the laminators 124a-124d at multiple lamination workstations 92, 94, each of which lays up a section 213, 214, 216 (FIG. 21) of the wing skin preform 86. In still other examples, one or more laminators 124a-124b at one lamination workstation 92 may lay up a ply of the wing skin preform 86 having one fiber orientation, while one or more laminators 124c-124d at the next-in-line lamination workstation 94 lays up a ply of the wing skin preform 86 having a different fiber orientation. In those examples where sections 213, 214, 216 of a wing skin preform 86 are laid up, the sections are spliced together with a lap, scarf or other type of splice formed during the material layup. Each section 213, 214, 216 of the wing skin perform 86 that is laid up at a lamination workstation 92, 94 is indexed to that workstation The laminators 124a-124d lay down composite material on the mandrels 90 as the mandrels 90 move through the corresponding lamination workstation 92, 94. In some examples, as will be discussed below in more detail, the mandrels 90 may move through the lamination workstations 92, 94 incrementally in micro-pulses 204 (FIG. 9), and material lay down on the mandrels 90s is performed between the micro-pulses while the mandrel 90 is briefly stationary. In other examples, however, where the mandrels 90 are moving continuously through the lamination workstations 92, 94, the continuous movement of the mandrels 90 is synchronized with the movement of the laminators 124a-124d, allowing the laminators 124a-124d to lay down material continuously without interruption as the mandrels 90 are moving.

Figure 12:
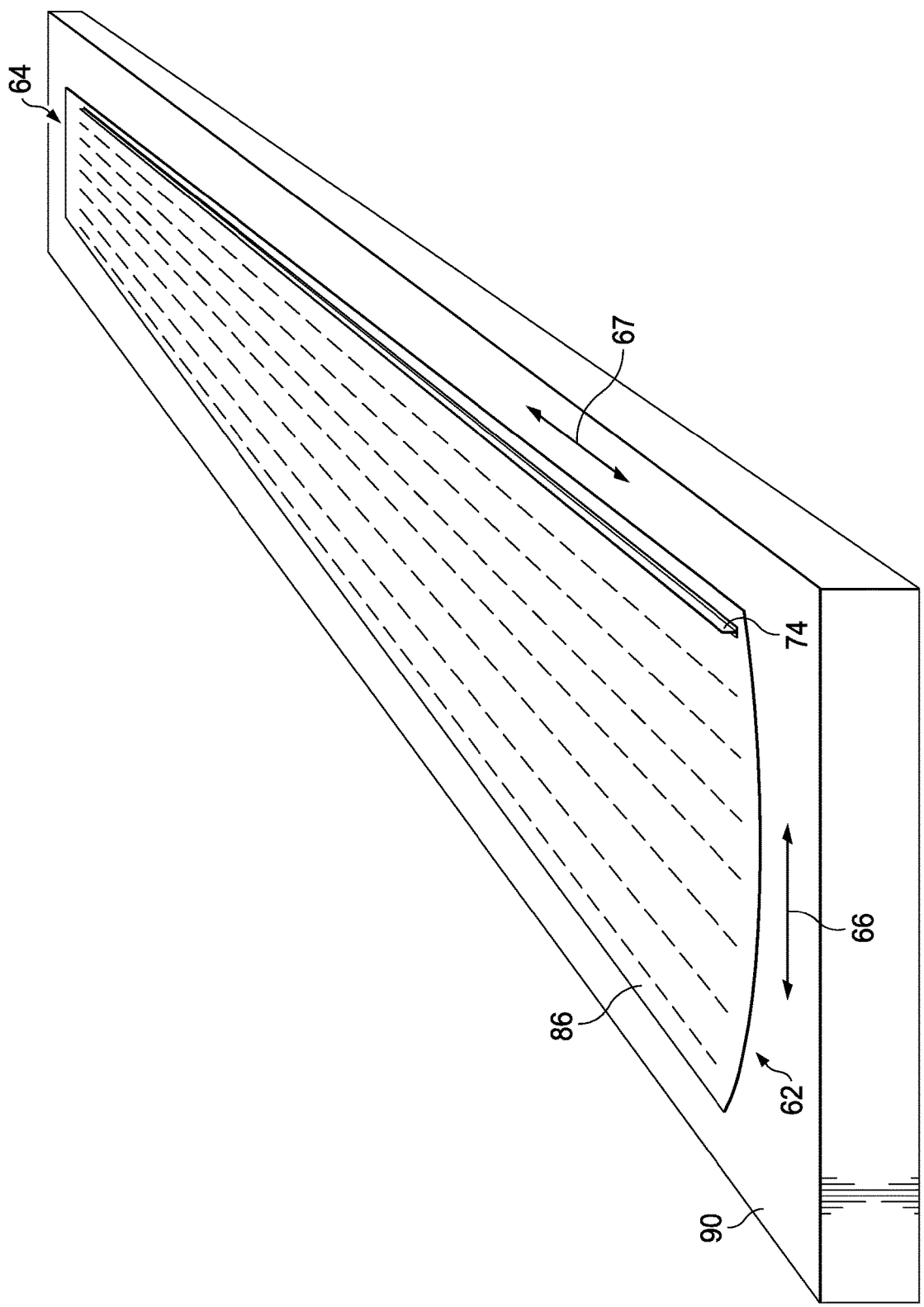
FIG. 12 illustrates a perspective view of a mandrel having a wing skin laid up thereon, showing the orientation of a stringer preforms, the location of other stringer preforms to be placed being indicated in broken lines.

After a wing skin preform 86 has been laid up by the laminators 124a-124d at lamination workstations 92, 94, the mandrels 90 move through one or more workstations 96, 98, where composite stringer preforms 72 are placed on the wing skin preforms 86. Workstations 96, 98 may sometimes hereinafter be referred to stringer placement workstations. FIG. 12 illustrates one of the stringer preforms 74 having been placed on a wing skin preform laid up on a mandrel 90. Any number of the stringer preforms 74 may be placed either together or sequentially in any order on the wing skins preforms 86, as will be discussed below in more detail. Each of the two separate stringer placement workstations 96, 98 includes one or more robotically operated pick-and-place machines (PNP) 132a-132d, which place composite stringers 72, or sections thereof at predetermined locations on the wing skin preform 86 as the mandrels 90 move through the workstations 96, 98. In some examples, one or more of the stringer preforms 72 may also be manually placed.

As previously indicated, the mandrels 90 may move through the workstations 96, 98 either in micro-pulses or continuously where operation and movement of the PNPs 132a-132d is coordinated with the movement or pauses in movement (between micro-pulses) of the mandrels 90 along the production line 88. Composite stringers 74 or sections 73 thereof are delivered to each of the workstations 96, 98 by respectively associated stringer feeder lines 134a, 134b, the details of which will be discussed below. In some examples, it is possible to place sections 73 of composite stringers 72 4 foot or longer, with additional sections 73 spliced on, as may be required. It is also possible to place multiple sections 73 of the composite stringer 72 in one batch. In some examples, all of the sections in the chord-wise direction 66 may be placed at the same time, following which a next batch of sections 73 in the spanwise direction 67 is placed and then spliced with those that have been previously placed. In still other examples, all of the composite stringers 72 along the full length of a wing 54 can be placed at a workstation 96, 98 or can be placed at the same workstation 96, 98 in batches. Batches of the composite stringers 72 can be placed at each of the workstations 96, 98 in order to achieve a desired takt per workstation.

After the composite stringers 74, which are uncured at this point, have been placed on the wing skin preforms 86, the mandrels 90 pass through a workstation 100 where vacuum bagging operations and a vacuum bag check are performed. The bagging operations include applying peel plies, bleeders, breathers, and cauls as well as sealing a vacuum bag on a mandrel body covering the green wing panel 75. In some examples, the vacuum bagging operations described above may be carried out in more than one workstation 100 in order to achieve a desired takt per workstation. In one example, the vacuum bagging operation employs a combined caul/vacuum bag that is reusable and travels along with the mandrel 90 through an autoclave 145 to a demold workstation 140 where it is removed and cycled back to workstation 100 after being cleaned/reconditioned.

Figure 13:
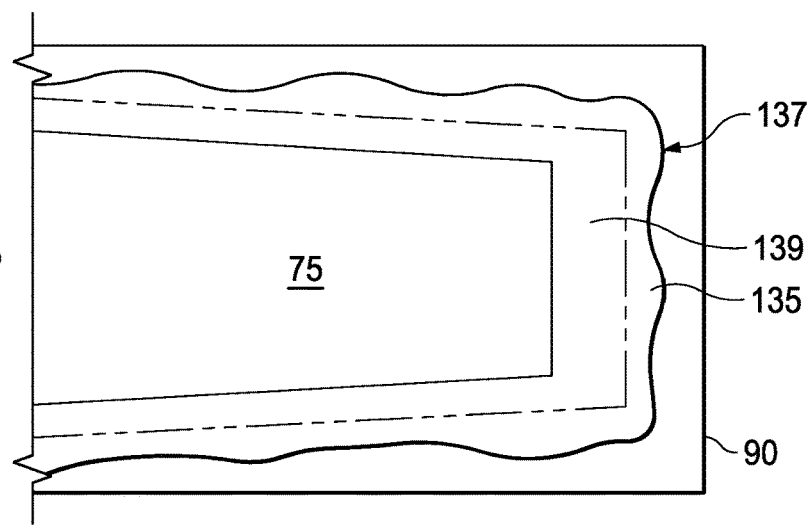
FIG. 13 is an illustration of a fragmentary plan view of a portion of a wing skin preform laid up on a mandrel, showing a manufacturing excess and a flash edge on the preform.
Figure 14:
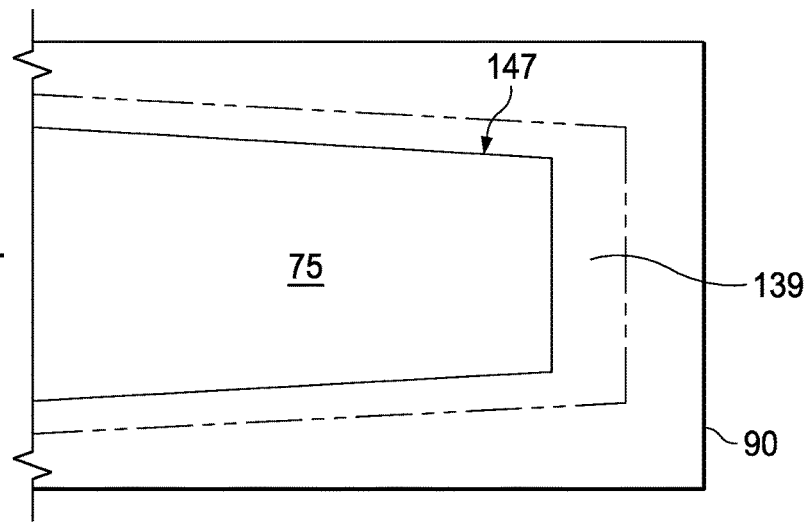
FIG. 14 is an illustration similar to FIG. 13 but showing the flash edge having been removed.
Figure 15:
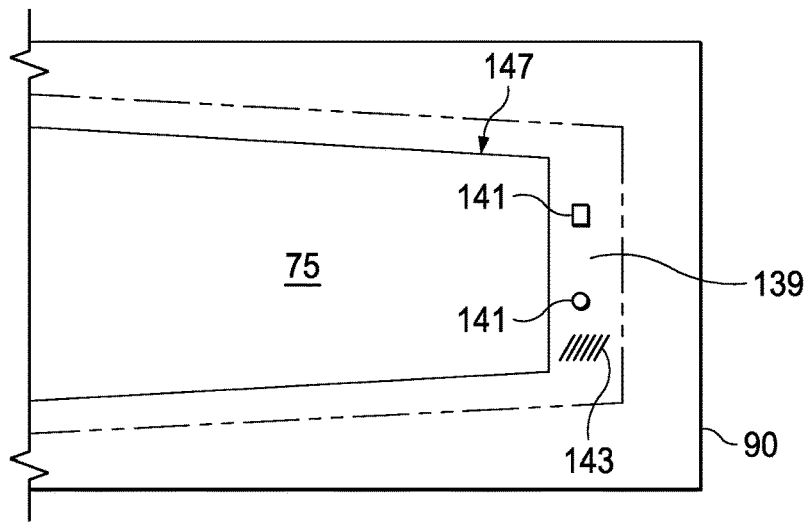
FIG. 15 is an illustration similar to FIG. 6 but showing indexing features having been added to the manufacturing excess.

Next, the mandrels 90 pass through a right-sized autoclave 145 at a workstation 102 where the wing panel 75 is hardened. Then, the hardened wing panel 75 moves out of the clean room 116 to a workstation 104 where it is debagged. Referring to FIGS. 13-15, after being debagged, a flash edge 135 (FIG. 13) of the manufacturing excess 137 on the wing panel 75 is trimmed away, leaving a remaining manufacturing excess 139 (FIG. 14). One or more indexing features 141 and/or work instructions 143 (FIG. 15) can be added to this remaining manufacturing excess 139 while the wing panel 75 is on the mandrel 90. The indexing features 141 allow the mandrels 90 to be recognized and located within each of the workstations. The work instructions 143 inform the workstations what work is to be performed on the mandrel 90. Adding the indexing features 141 prior to demolding allows using the precision of the mandrel to locate the wing panel 75 in downstream workstations 106-114.

The indexing features 141 and/or work instructions 143 can also be added in the remaining manufacturing excess 139 after demolding during a later manufacturing process. The indexing features 141 may be in the form of a hole, slot, pin, RFID, or other feature. The indexing feature 141 may also be in the form of access ports (not shown) in the wing panel 75 to assist in informing particular ones of the downstream workstations 106-114 as to the identity of the wing panel 75 (model number, upper or lower wing panel, left or right wing), and the particular work that needs to be performed on the wing panel 75 at that workstation. The work instructions 143 may be printed indicia, barcodes, RFIDs or in other forms. The indexing features 141 may be detected at any of the workstations either visually or using automatic detection equipment (not shown).

After being debagged, the wing panel 75 moves through workstation 106 where it is demolded 140 (removed from the mandrel 90) and may be placed on a portable holding fixture (not shown), allowing it to be transported to a workstation 108 where the wing panel 75 is washed 142. The wing panel 75 is washed in order to remove dust/debris resulting from trimming/drilling and other fabrication work.

Next, the wing panel 75 is non-destructively inspected (NDI) at work station 110, following which it moves through a workstation 111 where any inconsistencies or out of tolerances are corrected before fabrication work begins. Following inspection and rework, the wing panel 75 is transported to a workstation 112 where it is trimmed, fastener holes are drilled and other features may be added, such as indexing features 41.

Trimming the wing panel 75 while it is on the mandrel 90 allows using the precision of the mandrel 90 to locate the trimmers/cutters (not shown) used to add indexing features 141 to the wing panel 75. The final trim edge 147 (FIGS. 14, 15) of the wing panel 75 is established after there is no longer a need to use the indexing features 141 as a means of identifying the particular wing panels 75 to each of the workstations 104-114. The mandrel 90 can have cuts (not shown) in the surface thereof that are filled with a potting compound to form potted areas (not shown) in the mandrel 90. These potted areas allow overshoot of cutters/mills/drills used to cut/trim and/or add the indexing features, thereby preventing damage to the mandrel 90 and/or the cutters/mills/drills.

The mandrel 90 is demolded from the wing panel 75 after trimming and the addition of the part indexing features 141. As previously discussed, following the demolding process, the mandrel 90 is cleaned/washed at 122 and the potting compound is restored, following which the mandrel 90 is returned 120 to the clean room 116 where it is reused. The finished wing panel 75 may then be transported to a workstation 114, where it is painted and cured 148 for a desired cure period. At this point, the wing panel 75 is ready to be assembled at workstation 150 with other components of the wings 54.

The workstations 92-114 are each designed to perform their work within a specific period of time. For example, the amounts of work assigned to the workstations 92-114 may be tailored so that each of the workstations 92-114 can perform its work during a uniform pause (e.g., a pause shared by/synchronized across multiple workstations 92-114 at the production line 88) between pulses 202 and/or micropulses 204 (FIG. 9) of a wing skin preform 86 or stringer preform 74. In one example, an integer number of the pauses which are equal, and performed synchronously across wing skin preforms 86 or stringer preforms 74 is equal to a hardening time for the preform. In further examples, pauses are synchronized for workstations 92-114 working on the same components, but are not shared across different types of components. In some examples, the larger pauses are integer multiples of the smaller pauses. In still further examples, some portions of the production line 88 are continuously operated, while others are pulsed. The workstations 92-114 share common takt times. In order to achieve a common takt time, a greater or fewer number of workstations 92-114 may be employed.

All of the operations discussed above are performed in conformance with takt times for the stringer preforms 74 and the wing skin preforms 86. Enforcing takt times across multiple workstations 92-114 enables operations between the workstations 92-114 to be coordinated and synchronized according to a common schedule. In one example, each of the workstations 92-114 performs an amount of work based on the time span of an autoclave heating cycle where the autoclave heating cycle is the process that requires the longest time span to complete compared to the processes carried out the other workstations 92-100, 104-114. In other words, the autoclave heating cycle is the process along the production line 88 that limits the production rate because it takes the longest time span to complete. In the event that a takt time for a particular workstation 92-114 is determined to be too great to satisfy a desired part production rate, then additional workstations can be added such that the sum of the takt times of the added workstations is equal to or slightly less than the aurtoclave heating cycle time.

Autoclave processing can be performed in tandem or at multiples of two. For example, multiples of two or more wing panels 75 can be processed at the same time. Thus, in one example the amount of time spent by a wing skin preform 86 or a stringer preform 74 during a pause at each workstation 92-114 is equal to the expected hardening time for the preforms 74, 86 at the autoclave 145 (or is equal to a period of time that the hardening time is evenly divisible by). As explained previously, the processing time, which is the sum of the takes plus pulses/micro pulses pre-autoclave is approximately equal the autoclave processing time. This enables various components to be moved synchronously, either continuously or in a pulsed fashion, across a number of workstations 92-114 in lock step with hardening processes performed at the autoclave 145. Subdividing the fabrication of structures into fabrication of parts or sub-structures for processing and assembly allows for implementation of parallel processing and assembly of the parts or sub-structures, increasing overall throughput and fabrication speed for of larger structures. The parts/sub-structures are "bits" that can be processed in parallel with other "bits" and delivered downstream Just-In-Time (JIT) to serial workstations for integration with other "bits" into a larger structure such as a wing panel 75. either post or pre-cure.

In still further examples, parts or sub-structures such as stringer preforms 74 that are utilized as inputs to the workstations 92-114 of production line 88 are delivered in pulsed movement and in a JIT manner by feeder lines 134 that supply the parts or sub-structures directly to the workstations 92-114. Pulsed movement of components JIT to the workstations 92-114 reduces the amount of space needed at the factory for storage, as well as the amount of space needed for lanes that transport materials from storage to the workstations 92-114. Providing components JIT also allow the feeder lines 134 to have efficient takt times for JIT delivery to the downstream workstation 92-114. The pulsed movement of feeder lines 134 may or may not have the same takt time per workstation 92-114 as the workstation 92-114 being fed. In some examples, the parts or sub-structures provided by a single line (e.g., stringer preforms) vary slightly from each other, and the specific type of part or sub-structure needed at a point in time is provided in a JIT manner.

Figure 16:
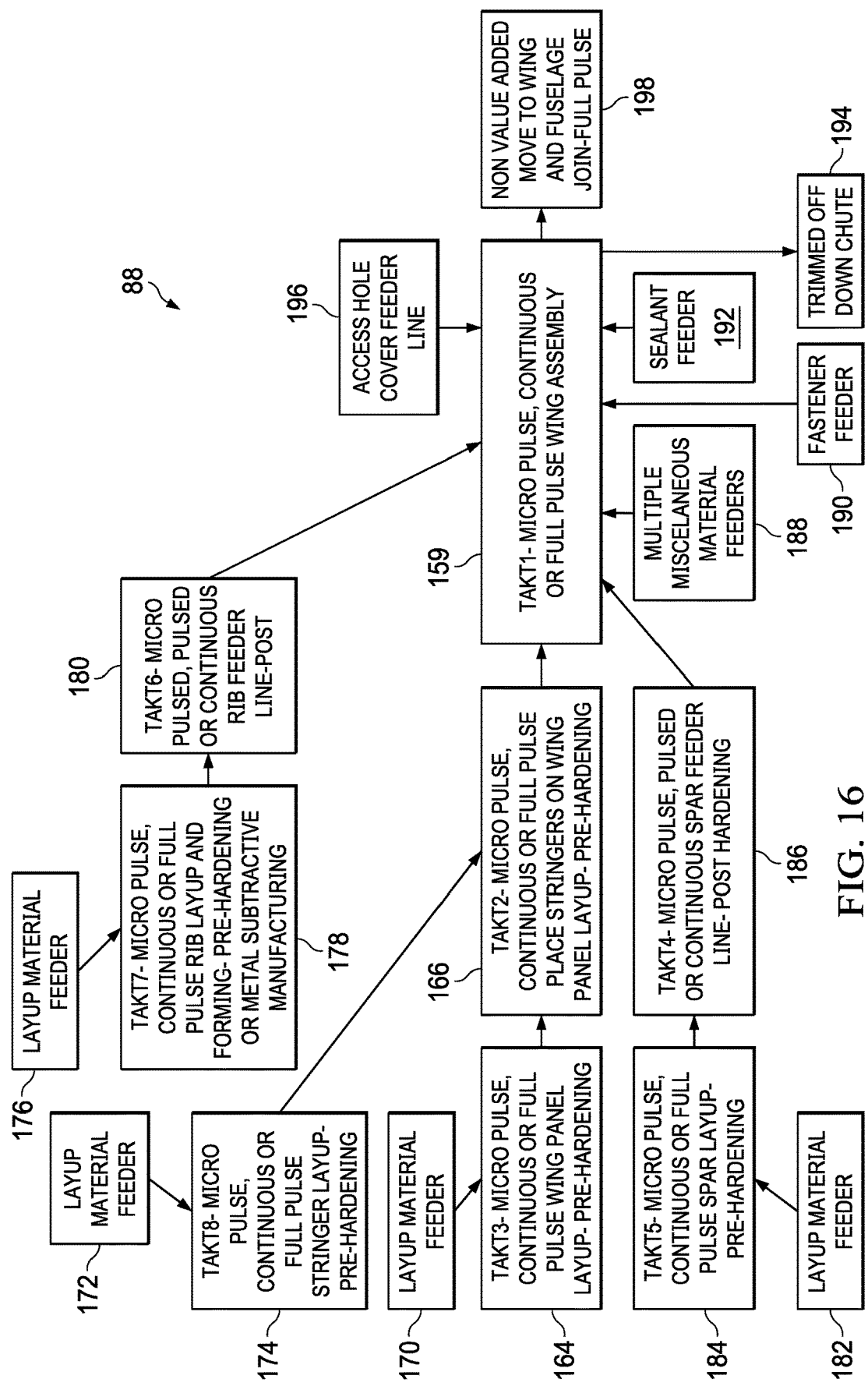
FIG. 16 is an illustration of a conceptual flow diagram useful in explaining how processes along the production line are assigned takt times.

FIG. 16 graphically illustrates how the processes for fabricating wings 54 may be synchronized in a production line 88 according to takt times for the various assembly processes, subassembly lines and feeder lines for JIT delivery. As indicated previously, a takt time reflects the rate of production needed to match a desired level of demand. Takt times may be calculated for all of the processes and tasks required to fabricate wing panels 75 on the production line 88. Using the takt system, components and sub-assemblies of the wings 54 move along the production line 88 as efficiently as possible, and the work that is performed in making and assembling them is substantially all value-added work. The throughput of the production line 88 helps establish the per workstation 92-114 takt time for the production line 88 necessary to meet a desired rate of production. Moreover, the use of a takt time system facilitates identification of bottlenecks and non-value added work so that these inefficiencies may be reduced or eliminated through appropriate modification of production processes and/or equipment.

Referring now to both FIGS. 4 and 16, FIG. 16 illustrates the process flow along the production line 88 in which one or more of the workstations 92-114 act as a feeder line to feed parts to downstream lines comprising one or more of the workstations 92-114. For example, a wing assembly line 159 shown as workstation 150 in FIG. 4 is supplied with parts by upstream feeder lines comprising a wing panel assembly line 166, a rib feeder line 180, and a spar feeder line 186 each having respective takt times selected to deliver ribs 82, wing panels 75, and spars 78, 80 to the wing assembly line 159 JIT. Similarly, the wing panel assembly line 166 is fed composite wing skin preforms 86 by a wing skin preform line 164 comprising upstream lamination workstations 92, 94 that layup the wing skin preforms 86. The wing panel assembly line 166 is also fed composite stringer preforms 74 in a preselected order by a stringer preform line 174 comprising upstream workstations 96, 98. Layup material feeder lines 170, 172 respectively feed composite material to the wing skin preform line 164 and stringer preform line 174. As previously discussed, the wing skin preform line 164 and stringer preform line 174 supply wing panel assembly line 168 with wing skin preforms 86 and stringer preforms 74 according takt times that permit the wing panel assembly line 166 to supply wing panels JIT to the wing assembly line 159.

The rib feeder line 180 is supplied with rib layups JIT by a rib layup and forming line 178 which receives material JIT by a layup material feeder line 176. In some examples, the ribs 82 that are supplied by the rib feeder line 180 may be fabricated out of aluminum or other metal, and the material supplied by material feeder line 176 is aluminum or another metal, rather than composite material. Similarly, layup material feeder line 182 supplies material to spar layup and forming line 184 according to takt times that allow the spar feeder line 186 to supply spars 78, 80 to the wing assembly line 159. Other parts or subassemblies may be supplied JIT to the wing assembly line 159. For example, miscellaneous material may be fed at 188, fasteners are fed at 190 and sealants are fed at 192. Further, access covers may be fed by a feeder line 196. Trimming operations may be performed which result in trim off being removed at 194. The wing 54 having been fully assembled at the wing assembly line 159, the wing 54 is delivered during a full pulse at 198 for joining with a fuselage 52.

The processes performed at the work stations along any of the feeder lines discussed above may be carried out while the part is moved along the feeder line in pulses, micro-pulses or continuously. Each feeder line may have a common takt that may or may not be equal to the line that it is feeding. The throughput of the assembly line and feeder lines help establish the per workstation takt time for the assembly line and feeder lines that are needed to meet the desired throughput. The takt time for the feeder line workstations are designed to accommodate JIT delivery at a desired throughput at the workstation at the end of him the feeder line.

Each of the feeder line workstations as well as the assembly line feeder lines has at least two inputs and one output. For example, the mandrel 90 along with wing skin preform layup 86, as well as composite material 126 from the composite material feeder 130b are input to workstation 94, and the resultant laminate on the mandrel 90 is output from the lamination workstation 92. Typically, the main input and output are in line with the workstation, and the feeder output arriving into that workstation is received from a third direction. This latter mentioned arrangement applies to workstations in the main production line 88 as well as workstations in the feeder lines 130, 134. The inputs to the workstations could be arranged on two or more sides of the workstation.

Attention is now directed to FIG. 17 which broadly illustrates the components of a control system 200 for controlling and operating various components of the production line 88 prior to hardening of the wing panels 75. Specifically, the control system 200 is configured to control pulsed movement of the mandrels 90 along the production line 88, and pulsed feed of parts from the feeder lines to the workstations. The previously discussed controller 162 controls and coordinates the operation of components of the production line 88 and has responsibility for synchronizing work according to takt times that are calculated to maximize efficiency and produce completed wing panels at a desired production rate. The controller 162 synchronizes the operation of fabrication equipment and processes according to takt times for the various processes, subassembly lines and feeder lines for JIT delivery to upstream workstations 92-114 to upstream assembly lines.

As indicated previously, the selected takt times result in a production rate that matches a desired level of demand output. Takt times may be calculated by the controller 162 for all of the processes and tasks required to fabricate wing panels 75 on the production line 88. Using the micro-pulsed, pulsed or continuous moving line takt system, components and assemblies of the wing panels 75 move along the production line 88 under control of the controller 162 as efficiently as possible and the work that is performed is substantially all value-added work. The throughput of the assembly line and feeder lines help establish the per workstation takt time for the assembly line and feeder lines necessary to meet the production rate. The controller 162 controls the production line drive 205 which drives the moving track 89, and thus the mandrels 90 or other platforms on which the parts or subcomponents are assembled, either continuously, in micro-pulses or in full pulses. The controller 162 also controls the operation of the AGVs 154, the use of which is optional. In some examples, the mandrels 90 may be moved along various sections of the production line 88 by a combination of AGVs 154 and production line drives 205 such as conveyors, powered rollers and/or chain/belt drives (not shown). In other examples, the mandrels 90 may be moved along the production line 88 only by AGVs 154, or only by the production line drives 205, or some combination thereof. The controller 162 comprises one or more programmed computers and/or processors and associated memory and programmed instructions (all not shown).

Other components of the production line 88 forming part of the workstations 22-114, such as the autoclave 145 and a vacuum control/vacuum check 203 are also controlled by the controller 162. Although the PNPs 132a, 132b as well as the laminators 124a, 124b may have local controls, their operation is synchronized and/or controlled by the controller 162. Similarly, the operation of components of the stringer feeder lines 134a, 134b, as well as the composite material feeders 130a, 130b is also be controlled and synchronized by the controller 162.

FIG. 18 illustrates details of a lamination workstation 97 similar to workstations 92, 94 shown in FIG. 4, wherein separate laminators layup different sections of a wing skin preform 86. For example, multiple laminators 124a, 124b, 124c at the lamination workstation 97 can lay down composite material 126 on different sections 213, 214, 216 of a wing skin preform 86. Each of the laminators 124a, 124b, 124c receives composite material 12, which may be in the form of a composite tape or tows. The laminators 124a, 124b, 124c are respectively assigned sections 213, 214, 216 of a ply 215 within which they lay down strips 221 of the composite material. In some examples, the laminators 124a, 124b, 124c may be substantially of the same type, while in other examples they may be of different types having differing capabilities. For example, one or more of the laminators 124-124c may have only 3 degrees of freedom of movement, while others may have 6 degrees of freedom of movement. Thus, specialized laminators 124a-124c may be employed to layup particular sections 213, 214, 216 at a lamination workstation 97, while less costly, standard laminators 124a-124c may be employed to layup other of the sections 213, 214, 216 of the ply 215. In some examples, as shown in FIG. 20, side-by-side strips 221 of adjoining sections 214, 216 form a joint 223, which may be a butt joint or a lap joint. In other examples, as shown in FIG. 19, any one of the strips 221 that is laid down by different laminators 124a, 124b, 124c may be spliced together 225 by a butt joint, an overlapping joint or a scarf joint.

The splices 225 in different plies of the laminate are offset from each other so that they are not aligned with each other through the thickness of the laminate. The laminators 124a, 124b, 124c may lay down composite material 126 on the sections 213, 214, 216 in any order. In some examples, two or more of the laminators 124a, 124b, 124c may lay down composite material 126 on the same section 213, 214, 216 before returning to apply composite material 126 to the section 213, 214, 216 to which it is assigned. Although the laminators 124a, 124b, 124c are positioned on one side of the mandrel 90 in FIG. 15, they may be positioned at any location around the mandrel 90.

Figure 21:
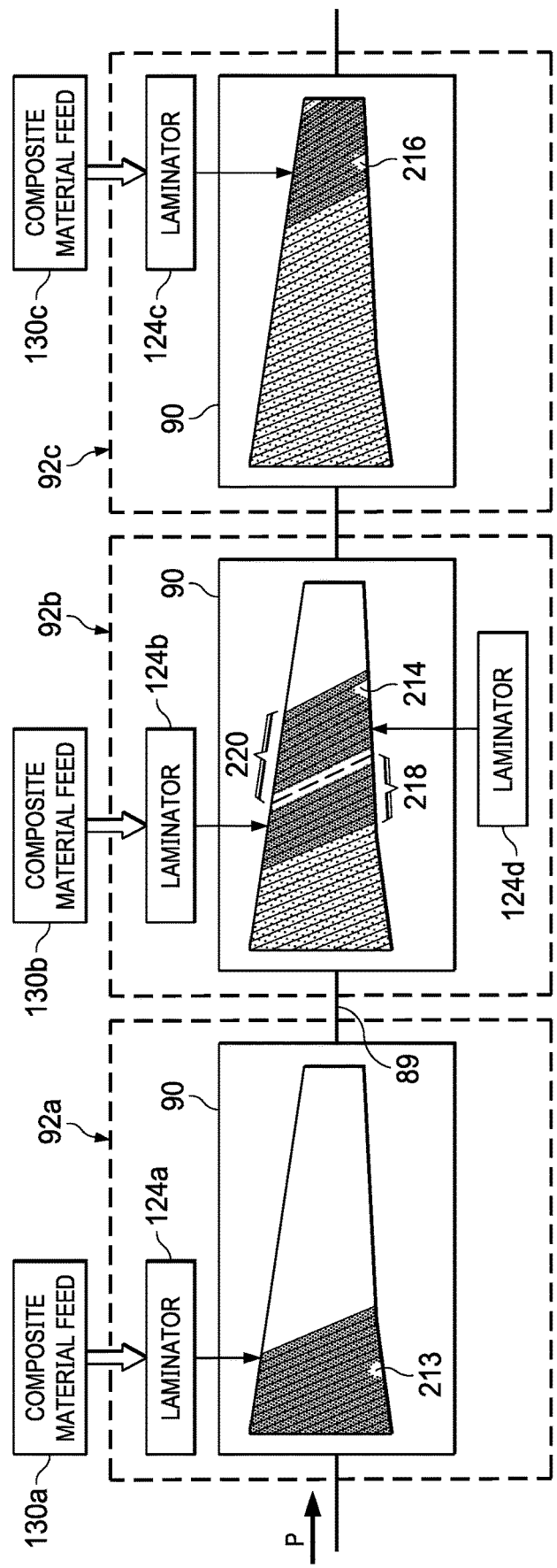
FIG. 21 is an illustration of a combined block and diagrammatic view showing how laminators at different workstations layup different sections of a wing skin.

Attention is now directed to FIG. 21, which illustrates an alternate method of laying up the wing skin preforms 86. In the previously discussed example shown in FIGS. 4 and 18, the laminators 124 at each of the lamination stations 94, 96 may layup at an entire wing skin preform 86. However, in the example shown in FIG. 21, one or more laminators 124a-124c located at different workstations 92a-92c may layup different sections 213, 214, 216 of a particular wing skin preforms 86. Further, multiple laminators 124b, 124d at a workstation 92b may layup different portions 218, 220 of a section 214 of a wing skin preform 86 that is laid up at that workstation. Thus, it may be seen that different laminators layup different portions of a section of a wing skin.

Figure 22:
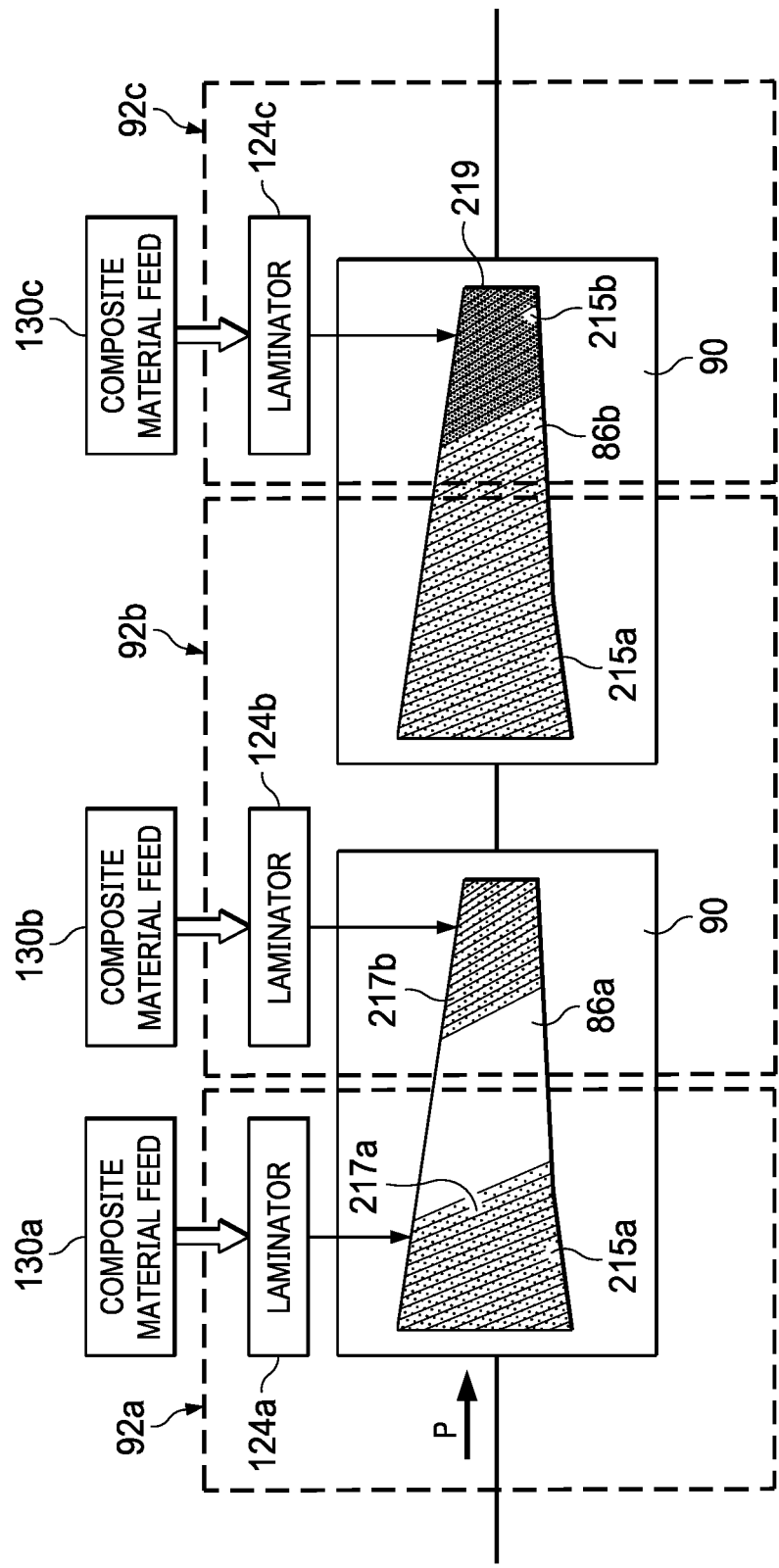
FIG. 22 is an illustration showing how laminators at different workstations may layup different sections of the ply of a wing skin preform.

Referring now to FIG. 22, in some examples, laminators 124a, 124b, 124c located in different workstations 92a, 92b, 92c may apply composite material on a wing skins preform 86 at the same time in order to increase lamination efficiency. For example, as shown in FIG. 22, a wing skins preform 86a transitions from workstation 92a to workstation 92b. Laminator 124b at workstation 92b begins laying down composite material on a leading edge section 217b while simultaneously, laminator 124a at workstation 92a is laying down composite material on a trailing edge section 217a of wing skin preform 86a. In this example, laminator 124b has finished laying up a full ply 215a on wing skin preform 86b, and rather than sitting idle, begins laying up composite material on wing skin preform 86a as it enters workstation 92b. Similarly, wing skin preform 86b can be seen transitioning from workstation 92b to workstation 92c. In this example, a full ply 215a has been laid up on wing skin preform 86b before it begins entering workstation 92c. Rather than waiting until wing skin preform 86b has fully entered the workstation 92c, laminator 124c workstation 92c begins laying up the next ply 215b as the leading edge of the wing skin preform 86*b* begins entering the workstation 92*c*. Thus, it is possible for workstations 92*b* and 92*c* to work on the same wing skin preform 86*b* at the same time. It is also possible for workstations 92*a*, 92*b*, and 92*c* to work on the same wing skin preform 86*b* at the same time, depending on the width of the workstations 92*a*, 92*b* and 92*c* and the distances between them.

Figure 23:
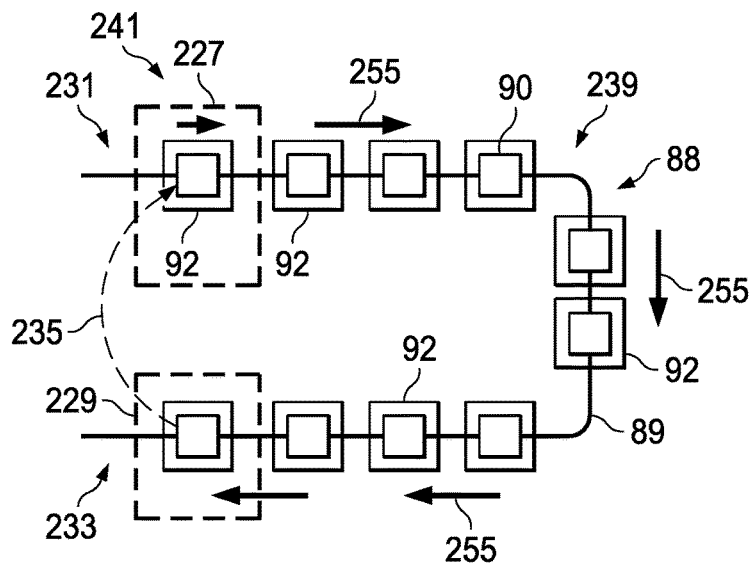
FIG. 23 is an illustration of a diagrammatic plan view of one example of a layout of the workstations of the production line.

A number of geometric arrangements of the workstations 92 are possible in order to better utilize factory floor space and/or the tailor production line 88 to best fit a particular factory layout. For example, the workstations 92 may be arranged along a U-shaped path 241 as shown in FIG. 23, or a zigzag path 243 shown in FIG. 24, or an endless "race track" path 245 shown in FIG. 25. The path arrangements shown in FIGS. 20-22 concentrate the workstations 92, thereby reducing floor requirements compared to a more linear path arrangement. Additional workstations 92 may be added as needed to increase production capacity and/or work density. Alternatively, one or more of the workstations 92 may be deactivated as needed, depending on the application. In the example shown in FIG. 23. The mandrels 90 move in the directions of the arrows 255 from a loading zone 227 located at the beginning 231 of the production line 88, through any number of workstations 92 to an unloading zone 229 located at the end 233 of the production line 88. A mandrel 90 is loaded onto the track 89 within loading zone 227, and may be removed from the track 89 in the unloading zone 229, following which it may be reconditioned and recycled back to the loading zone 227. In each of these production line layout examples, the mandrels 90 are indexed to each workstation 92 prior to laying up the wing skin preforms 86 on the mandrels 90.

Figure 24:
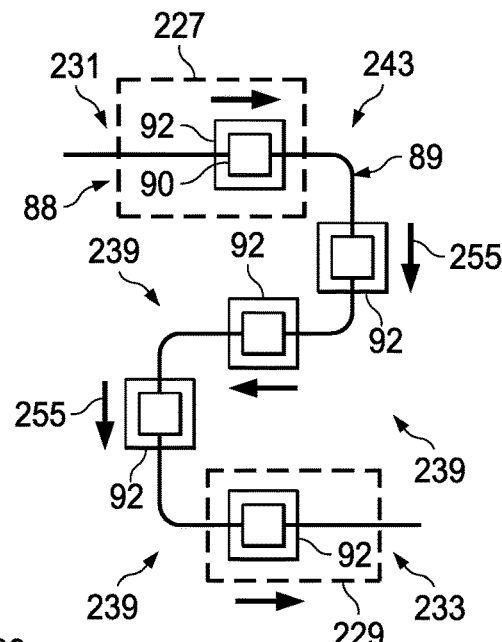
FIG. 24 is an illustration of a diagrammatic plan view of another example of a layout of the workstations of the production line.

Similarly, in the zigzag path 243 example shown in FIG. 24, the production line 88 likewise has a loading zone 227 at the beginning 231 of the production line 88 where mandrels 90 are loaded, and an unloading zone 229 at the end 233 of the production line 88 where the mandrel 90 are unloaded. In the endless path configuration 245 shown in FIG. 22, the loading zone 227 and the unloading zone 229 may be located anywhere around the production line 88, moreover, loading and unloading of the mandrel 90 may be performed in the same workstation 92. For example, when the mandrel 90 enters one of the workstations 92, a mandrel 90 having a completed wing skin preform 86 thereon may be removed from the track 89, and another mandrel 90 may be loaded at 227 onto the track 89 in its place, in readiness for laminating another wing skin preform 86.

Figure 25:
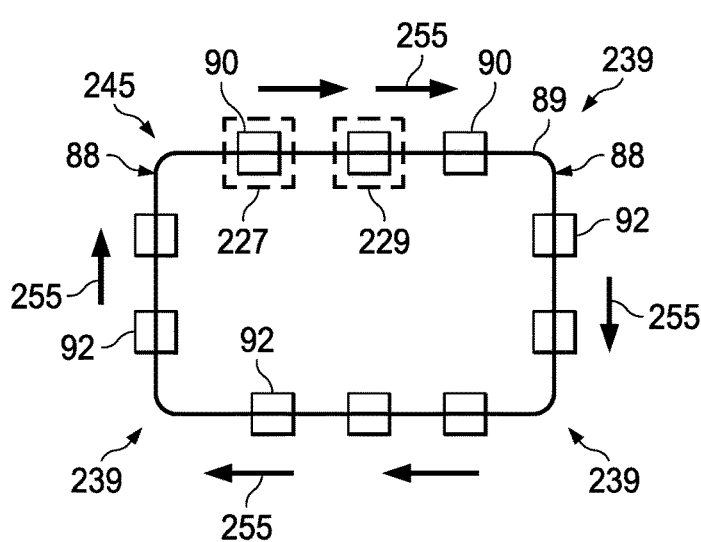
FIG. 25 is an illustration of a diagrammatic plan view of a further example of a layout of the workstations of the production line.

In the example shown in FIG. 25, the endless path configuration 245 is rectangularly shaped, however it may have any other regular or irregular shape, such as an ellipse, depending upon the application. A number of the workstations 92 in the example of FIG. 25 may each have two or more laminators 124 similar to the example shown in FIG. 18. The lamination operations at the different ones of the workstations 92 are coordinated such that each of the workstations 92 lays up a ply of the wing skin preform 86, and the splices in the plies are staggered from each other throughout the laminate.

In one example, all of the workstations 92 in FIG. 25 contain one or more of the laminators 124 and a wing skin preform 86 is fully laid up after a mandrel 90 moves completely around the endless path through workstations 92. In other examples, it may be necessary for mandrel 90 to move through all workstations 92 multiple times in order to fully complete a wing skin preform 86. In still other examples, such as those shown in FIGS. 20 and 21, after a mandrel has moved through all of the workstations 92, it may move backwardly through the workstations 92 where additional plies are laminated in order to fully complete the wing skin preform 86. In further examples, it may be necessary for a mandrel 90 move back-and-forth along the path of the production line multiple times in order to complete a wing skin preform 86. Multiple mandrels 90 may move along the production line 88 at the same time carrying different types of wing skin preforms 86, such as any of four possible versions of wing skin preforms 86 comprising top and bottom wing skin preforms 86 of the port and/or starboard wings 54. Also, any of these four versions of the wing skin preforms 86 may be in any state of fabrication as they move along the endless racetrack path.

In the race track path 245 configuration, the mandrels 90 are placed on the production line 88 at a loading zone 227 and cycle through the various ones of the workstations 92 until they are removed at an unloading zone 229. In other examples, the mandrels 90 may be loaded and unloaded at a single zone; in other words, a mandrel 90 is removed at a zone along the production line 88 and is replaced by another mandrel 90 at the same zone. Multiple mandrels 90 can move along the race track path 245 at the same time. In addition, as will become apparent below, it is possible for a mandrel 90 to move through any of the workstations 92 fore-to-aft and move aft-to-fore through another one of the workstations 92.

Figure 26:
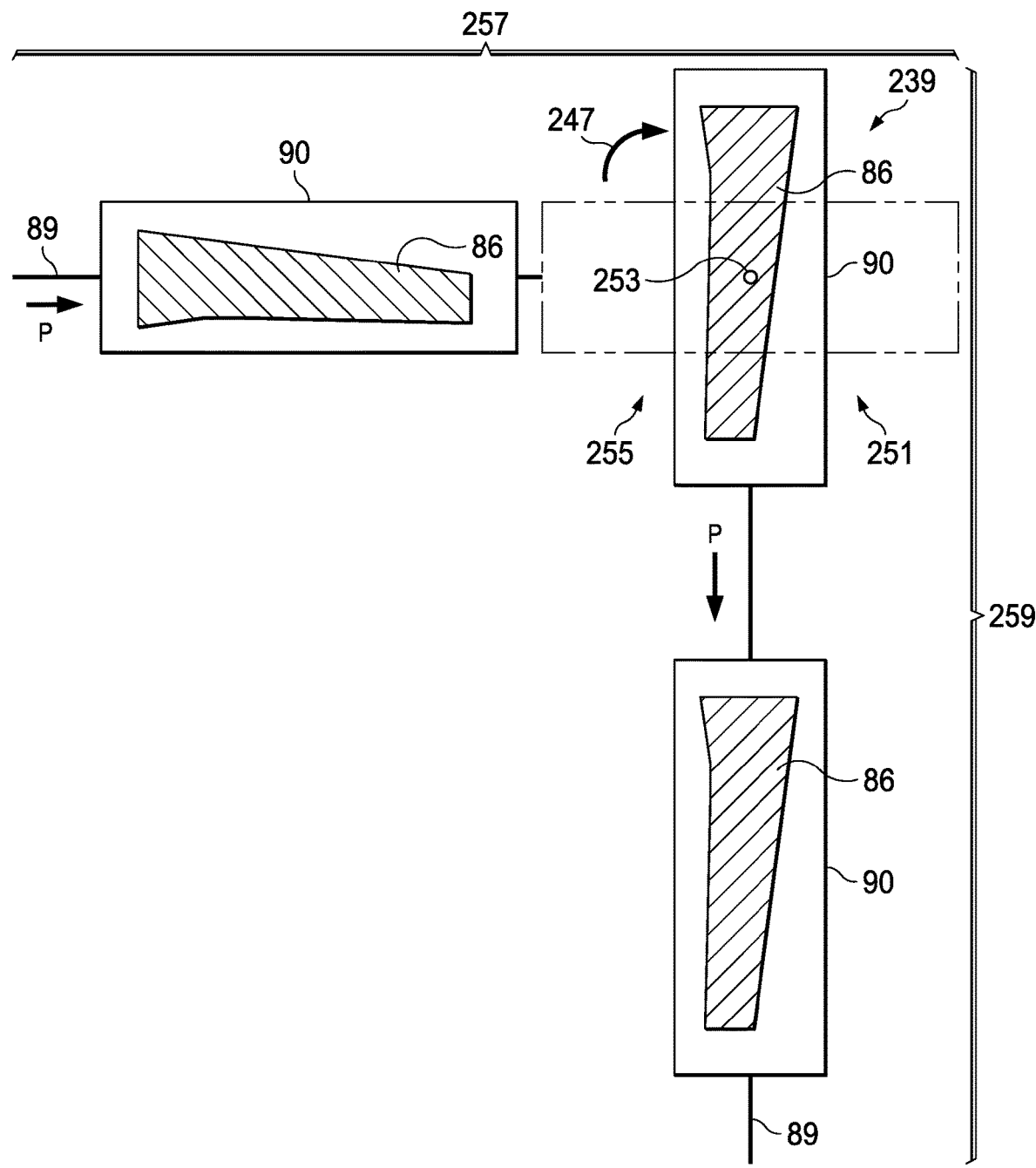
FIG. 26 is an illustration of a diagrammatic plan view of another example of a layout of the workstations of the production line.

In each of the examples shown in FIGS. 23-25, the turns 239 are relative smooth rather than sharp, consequently the orientation of the mandrels remains aligned with their direction of travel (process direction P) as they traverse the turns 239. However, in some examples, a turn 239 may be relatively sharp such as the 90 degree turn shown in FIG. 26. In this event, it is possible to pivot the mandrel 90 degrees at the turn 239. In the example shown in FIG. 26, the mandrels 90 may be mounted on the track 89 for pivotal movement 247 about a pivot point 253. When a mandrel 90 moves from left to right along a horizontal segment 257 of the production line 88 and reaches a sharp turn 239, it is pivoted 247 on the track 89 about pivot point 253, thereby maintaining the alignment of the mandrel 90, and thus the wing panel 86, with the process direction P. In those examples where an AGV 154 is used to move the mandrels 90 along the production line 88, any necessary turns 239 or other reorientations of the mandrels 90 may be accomplished through steering of the AGV 154.

In some applications, it may be necessary or desirable to layout the production line 88 in a manner that optimizes use of factory floor space and/or manpower. Thus, referring to FIG. 27, in another example, a production line 88 comprises two production line segments 275*a*, 275*b* arranged side-by-side and generally parallel to each other. The production line segments 275*a*, 275*b* may be spaced apart from each other a distance 279 that allows sharing of equipment and/or manpower between the two segments 275*a*, 275*b*. Each of the production line segments 275*a*, 275*b* may contain any number of individual workstations 92 where work such as wing skin lamination may be performed.

The mandrels 90 are placed on the production line 88 at a loading station 227 and move along the upper production line segment 275*a* from left to right. When a mandrel 90 reaches the end of production line segment 275*a*, it is laterally shifted 269 (downwardly as viewed in the figure) to production line segment 275*b*. The mandrels 90 may be moved laterally 269 either manually or using automated equipment (not shown), or a combination thereof. The mandrel 90 then moves 255 from right to left on production line segment 275*b* until it reaches an unloading zone 229 where it is unloaded, cleaned and prepped as necessary, and then recycled 235 back to the loading zone 227. In other examples, loading and unloading of the mandrels 90 may be carried out at a single (same) zone. In still other examples, the mandrel 90 then moves 255 along production line segment 275a, and then production line segment 275b, multiple times before exiting. The production line 88 shown in FIG. 27 can be used to produce all of the wing panels 75 for the wings of a particular model of an airplane, or for multiple models of the same or a different airplane. For example, the upper and lower wing panels 84L-1 and 85L-1, respectively of a left-wing, as well as the upper and lower wing panels 84R-1 and 85R-1 of a right wing of an airplane can be produced as set 271 on a group of the mandrels 90. Similarly, the wing panels 84L-2, 85L-2, 84R-2, 85R-2 for the left and right wing 54 of a different model of the airplane can be produced on a different group of the mandrels 90 on the same production line 88.

Figure 27:
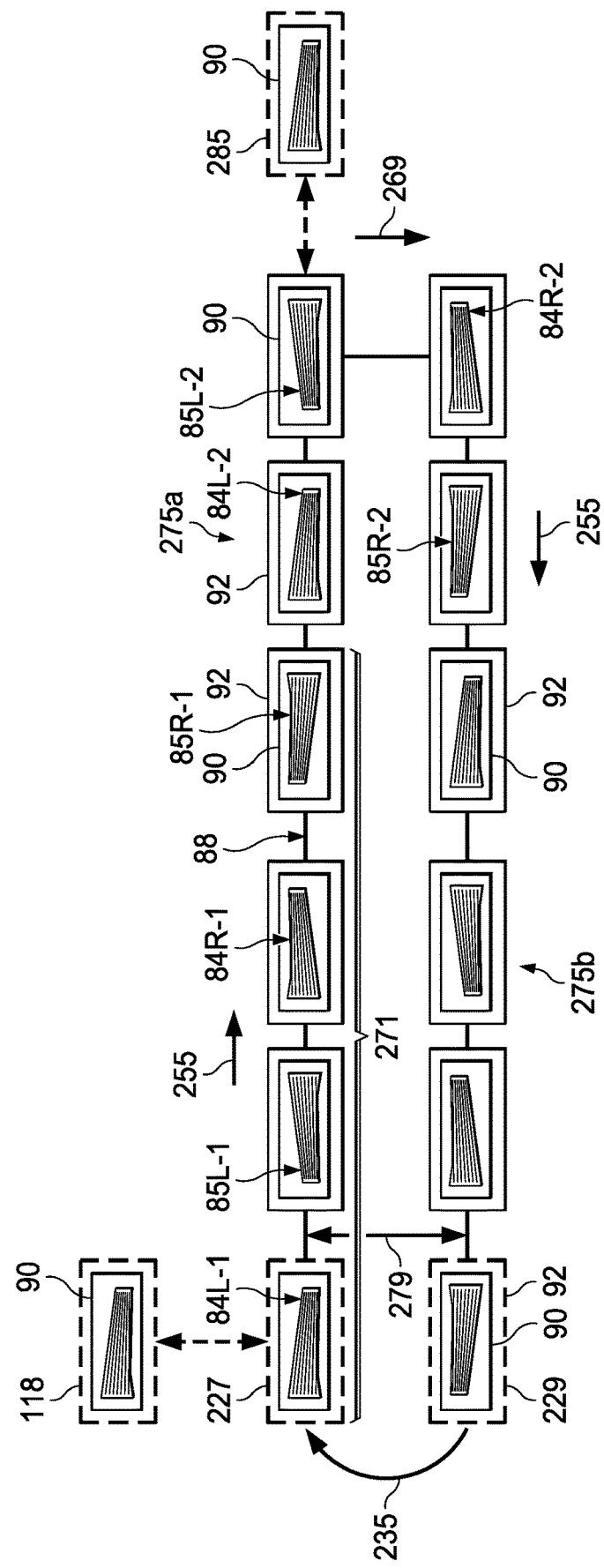
FIG. 27 is an illustration of a plan view showing one example of how mandrels may be oriented as they move around a sharp turn along the production line.

Optionally, one or more off-line holding areas 285 may be provided anywhere along the production line 88, such as at the end of the production line segment 275a, where mandrels 90 may be off-loaded and temporarily held for any number of reasons, such as to make repairs, establish a desired takt or perform inspections. A mandrel storage 118 area may be located adjacent the loading zone 227 to permit mandrels 90 to be stored until needed on the production line 88. The production line layout shown in FIG. 27 is particularly efficient in utilizing factory floor space since the two production line segments 275a, 275b may be closely spaced next to each other, if desired. Close spacing of the two production line segments 275a, 275b also facilitates manpower sharing between the two segments 275a, 275b. As mentioned above, the production line layout shown in FIG. 27 is also well-suited to high volume production of wing panels of different configurations and/or differing wing panels for different models of aircraft.

Figure 28:
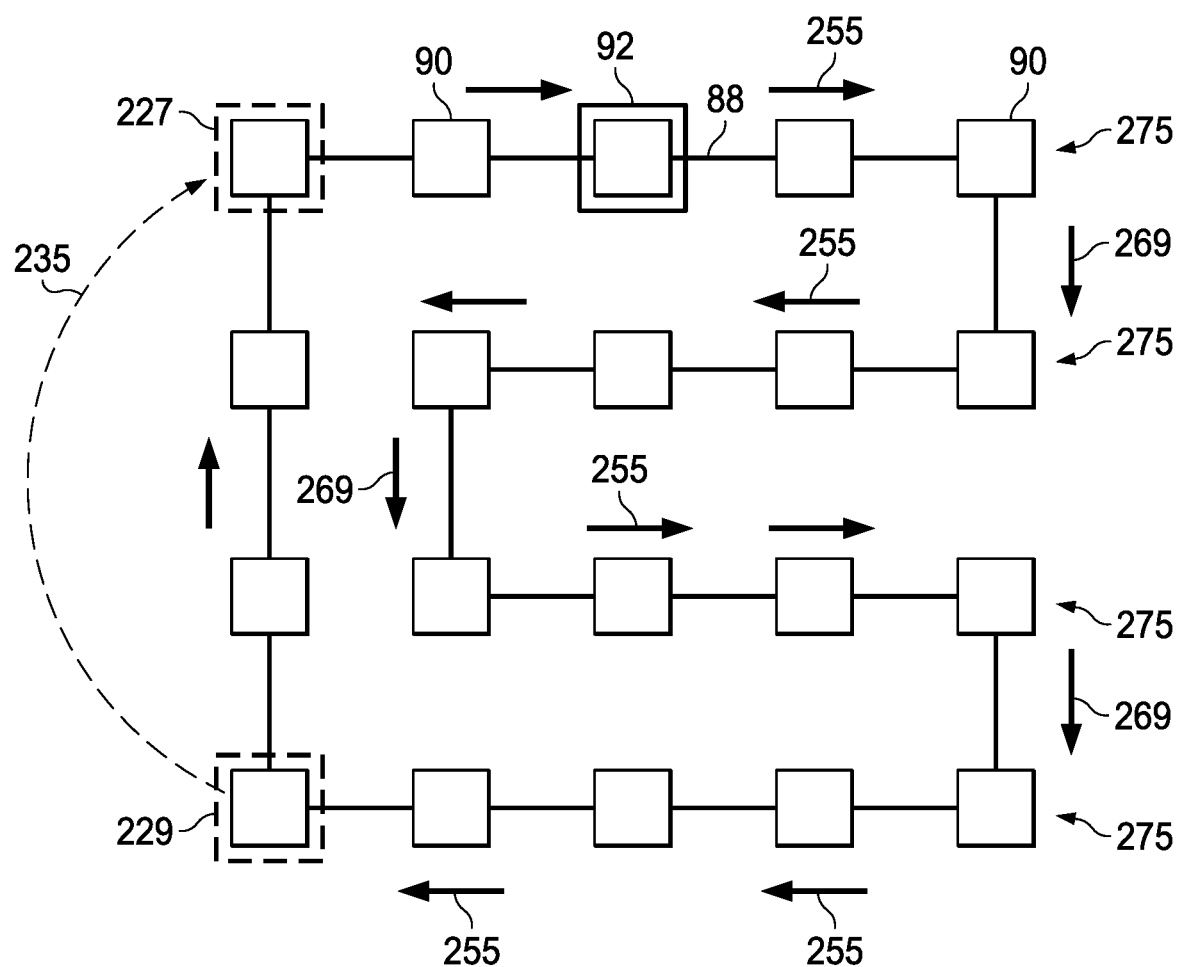
FIG. 28 is an illustration of a plan view showing another example of how mandrels may be oriented as they move around a sharp turn along the production line.

FIG. 28 illustrates a zigzag production line configuration which incorporates the line shifting concept shown in FIG. 27 in order to avoid the need for negotiating around turns of the production line 88 or rotating the mandrels 90. In this example, production line 88 is arranged in a series of adjacent line segments 275 that are generally parallel to each other. Each line segment 275 may contain any number of the workstations 92. The mandrels 90 move 255 from a mandrel loading zone 227 through all the line segments 275 to a mandrel unloading zone 229 were they are transported and recycled 235 back to the loading zone 227. When a mandrel 90 reaches the end of the line segment 275, it is laterally shifted 269 to an adjacent line segment 275, where it moves 255 along the production line 88 until it reaches the end of that line segment 275, whereupon it is again laterally shifted 269 to the next adjacent line segment 275. Thus, mandrels 90 move back and forth along the line segments 275 until the wing panels 75 are completed and removed from the mandrels 90 at the unloading zone 229.

As mentioned above, it may be possible for the movement of the production line 88 to be reversed, such that the mandrels 90 move backwardly. For example, once a wing skin preform 86 has been processed within one or more of the workstations 92, the mandrels 90 may move backwardly either for additional processing or for return to the loading zone 227. It may be desirable to move a mandrel 90 backward to a prior workstation 92 because the prior workstation 92 contains specialized equipment and/or is otherwise better suited to perform a particular lamination operation. The ability to locate the loading and unloading zones 227, 229 at any point along the production line 88 allows for greater processing flexibility, and may increase work density while reducing floor space requirements.

Figure 29:
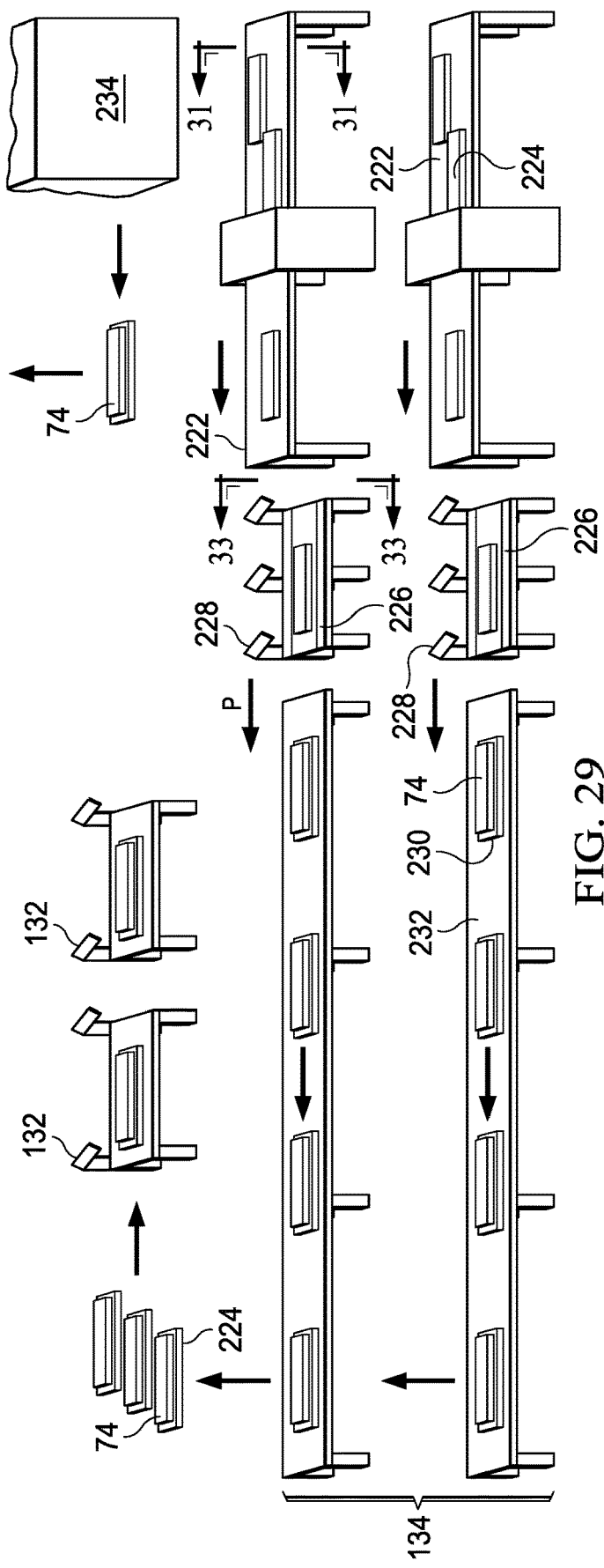
FIG. 29 is an illustration of a stringer feeder line shown in FIG. 4.
Figure 30:
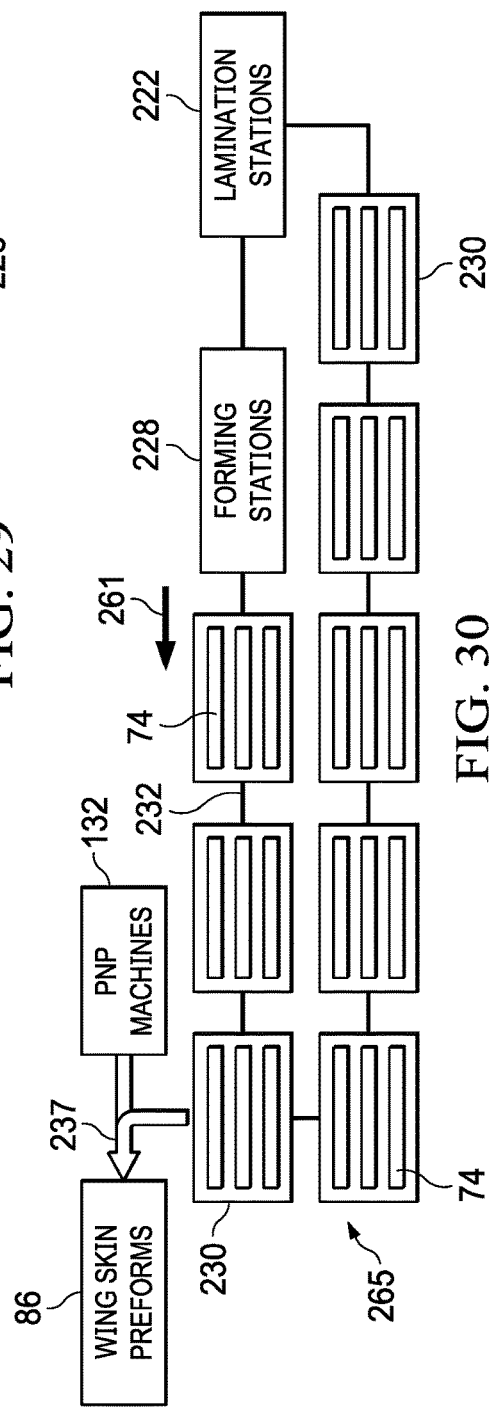
FIG. 30 is an illustration of a combined block and diagrammatic view of the stringer feeder line.
Figure 41:
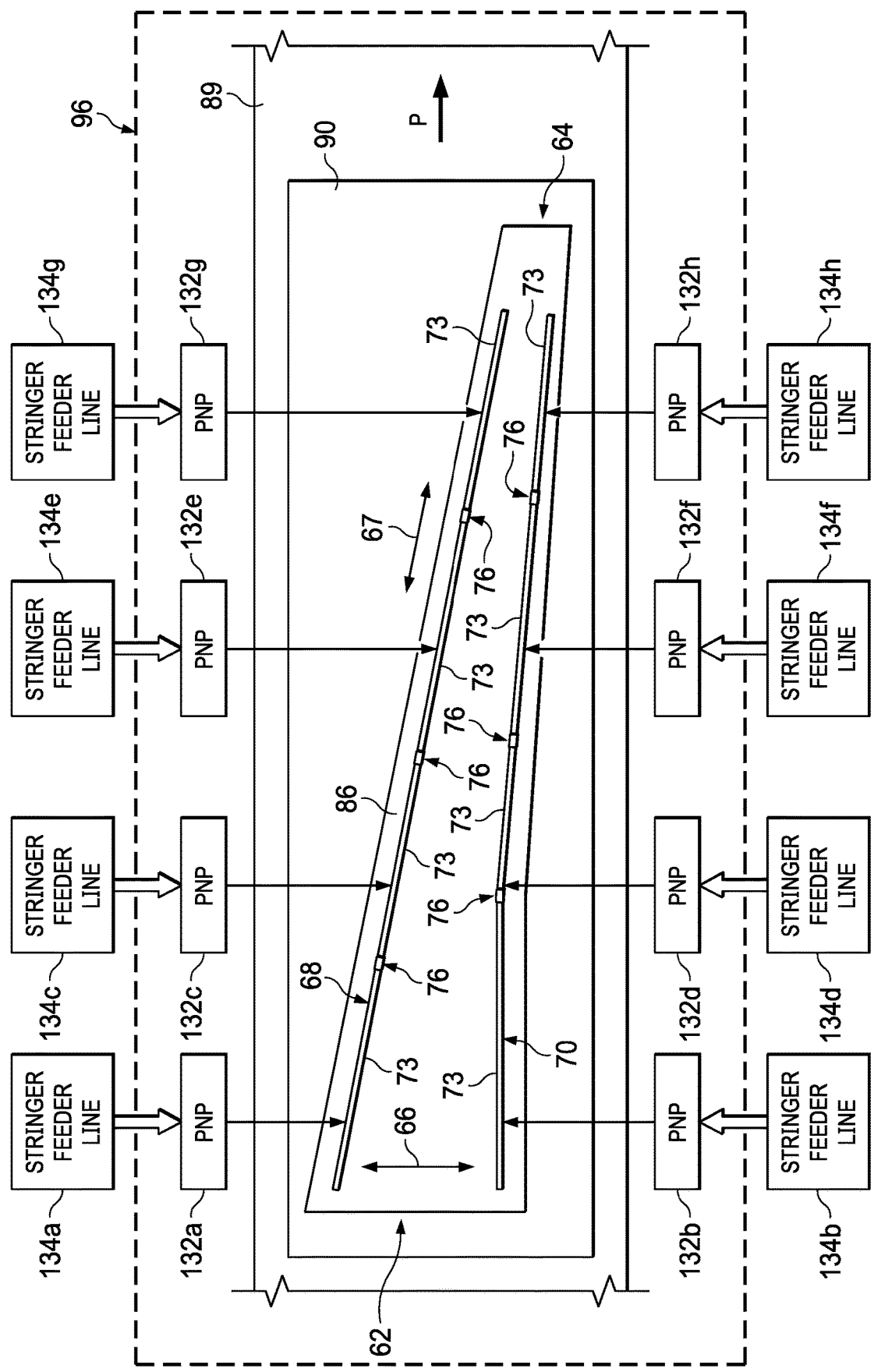
FIG. 41 is an illustration of a combined block and diagrammatic view showing how stringer sections may be placed on a wing skin at different workstations.

FIGS. 29 and 30 illustrate an example of the stringer feeder lines 134a, 134b shown in FIGS. 4 and 41. In this example, stringer feeder lines 134a, 134b each include lamination workstations 222, which lay and trim flat charges 224 of fiber reinforced material (e.g., unhardened CFRP). These flat charges 224 may additionally receive Fluorinated Ethylene Propylene (e.g., FEP) layers, isolation plies (e.g., fiberglass plies that electrically insulate carbon fiber from aluminum components), etc.

The flat charges 224 are shaped into stringer preforms 74 by forming stations 228 onto mandrels 226. After forming, the stringer preforms 74 are placed onto trays 230 which proceed 261 along track 232 (e.g., a powered conveyor or other component). The track 232 can be linear or can be arranged in a loop 265 layout wherein one or more stringer preforms 74 enter the track 232 and exit when layup and forming is complete (e.g., after layup continues during one or more traversals of the loop 265 by a preform). Thus, the stringer preforms 74 are laid up and formed ply-by-ply according to a predefined ply schedule. Other layouts of the track 232 are possible. In one example, multiple lamination workstations 222 are followed by multiple forming stations 228, respectively aligned along the track 232.

Within the track 232, mandrels 226 can cycle through the same lamination workstation 222 followed by the same forming station 228 multiple times before exiting the track 232. Depending on design, the trays 230 store either one or a set or group 272 of stringer preforms 74. The stringer preforms 74 may be fed in sets 272 to the stringer placement workstations 96, 98 where they are to be placed. However, it may be necessary or desirable in some applications to feed the stringer preforms individually in series or in subsets JIT. Automated stringer placement machines, such as PNPs 132, pick up the stringer preforms 74 from the trays 230 either individually, or in sets or in subsets, and place them onto wing skin preforms 86. As will be discussed below in further detail, in one example, the PNP 132 pick and place a single stringer preform 74 at a time, while in other examples, the PNPs 132 each pick and place a batch or set 272 of stringer preforms 74 onto a wing skin preform 86. In some examples, placement of the stringer preforms 74 may be performed manually, or manually with machine assistance. The stringer feeder lines 134a, 134b are each configured such that smaller structures or "bits" are processed in parallel and delivered JIT to the serially arranged workstations discussed above for integration with other "bits", if applicable, into the wing panel 75, either post or precure.

Figure 31:
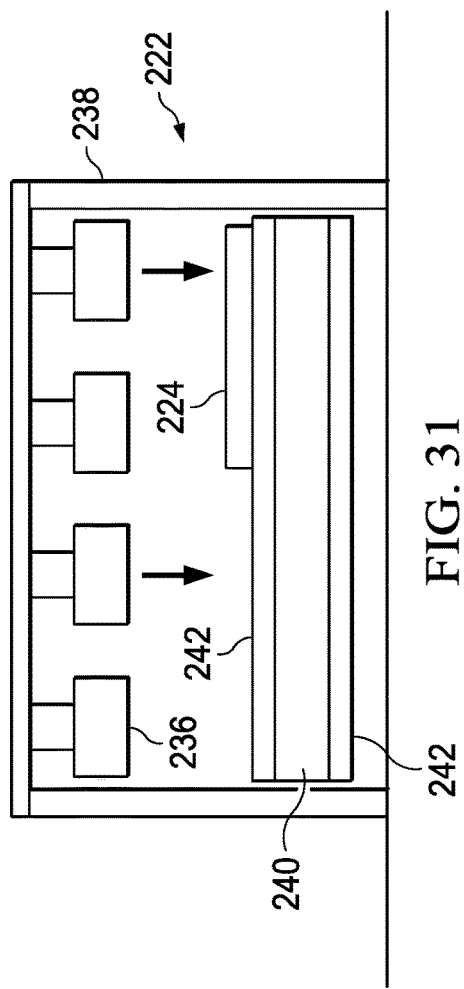
FIG. 31 is an illustration of a sectional view taken along the line 31-31 in FIG. 29.

FIG. 31 illustrates one example of the lamination workstation 222 shown in FIGS. 29 and 30. In this example, the lamination workstation 222 includes multiple heads 236 that each dispense tows of material to form a multi-ply flat charge 224. The heads 236 are mounted to a frame 238, and move along the frame 238 to desired locations for laying up material. The frame 238 provides structural strength to the lamination workstation 222 while also enabling movement of the heads 236. A conveyor 240 moves flat charges 224 relative to the heads 236 via a belt 242 (into a direction into and out of the page), enabling each of the heads 236 to lay up the flat charger 224, each of which comprises multiple layers of fiber reinforced material at any desired combination of fiber orientations (e.g., +/−45°, 0°, 90°).

Figure 32:
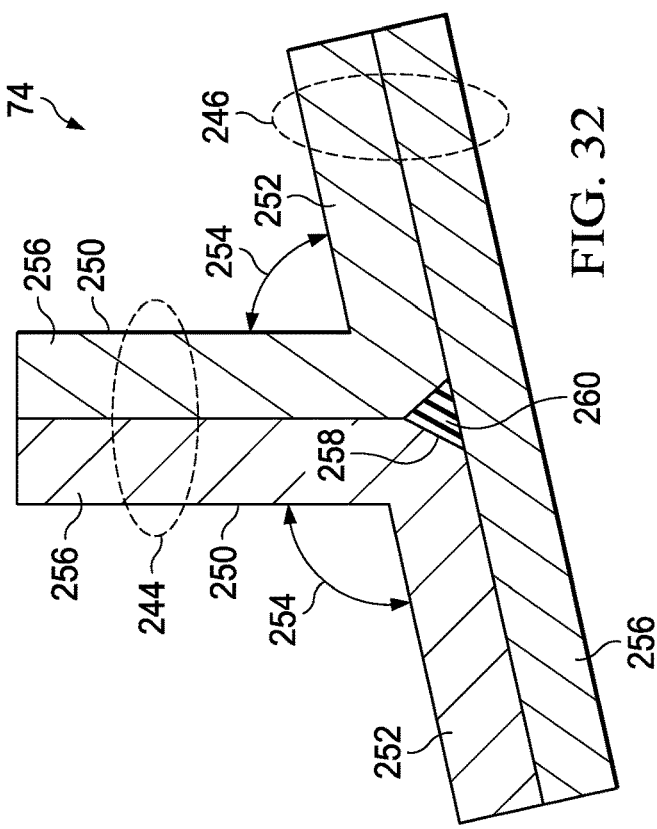
FIG. 32 is an illustration of a cross-sectional view of a stringer preform.

Attention is now directed to FIG. 32 which illustrates one example of a stringer preform 74, sometimes referred to as an inverted-T blade stringer. The stringer preform 74 comprises a blade 244 and a base 246 formed by two L-shaped members 248 joined together and to a base cap 256. Each of the L-shaped members 248 includes a blade portion 250 and a flange portion 252. The blade portions 250 are joined together back-to-back, and the flange portions 252 are joined to the base cap 256. A noodle 260 is installed in a gap 258 between the radiused edges of the L-shaped members 248 and the base cap 256. The flange portions 252 are inclined relative to the base portions 250 at angles which results in the blade 244 being inclined at a desired angle relative to the base 246. As will become apparent later in the description, the angularity 254 of the blade 244 relative to the base 246 facilitates placement of the stringer preforms 74 on contoured surfaces, such as a contoured 278 wing skin preform 86, and may also increase stiffness of the stringer preforms 74, depending upon the application. More specifically, to facilitate stringer placement in batches the angle 254 of the blades 244 is selected such that blades 244 are approximately parallel to each other. The parallel orientation of the blades allows them to be picked up in batches or multiples and placed more easily by a common device such as a PNP machine 132.

FIGS. 33-40 illustrate one example a method of fabricating a stringer preform 74 at the forming stations 228 mentioned previously. In this example, the stringer preform 74 is of the inverted T-type shown in FIG. 27, wherein the blade 244 is inclined relative to the base 246. Beginning with FIG. 33, mandrels 226a and 226b are mounted on a tool base 262 at the forming station 228. In FIG. 34, a PNP machine (not shown) places one or more flat charges 224 on each of the mandrels 226a, 226b. Next, as shown in FIG. 35, the flat charges 224 are formed down onto the surfaces of the mandrels 226a, 226b. Referring to FIG. 36, one or more additional flat charges 224c, 224d are placed on the mandrels 226a, 226b, overlying the flat charges 224a, 224b that have been previously formed. These additional flat charges 224c, 224d are likewise formed, resulting in the formation of a first preform 264 and a second preform 266, which form the L-shaped sections 248 of the stringer preforms 74 (FIG. 32).

Figure 38:
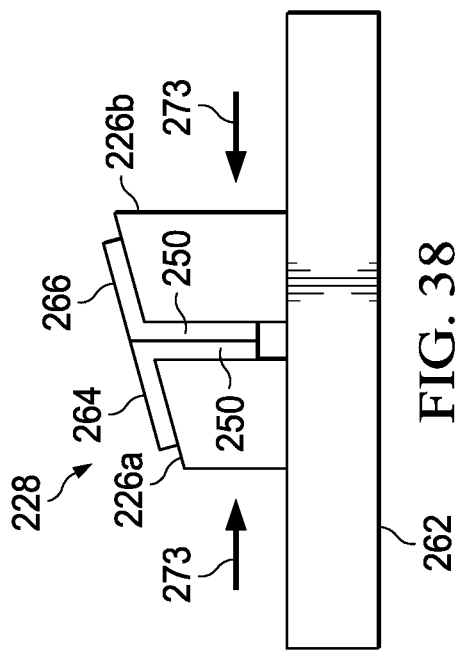
Figure 40:
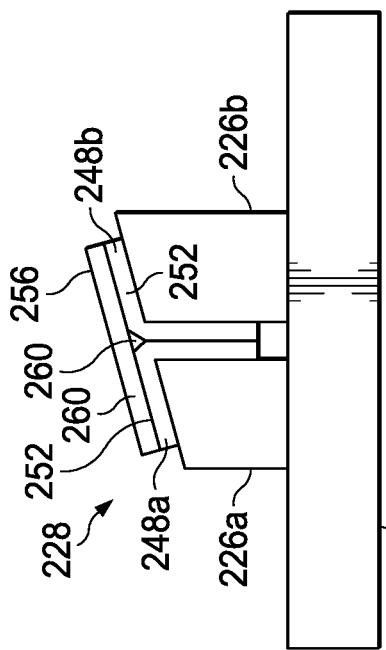
Figure 37:
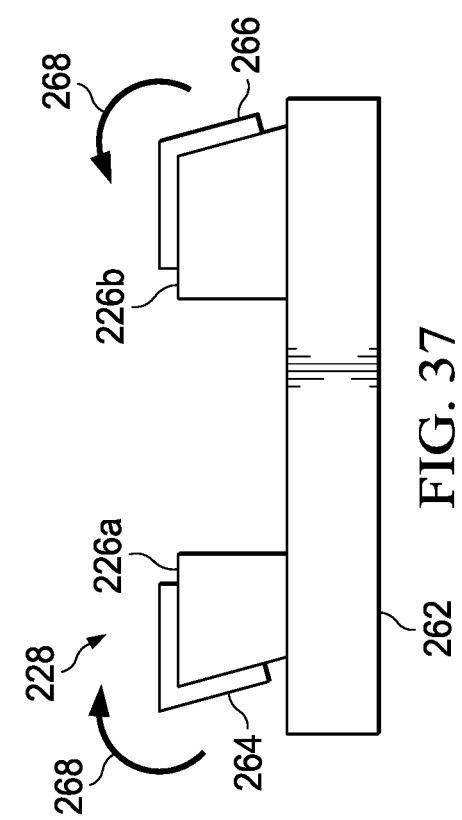
Figure 39:
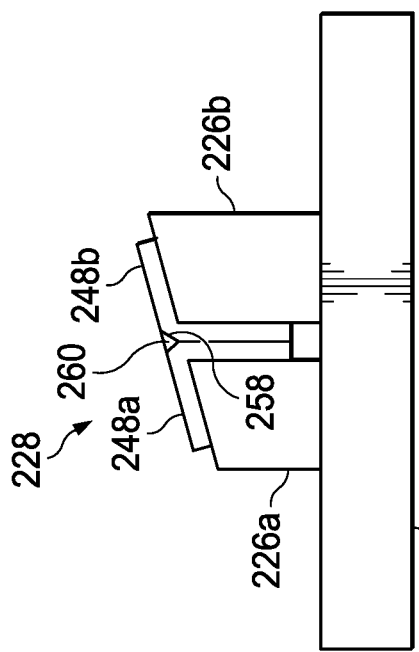

Referring to FIG. 37, the mandrels 226a, 226b along with the first and second preforms 264, 266 are turned 268 90° respectively in clockwise and counterclockwise directions. Next, as shown in FIG. 38, the mandrels 226a, 226b are drawn 273 together, thereby forcing the blade portions 250 of the first and second preforms 264, 266 into to face-to-face contact. Referring to FIG. 39, a noodle 260 is placed in the gap 258 between the two L-shaped sections 248a, 248b. Then, as shown in FIG. 40, a base cap 256 is placed on the flange portions 252, overlying the noodle 260, thereby completing fabrication of the stringer preform 74. At this point, the mandrels 226a, 226b are moved apart, allowing the stringer preformed 74 to be removed from the forming station 228 and placed in a tray 230 on one of the stringer feeder lines 134 (FIG. 4, 29, 30).

Attention is now directed to FIG. 41, which illustrate a method of placing the sections 73 of a stringer preform 74 on a wing skin 86 at a single workstation 96 using multiple placement machines to place the sections 73. In this example, multiple PNPs 132a-132h are positioned on opposite sides of the moving track 89 at the workstation 96. The PNPs 132a-132h receive stringer sections 73 JIT from respectively associated stringer feeder lines 134a-134h. Each of the PNPs 132a-132h places one of the stringer sections 73 such that an entire stringer preform 74 extending over the entire length of the wing skin 86 is simultaneously placed, thereby increasing production efficiency. Moreover, by using two sets of PNPs 132a, 132c, 132e, 132g, and 132b, 132d, 132f, 132h to place the section 73 of the stringer perform 74, two full length stringer preforms 74 can be placed on the wing skin 86 at the same time or sequentially, thereby further increasing production efficiency. Additional ones of the stringer preforms 74 are placed on the wing skin 86 in this manner, moving in the chord-wise direction 66 of the wing skin 86 until all of the stringer preforms 74 have been placed.

The placement location of the stringer sections 73 may be determined by the controller 162 (FIG. 17) which controls operation of the PNPs 132a-132h. The location of the wing skin preforms 86 is indexed to the mandrels 90, consequently the controller 162 "knows" where to instruct the PNPs 132a-132h to place the stringer sections 73 on the wing skin preforms 86. This "knowledge" used by controller 162 consists of relative location information that is achieved though indexing. The mandrel 90 is indexed to the PNP workstation 96 and the wing skin preform 86 is indexed to the mandrel 90, consequently the controller 162 knows where the wing skin preform 86 is in space at the PNP workstation 96, and therefore knows where to place each stringer section 73 on the wing skin preform 86. In other words, the mandrels 90, the composite wing skin preforms 86 and the composite stringer preforms 74 are indexed relative to each other such that the composite wing skin preforms 86 are laid up at indexed positions on the mandrels 90 and the composite stringer preforms 74 are placed at indexed positions on the composite wing skin preforms 86. As the stringer sections 73 are placed, they are connected together by splices 76 suitable for the application, such as by butt joints, lap joints or scarf joints, to name only a few.

Figure 42:
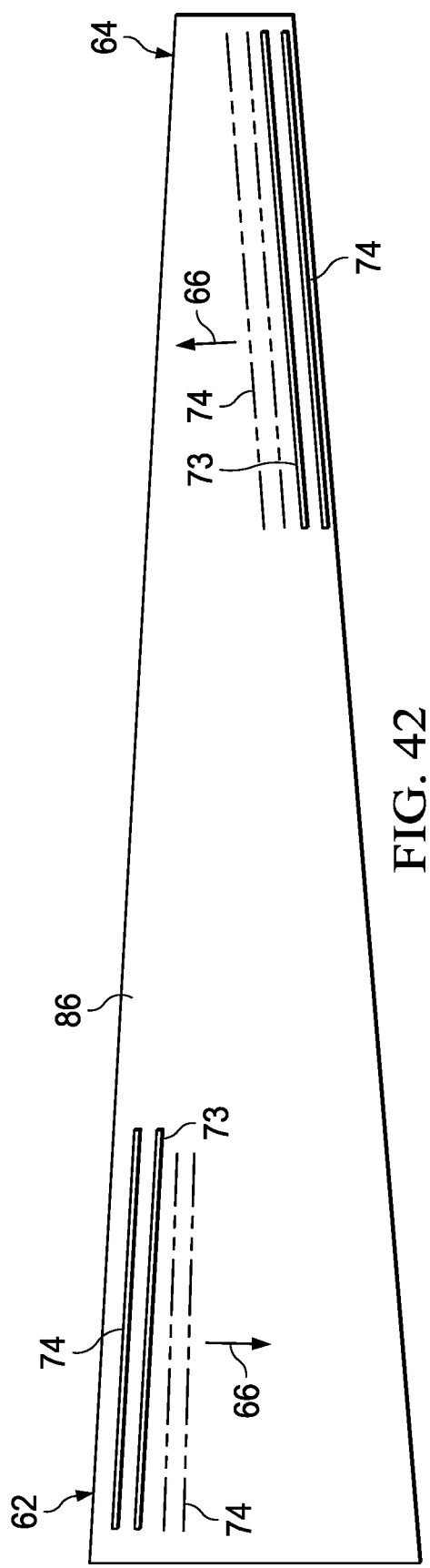
FIG. 42 is an illustration of a diagrammatic plan view of a wing skin showing how stringer preform sections can be placed in a chord-wise order.

Referring to FIG. 42, sections 73 of the stringer preforms 74 may be placed on the wing skin preform 86 successively in a chord-wise direction or order 66. The sections 73 may be placed in this manner beginning at any location along the span of the wing skin 86. For example, sections 73 of the stringer preforms 74 can be placed in the chord-wise direction 66 at the same time, for example during a pause sat both the inboard end 62 and the outboard end 64 of the wing skin 86.

Figure 43:
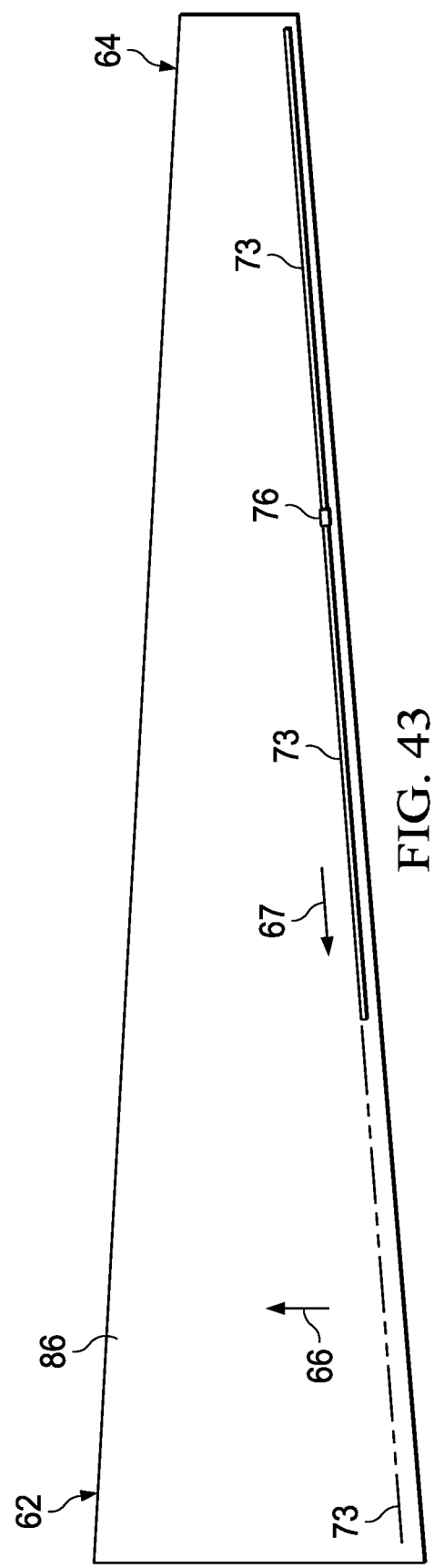
FIG. 43 is an illustration of a diagrammatic plan view of a wing skin showing how stringer preform sections can be placed in a span-wise order.

Referring to FIG. 43 sections 73 of a stringer preform 74 may be successively placed a span-wise order 67, following which splices 76 may be added to connect the sections 73. In some examples, sections 73 of the stringer preforms 74 may be placed in any predetermined order. For example, some stringer sections 73 may be placed in a span-wise order 67, while simultaneously, others are being placed in a chord-wise order 66. As in the example shown on FIG. 37, the stringer sections 73 are connected together by splices 76 as they are placed.

Figure 44:
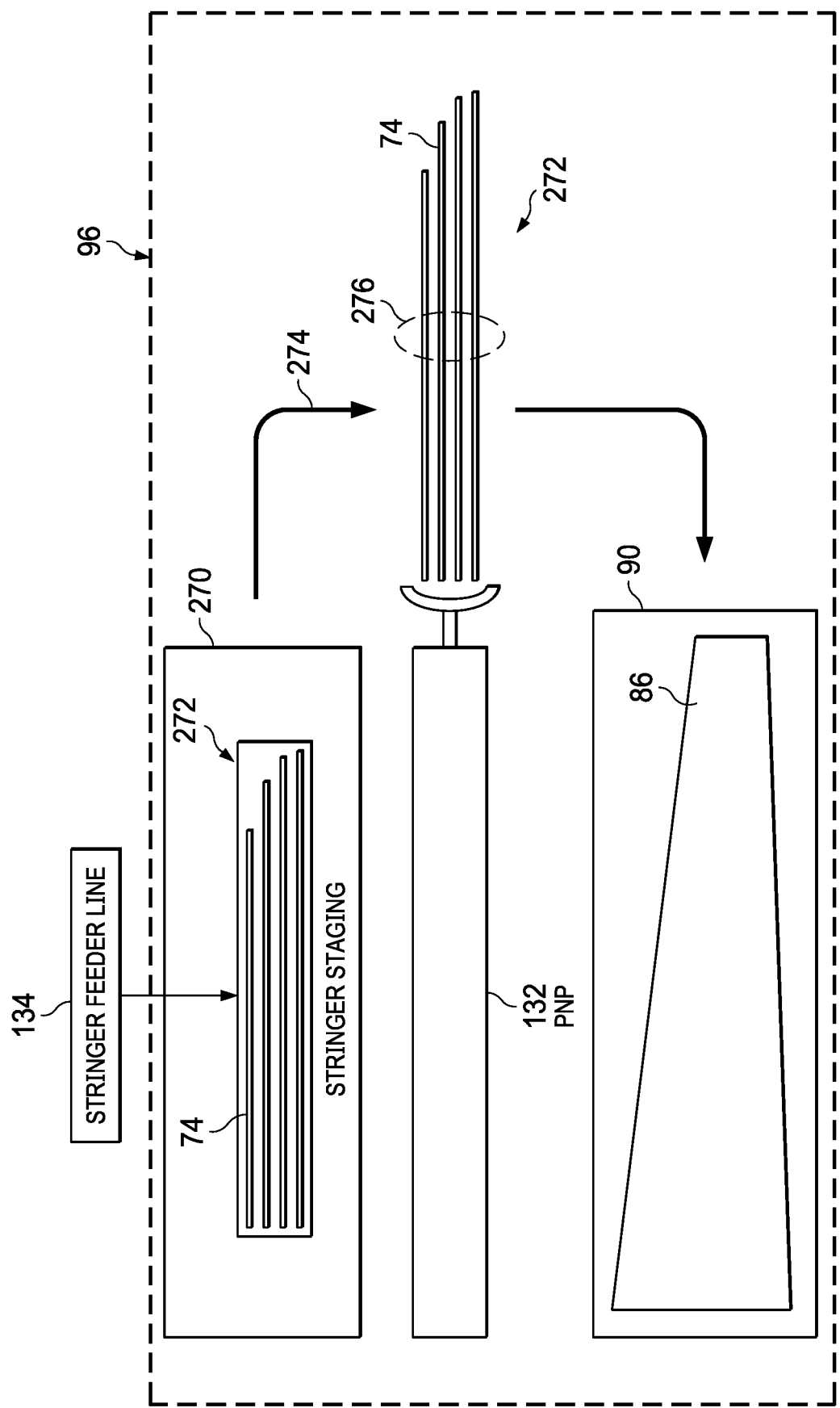
FIG. 44 is an illustration of a combined block and diagrammatic view showing how a group of stringer preforms can be placed on a wing skin by a single pick-and-place machine.

Attention is now directed to FIG. 44 which illustrates another method of placing stringer preforms 74 on a wing skin preform 86. In this example, an entire set or group or "batch" 272 of the stringer preforms 74 is placed on the wing skin preform 86 in a single placement operation. Each of the sets 272 of stringer preforms 74 may be comprise stringer sections 73 which are spliced together after they are placed, or they may comprise full length stringer preform 74 that span the entire length of the wing 54. In some examples, all of the stringer preforms 74 for a wing panel 75 may be placed on the wing skin preform 86 as a single batch. The single batch may include stringer sections 73 or may comprise full length stringer preforms 74, or any combination of stringer sections 73 and stringer preforms 74.

Stringer preforms 74 are supplied by a stringer feeder line 134 to a stringer staging 270 area where they are held, for example, in a tray (not shown) in readiness be picked up and placed. A PNP machine 132 at the workstation 96 picks up all of the stringer preforms 74 in the group 272 at the same time. The PNP machine 132 transfers 274 the group 272 of stringer preforms 74 to the location of a mandrel 90 and places them on the wing skin preform 86 as a group at locations on the wing skin preform 86 determined by the controller 162 (FIG. 17). The positions of stringer preforms 74 relative to each other may be prearranged for indexed placement while at the stringer staging area 270 As will be discussed below in more detail, the stringer preforms 74 have specially configured physical features such as parallel stringer blades 244 (FIG. 32) that allow them to be picked up at as batch, rather than requiring that they be picked up individually.

Figure 47:
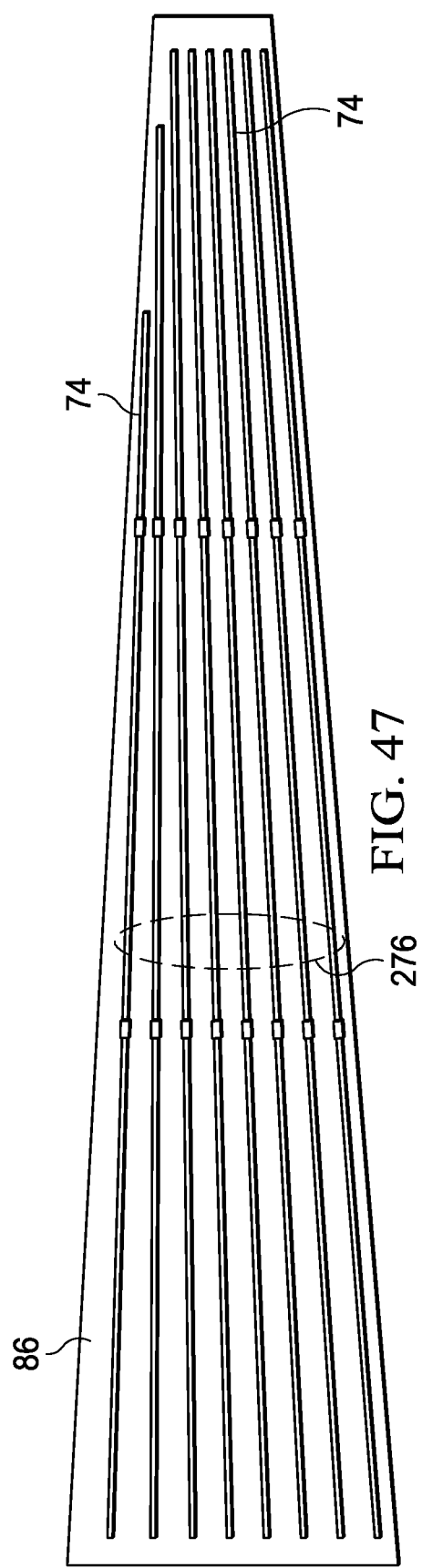
FIG. 47 is an illustration of a combined block and diagrammatic view showing how all of the stringer sections can be placed on a wing skin together at the same time.

FIG. 45 shows a group 272 of the stringer preforms 74 having been placed on the wing skin 86 at the outboard end 64, according to the method explained above with reference to FIG. 44. In this example, the group 272 of stringer preforms 74 spans the entire width of the wing skin 86 in the chord-wise direction 66. In other examples, the group 272 may span only a portion of the width of the wing skin 86. As shown in FIG. 46, groups 272a, 272b of the stringer preforms 74 may be successively placed end-to-end in the span-wise direction 67 and joined together by splices 76. In still other examples, as shown in FIG. 47, all 276 of the stringer preforms 74 for an entire wing panel 75 may be placed as a single group 272 on a wing skin preform 86.

Figure 48:
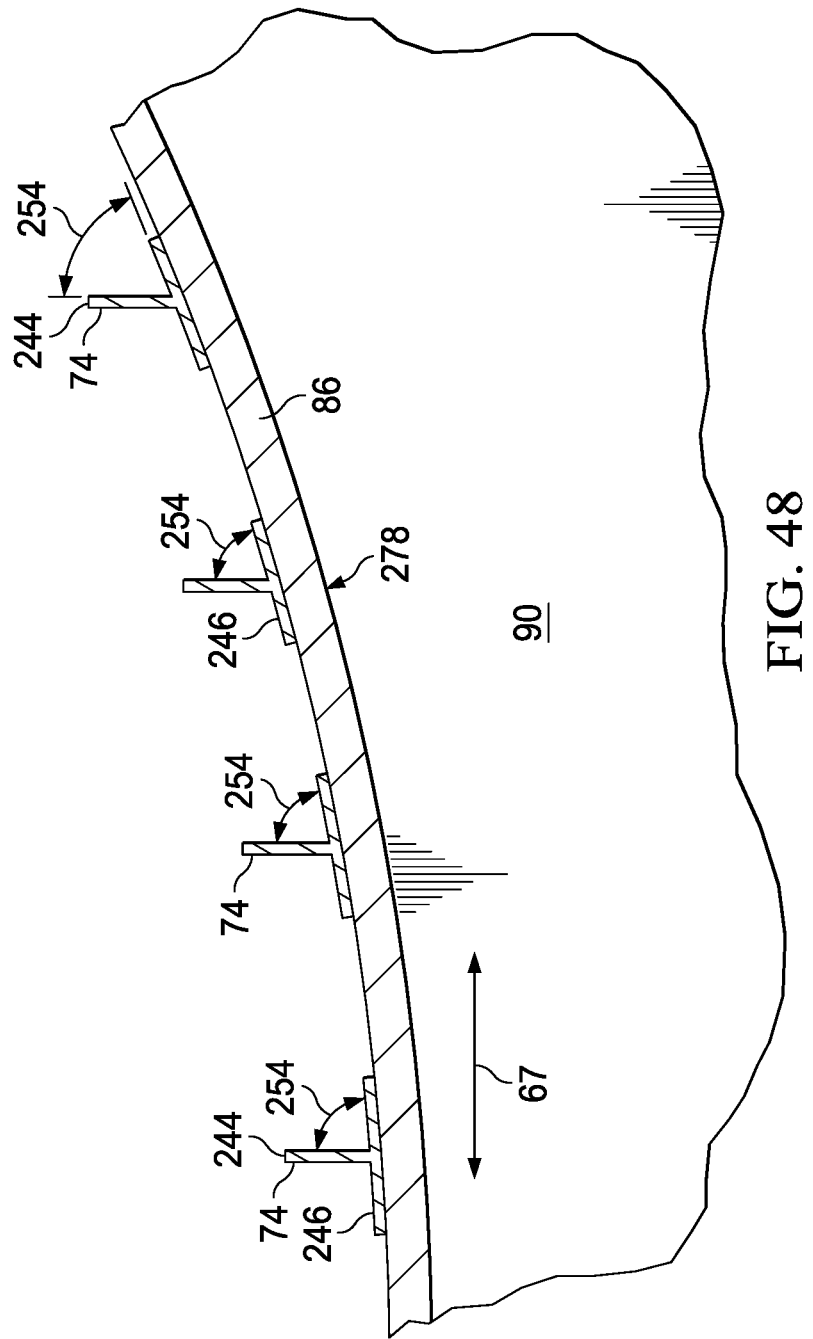
FIG. 48 is an illustration of a fragmentary, cross sectional view of a portion of a mandrel having a wing skin laid up thereon, showing the angularity of stringer preforms that have been placed on the wing skin.
Figure 49:
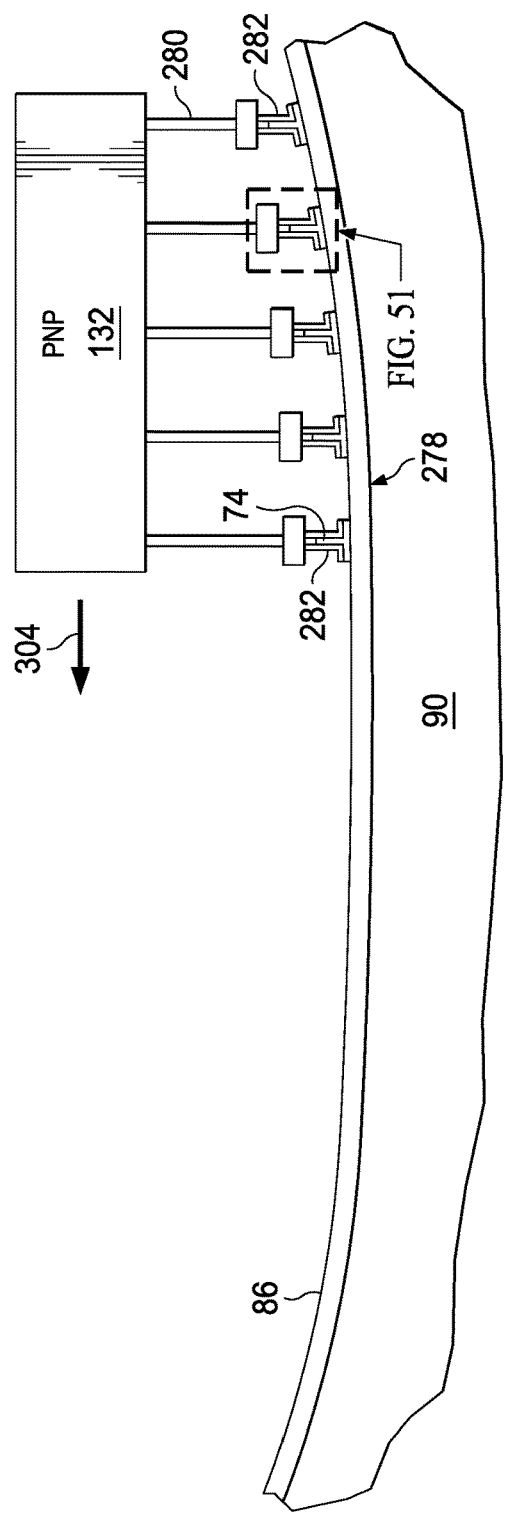
FIGS. 49 and 50 are illustrations of combined block and diagrammatic views showing how a single pick and place machine successively places groups of stringer preforms on a wing skin in a chord-wise direction.
Figure 50:
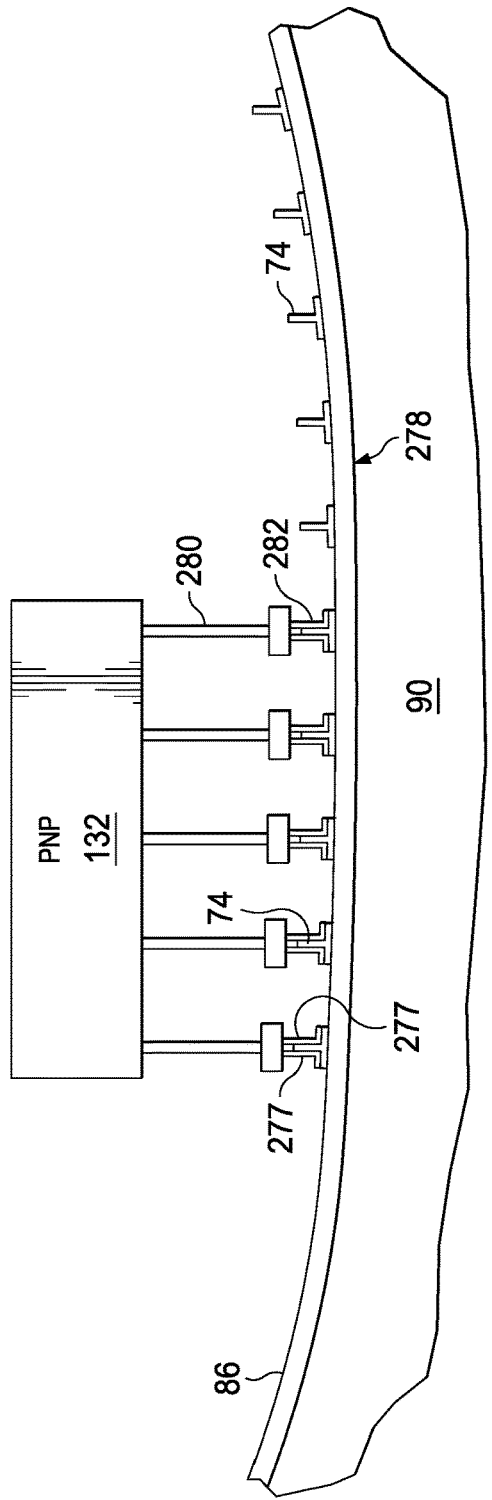

Referring now to FIGS. 48-51, wing skin preforms 86 typically have a curvature 278 in the chord-wise direction 66 which may vary along the span of the wing. Although not shown in the figures, the wing skin preforms 86 may also have a curvature 278 in the span-wise direction 67 (FIG. 12). As shown in FIG. 48, stringer preforms 74 of the inverted T-type discussed previously may be placed individually or in groups on a wing skin preform 86 by one or more PNPs 132. During placement, the stringer preforms 74 are indexed and aligned with the wing skin preform 86 and the mandrel 90. When placed, the base 246 of the stringer preforms 74 follow the curvature 278 of the wing skin preform 86, while the blades 244 all extend in the same direction, parallel to each other. The parallel orientation of the blades 244 allows the PNPs 132 to pick up and place the stringer preforms 74 without the need for adjusting the angular orientation of each stringer preforms 74 to match the curvature 278. The parallel blades 244 allow for easier pickup and holding by the PNPs 132 as well as easier separation from the stringer preforms 74 when they are placed on the wing skin preforms 86 in batches.

Figure 53:
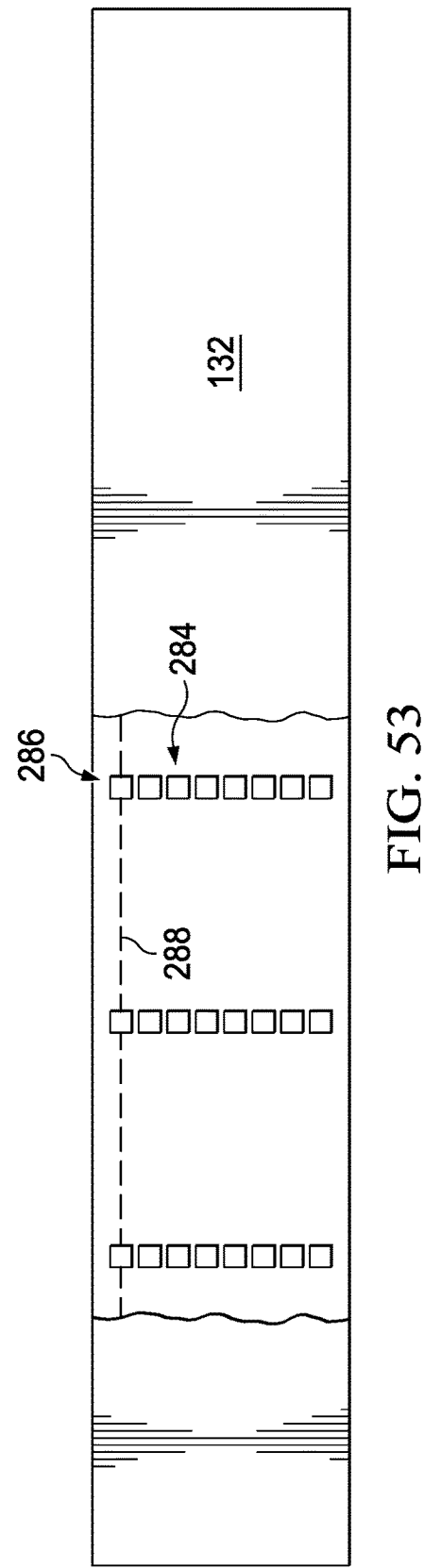
FIG. 53 is an illustration of a diagrammatic plan view of a pick-and-place machine, portions being broken away to show how pickup arms may be arranged in rows and columns.

FIGS. 49-53 show a PNP 132 having a plurality of vertically displaceable arms 280 that are linearly aligned (see FIG. 53). Attached to the bottom of the arms 280 is a gripper 282 capable of grasping and carrying a stringer preform 74. In one example shown in FIG. 51, the gripper 282 comprises a pair of spaced apart, opposing carrier members 277 between which a stringer preform 74 may be gripped. Each of the carrier members 277 is generally L-shaped in cross section, and includes a network of internal passageways 283 that terminate in openings 281 facing the blade 244, as well as the base 246 of the stringer preform 74. The internal passageways 283 are coupled with a suitable vacuum source (not shown) which selectively evacuates the internal passageways 283, creating a vacuum at the openings 281 that draws the blade 244 and/or the flange portions 252 against the carrier members 277, enabling the carrier members 277 to grip, pick up and then place the stringer preform 74 at an indexed location on the wing skin preform 86. In the illustrated example, the carrier members 277 extend the entire length of the stringer preform 74, however in other examples, the carrier members 277 may comprise sections that are spaced apart along the length of the stringer preform 74. A variety of other types of mechanical and pneumatic grippers are possible that may be used to grip the blades 244 and/or the flange portions 252 of the stringer preforms 74.

During a placement sequence, the PNP 132 moves to a position (FIG. 49) in which the arms 280 are aligned above and along the blade 244 of a stringer preform 74. The arms 280 then move down and the grippers 282 grasp the stringer preform 74 by the blade 244 and/or the base 246, allowing the stringer preform 74 to be picked up and transported to an indexed placement position overlying the wing skin preform 86. The arms 280 and/or the PNP 132 move downwardly, causing the stringer preform 74 to be placed on the wing skin 86. The grippers 282 then release the blade 244, allowing the PNP 132 to move back to a starting position in readiness to pick up another stringer preform 74.

Figure 51:
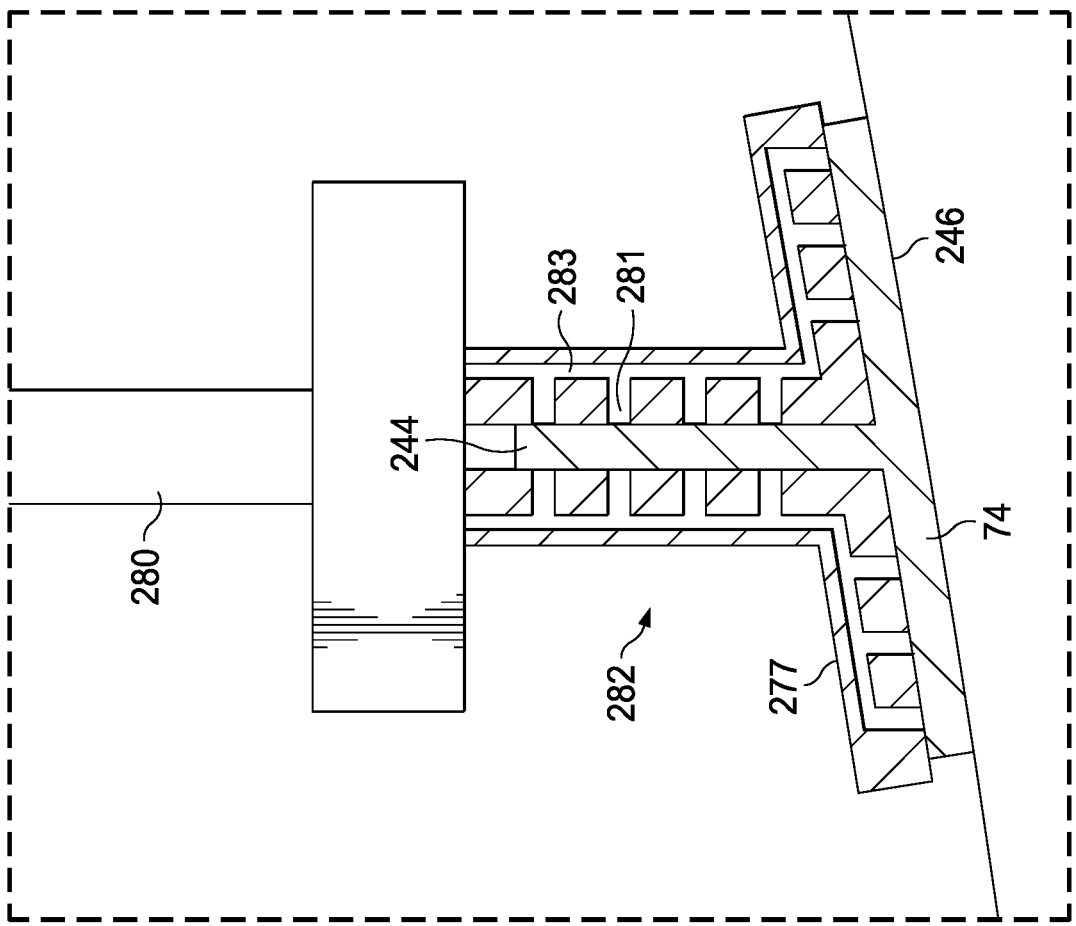
FIG. 51 is an illustration of the area designated as "FIG. 51" in FIG. 49.
Figure 52:
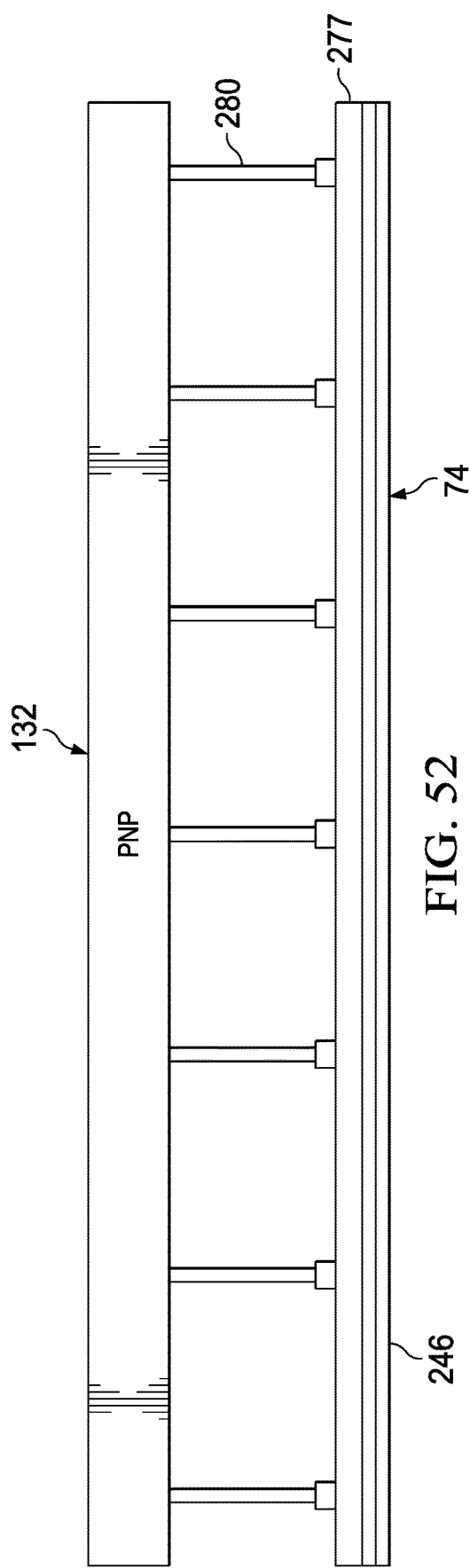
FIG. 52 is an illustration of a side elevational view of a pick-and-place machine showing how a stringer preform is picked up.

In the example shown in FIG. 51, release of the stringer preform 74 during stringer placement is achieved by releasing the vacuum which holds the stringer preform 74 against the carrier members 277. It may also be desirable in some applications to apply positive air pressure at the openings 281 in the carrier members 277 that forces release of the stringer preforms 74 from the grippers 282. In effect the grippers 282 are releasable couplings that use a negative air pressure or vacuum to grip the stringer preform 74, and a positive air pressure to releases the stringer preform 74 and push it away. The angular orientation of the arms 280 need not be adjusted to compensate for the curvature 278 (FIG. 48) of the wing skin preform 86 since compensation for the curvature 278 is "built-in" to the design of the stringer preforms 74. The blades of the stringer preforms 74 remain parallel to each through the pickup and placement sequence.

In the example just described, the PNP 132 picks up and places a single stringer preform 74. However, it is possible to pick up and place multiple stringer preforms 74, either sequentially or at the same time using multiple PNPs 132 of the type having multiple grippers 282 that grip a blade 244 along its length. In other examples, as shown in FIG. 53, one or more of the PNPs 132 may have an array of the arms 280 and grippers 282 that are arranged in rows 284 and columns 286 capable of picking up and placing a group of the stringer preforms 74 simultaneously. In this example, each row 284 of the grippers 282 picks up the blade a blade 244 and/or base 246 of one of the stringer preforms 74.

Figure 54:
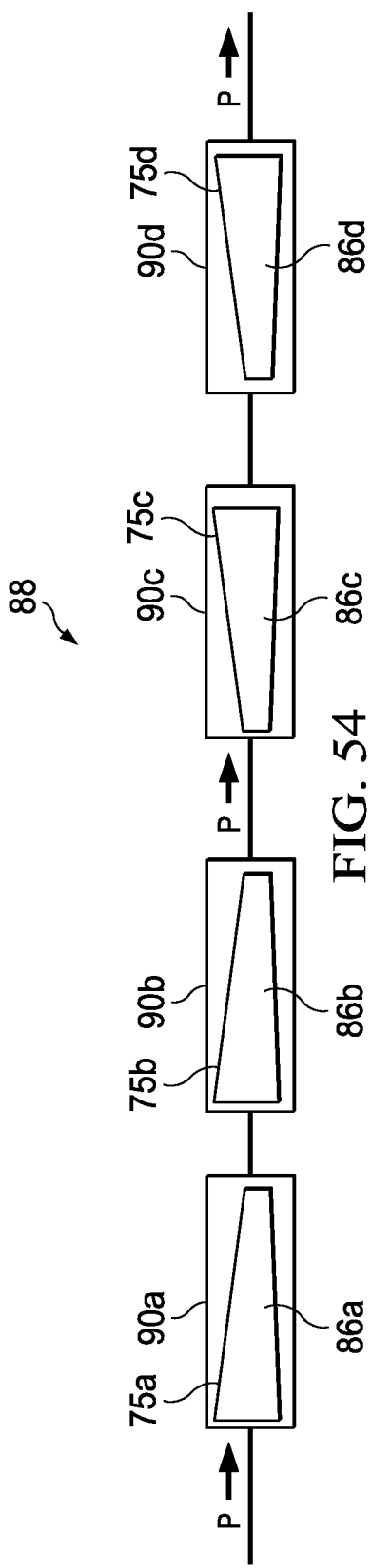
FIG. 54 is an illustration of is a diagrammatic plan view showing how all four wing panels of an airplane's wings can be produced on the same production line.

Referring now to FIG. 54, as previously mentioned in connection with FIGS. 1 and 2, each of the wings 54 comprises upper and lower wing panels 84, 85. Consequently, a pair of wings (port and starboard sides) comprises four wing panels 75a-75d that are differently configured from each other in shape and/or contour, or have other functional differences. All four of these wing panels 75a-75d may be produced on the same production line 88, and in any desired order, serially. It may also be possible to have more than one model of a wing panel 75 produced on the same production line 88, and arranged serially. Indexing of the mandrels 90, and thus of the model of the wing panel 75, is achieved by the controller 162 (FIG. 17). In other words, the controller 162 "knows" which model of a wing panel 75 is to be made on each mandrel 90 and instructs each workstation what work needs to be performed on a particular mandrel 90 for the particular model produced on that mandrel 90. In other examples, indexing may be achieved using other techniques such as any of those previously discussed. For example, the mandrels 90 may have indexing features 141 (FIG. 15) thereon that identify the type of wing panel 75a-75d and the work to be performed on that wing panel 75a-75d.

As shown in FIG. 54, 4 wing skins 86a-86d are respectively laid up on four different mandrels 90a-90d. The mandrels 90a-90d respectively possess contours (not shown in FIG. 54) that match the wing panel 75 of which it forms a part. In the illustrated example, wing skins 86a and 86b respectively form part of the upper and lower wing panels 75 of a starboard wing 54 (FIG. 1), while wing skins 86c, 86d form part of the upper and lower wing panels 75 of a port wing 54. While the wing skins 86a-86d are shown being produced in a group and in succession on the production line 88, they may be produced in other orders, or mixed with other types of wings panels 75. Thus for example, production of the wing panels 84 of one aircraft, may be mixed with production of the wing panels 84 of another aircraft.

Figure 55:
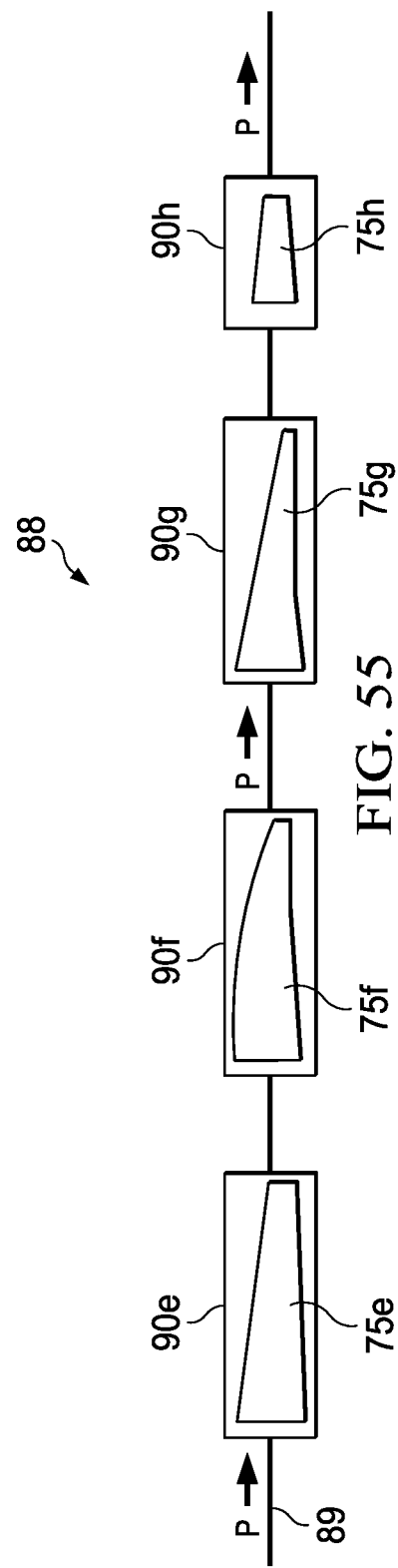
FIG. 55 is an illustration of a diagrammatic plan view showing how differently configured wing panels can be produced on the same production line.
Figure 56:
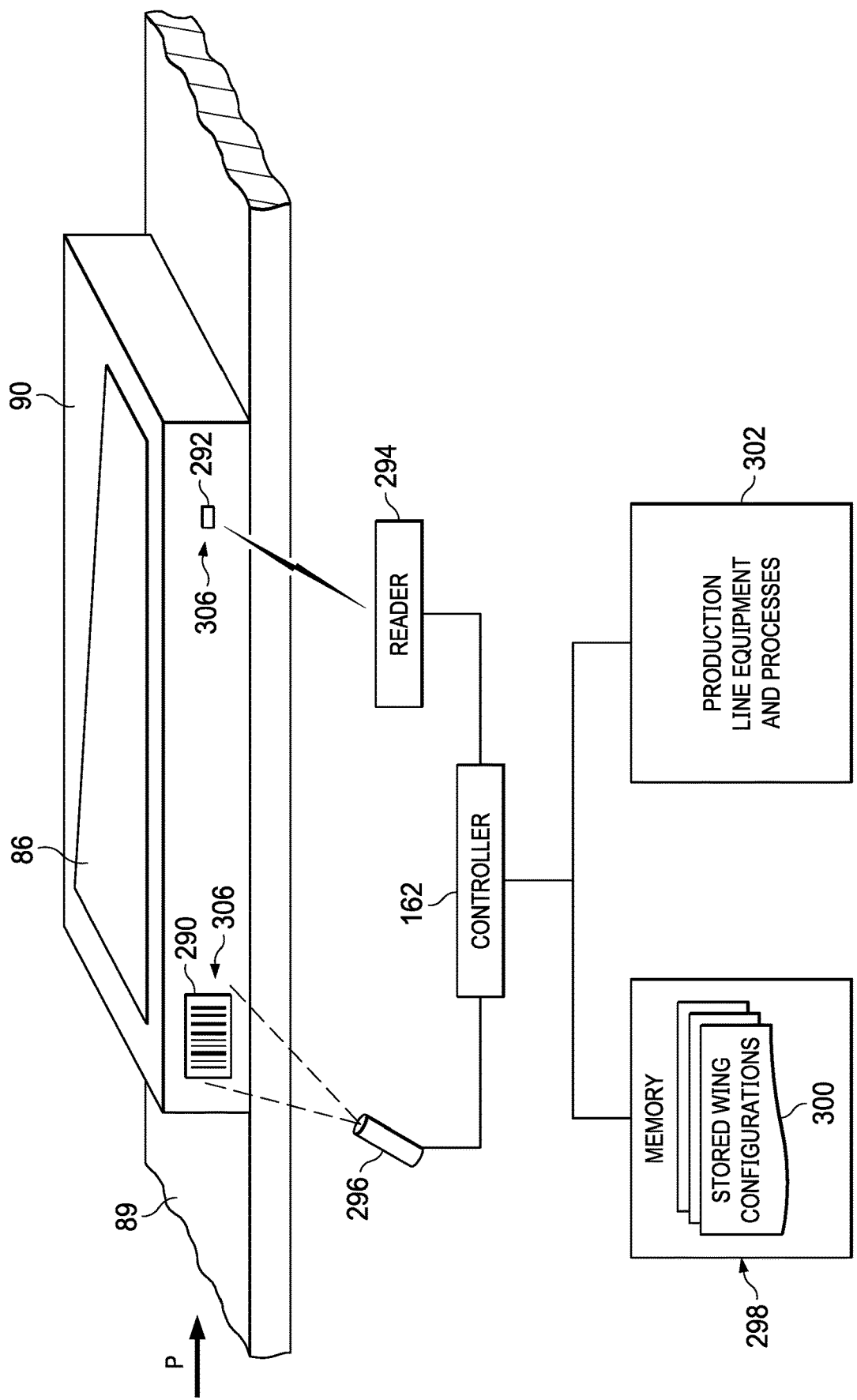
FIG. 56 is an illustration of a combined block and diagrammatic view showing how mandrels can be identified and associated with differing wing configurations.

FIG. 55 illustrates how wing panels 75 having different shapes for different applications can be produced on the same production line 88. For example, wing panels 75e-75g have differing shapes suitable for wings of different aircraft may be respectively made on mandrels 90e-90g traveling along the same production line 88. Wing panel 75h forming part of a horizontal or vertical stabilizer 56, 58, respectively may be made on mandrels 90e, and produced along with wing panels of the same or different aircraft.

In order to produce different wing panels 75 for the same or different aircraft on the same production line 88, it may be necessary to identify and/or track the mandrels 90 that are unique to each type of wing panel 75. FIG. 566 illustrates one arrangement to identify each mandrel 90 in order that the correct wing skin preform 86 and stringer preforms 74 are assembled on the correct mandrel 90 traveling along a production line 88. Mandrel 90 may be provided with a suitable form of indicia 306 that uniquely identifies the mandrel 90. In one example, the indicia 306 may comprise a barcode 290 that may be read by an optical or other type of barcode reader 296.

In another example, the indicia 306 may comprise an RFID (radio frequency identification device) tag 292 that is be read by a suitable RFID reader 294. In some examples, either the mandrel 90, or a manufacturing excess 137 (FIG. 15) on the wing skin preform 86 that has been laid up on the mandrel 90 may also include indexing features 141 that convey indexing information to one or more of the workstations. This indexing information may be coupled to the workstation by a suitable coupling device that may be a reader, such as readers 294, 296. In the case of indexing information that has been placed on an excess of the wing skin preform 86, the indexing information is removed when the manufacturing excess is no longer needed and is removed.

In either case described immediately above, the information that is read is delivered to a controller 162, which may include one or more processors (not shown) and suitable software for processing this information, and associating the mandrel 90 with wing configurations 300 that are stored in a memory 298. Based on the wing configuration 300 that is associated with a particular mandrel 90, the controller 162 instructs production line equipment (e.g. laminators 124 and PNPs 132) 302 to produce the corresponding wing panel 75 using the related mandrel 90. The indexing features described above may also be used to track the "bits" that are being supplied to the workstation for incorporation into the wing skin preform 86, or as part of the work that is performed at downstream workstations such as bagging and post-cure operations.

Figures 57, 58:
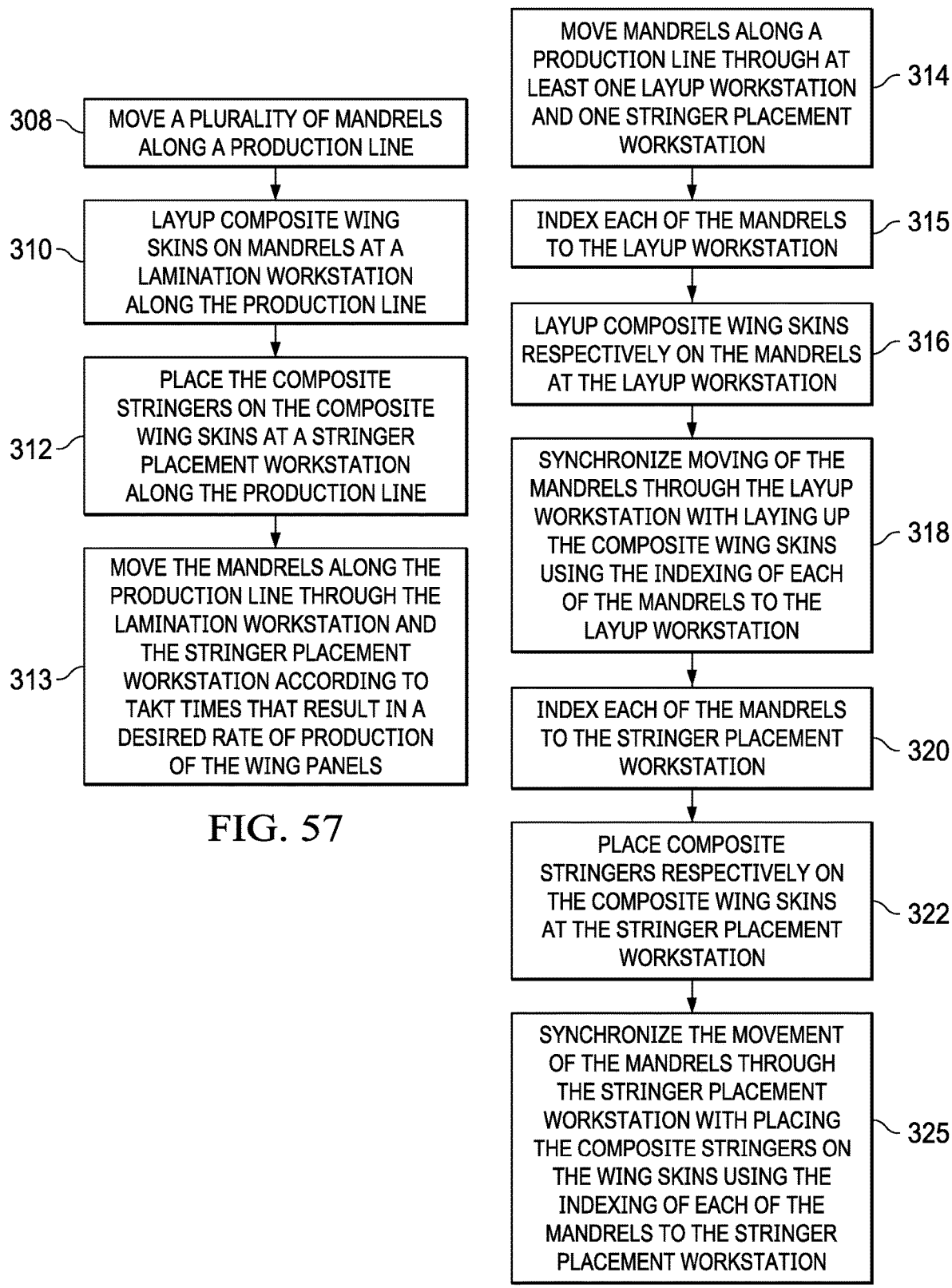
FIG. 57 is an illustration of a flow diagram of a method of making wing panels for an aircraft.
FIG. 58 is an illustration of a flow diagram of a method of making wing panels for an aircraft.

Attention is now directed to FIG. 57, which broadly illustrates the steps of a method of making wing panels 75 on a production line 88. At 308, a plurality of mandrels 90 are moved in a process direction P along a production line 88. The mandrels 90 may be moved along the production line 88 continuously or incrementally, either in pulses or micro-pulses. At 310, composite wing skins 86 are laid up on the mandrels 90 at a lamination workstation 92 along the production line 88. The composite wing skins 86 may be laid up on the mandrels 90 as the mandrels 90 are moving either in pulses or micro-pulses or continuously, or during pauses between the pulses or micro-pulses. At 312, composite stringers are placed on the composite wing skins at a stringer placement workstation 96 along the production line. At 313, the mandrels 90 are moved along the production line 88 through the lamination workstation 92 and the stringer placement workstation 96 according to takt times that result a desired rate of production of the wing panels 75.

FIG. 58 broadly illustrates a method of making wing panels. Beginning at 314, mandrels 90 are moved along a production line 88 through at least one lamination workstation and one stringer placement workstation. In some examples however, the mandrels 90 are moved through more than these two workstations. At 315, each of the mandrels 90 is indexed to the lamination workstation. At 316, composite wing skins 86 are laid up on the mandrels 90 at the lamination workstation as the mandrels 90 move through the lamination workstation. At 318, movement of the mandrels through the lamination workstation is synchronized with laying up the composite wing skins using the indexing of each of the mandrels to the lamination workstation. At 320, each the mandrels 90 is indexed to the stringer placement workstation. At 322, the composite stringers 74 are placed on the composite wing skins at any stringer placement workstation. At 325, the movement of the mandrels through the stringer placement workstation is synchronized with placing the composite stringers on the wing skins using the indexing of each of the mandrels to the stringer placement workstation.

Figure 59:
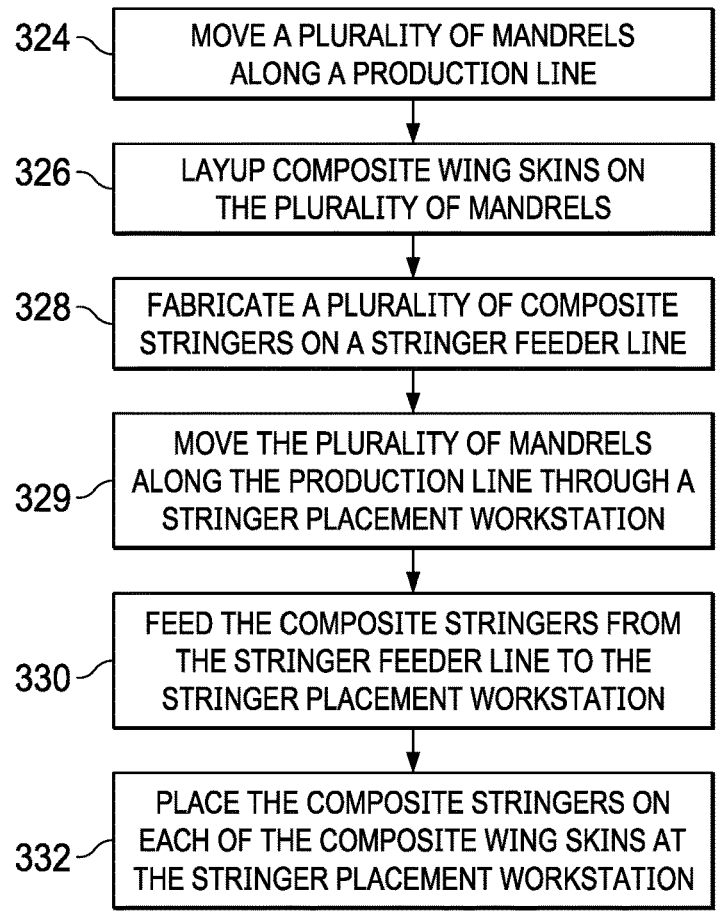
FIG. 59 is an illustration of a flow diagram of a method of making wing panels for an aircraft.

Referring now to FIG. 59, a further method of making wing panels 75 begins at 324 in which a plurality of mandrels 90 are moved along a production line 88. At 326 composite wing skins 86 are laid up on the plurality of mandrels 90. At 328, a plurality of composite stringers 74 are fabricated on a stringer feeder line 134. At 329, each of the mandrels 90 is moved along a production line 88 through a stringer placement workstation. At 330, the composite stringers 74 are fed from the stringer feeder line 134 to the stringer placement workstation. At 332, the composite stringers 74 are placed on the wing skins 86 at the stringer placement workstation as the mandrels 90 move through the stringer placement workstation.

Figure 60:
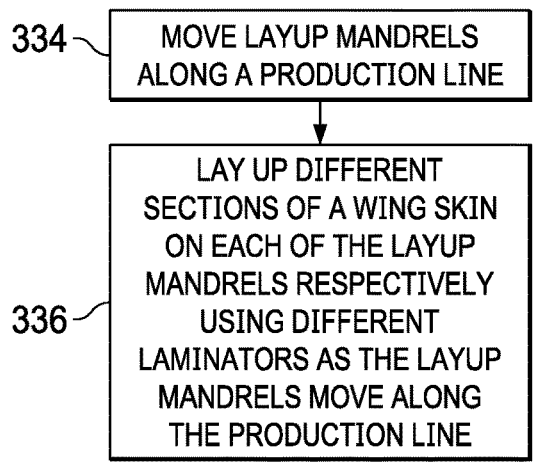
FIG. 60 is an illustration of a flow diagram of a method of making wing panels for an aircraft.

FIG. 60 broadly illustrates the steps of a method of making wing skins 86 for aircraft. Beginning at 334, layup mandrels 90 are moved along a production line 88. At 336, different sections, 213, 214, 216 of the wing skin 86 are laid up on each of the layup mandrels 90 respectively using different laminators 124 as the layup mandrels 90 move along the production line 88.

Figure 61:
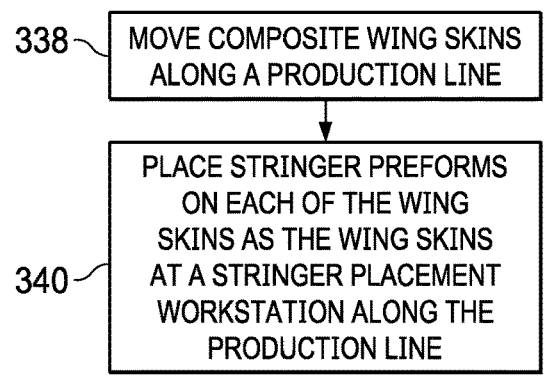
FIG. 61 is an illustration of a flow diagram of a method of making wing panels for an aircraft.

Referring to FIG. 61, a method of making wing panels 75 begins at 338 with moving composite wing skins 86 along a production line 88. At 340, stringer preforms 74 are placed on each of the wing skins 86 at a stringer placement workstation as the wing skins 86 move along the production line 88.

Figure 62:
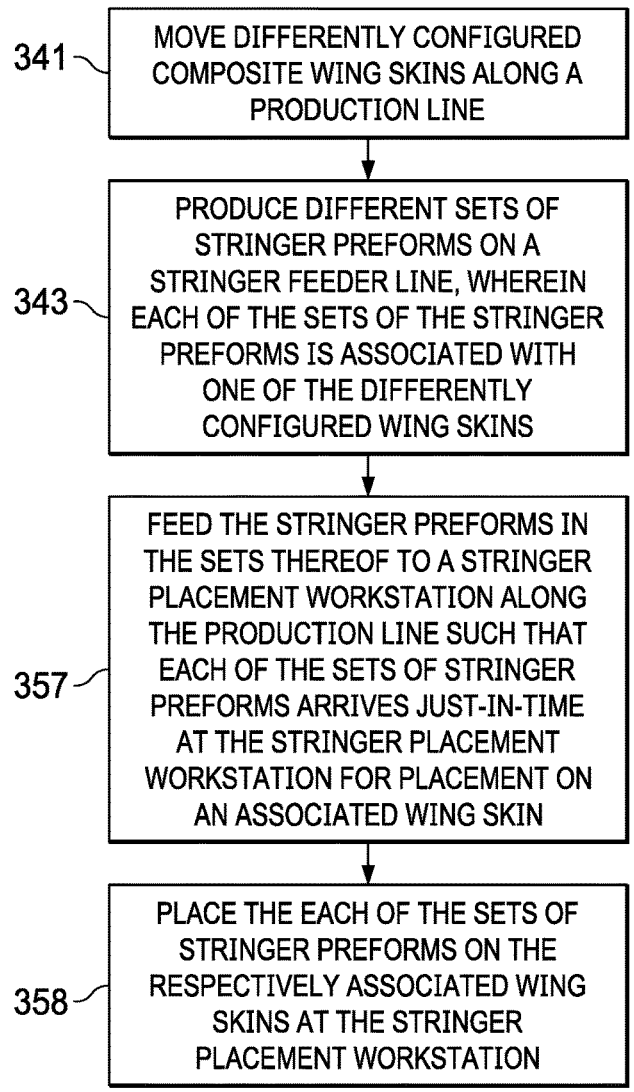
FIG. 62 is an illustration of a flow diagram of a method of making wing panels for an aircraft.
Figure 63:
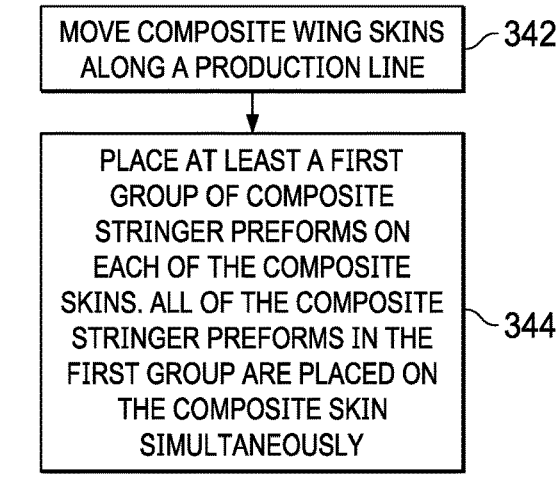
FIG. 63 is an illustration of a flow diagram of another method of making wing panels for an aircraft.

Referring now to FIG. 62, another method of making wing panels 75 begins at 341 where differently configured composite wing skins 86 are moved along a production line 88. As previously discussed in connection with FIGS. 27 and 28, the composite wing skin 86 may be moved fore-to-aft along one segment 257 of the production line 88 and moved aft-to-fore along another segment 263 of the production line 88. At 343, different sets 272 of stringer preforms are produced on a stringer feeder line, wherein each of the sets 272 of the stringer preforms is associated with one of the differently configured wing skins 86. At 357, the stringer preforms are fed in the sets 272 thereof to a stringer placement workstation along the production line 88 such that each of the sets of stringer preforms arrive just-in-time at the stringer placement workstation for placement on the associated wing skin. Feeding the sets 272 of stringer preforms in series maybe performed such they arrive in the order in which they are to be placed, however other orders are possible. Moreover, while it may be efficient in some applications to feed the stringer preforms in sets 272, it may be necessary or desirable in other applications to feed them individually in series or in subsets JIT. At 358, each of the sets 272 of stringer preforms is placed on the respectively associated wing skin at the stringer placement workstation.mo FIG. 63 broadly illustrates the steps of another method of making wing panels 75. At 342, composite wing skins 86 are laid up. At 344, at least a first group 272 of composite stringer preforms 74 are placed on each of the composite wing skins 86. All of the composite stringer preforms 74 of the first group 272 are placed on the composite wing skin 86 simultaneously.

Figure 64:
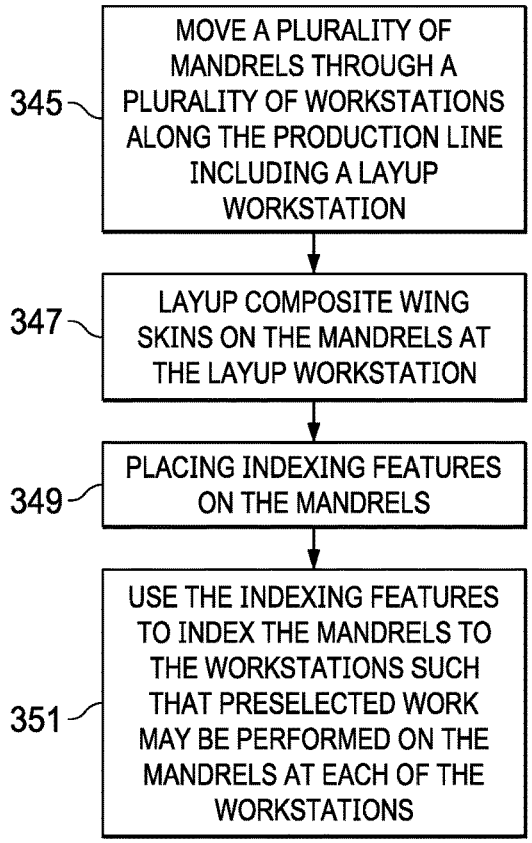
FIG. 64 is an illustration of a flow diagram of a method of making wing panels for an aircraft.

FIG. 64 illustrates the basic steps of a method of making wing panels. At 345, a plurality of mandrels 90 are moved through a plurality of workstations along a production line 88, including a lamination workstation. At 347, wing skins are laid up on the mandrels 90 at the lamination workstation. At 349, indexing features are placed on the mandrels 90. At 351, the indexing features are used to index the mandrels to the workstations such that preselected work may be performed on the mandrels at each of the workstations.

Figure 65:
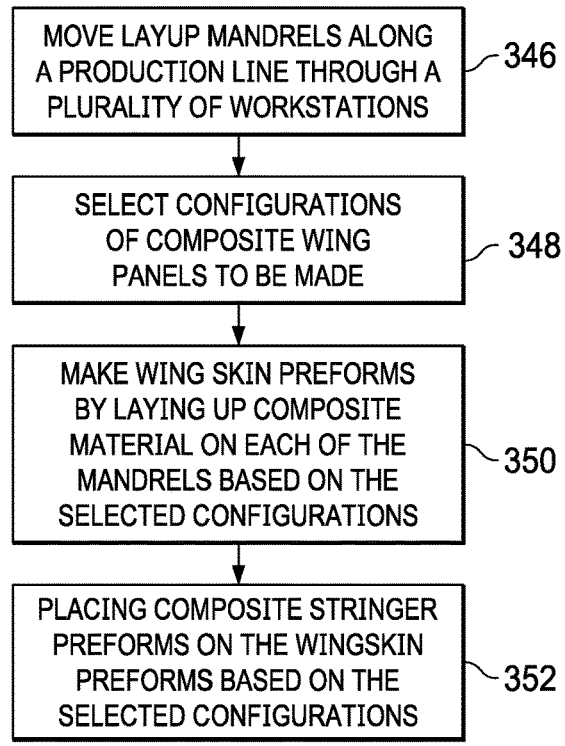
FIG. 65 is an illustration of a flow diagram of a method of making differently configured wing panels.
Figure 66:
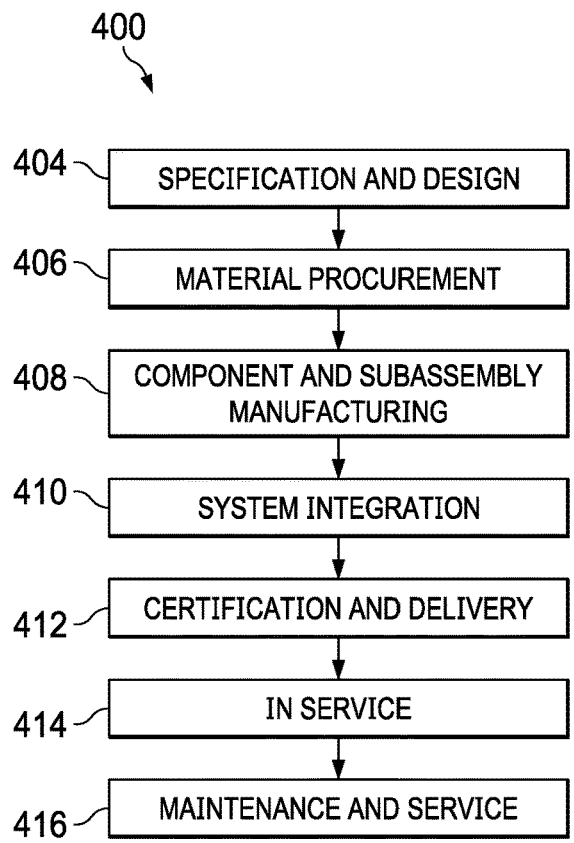
FIG. 66 is an illustration of a flow diagram of aircraft production and service methodology.
Figure 67:
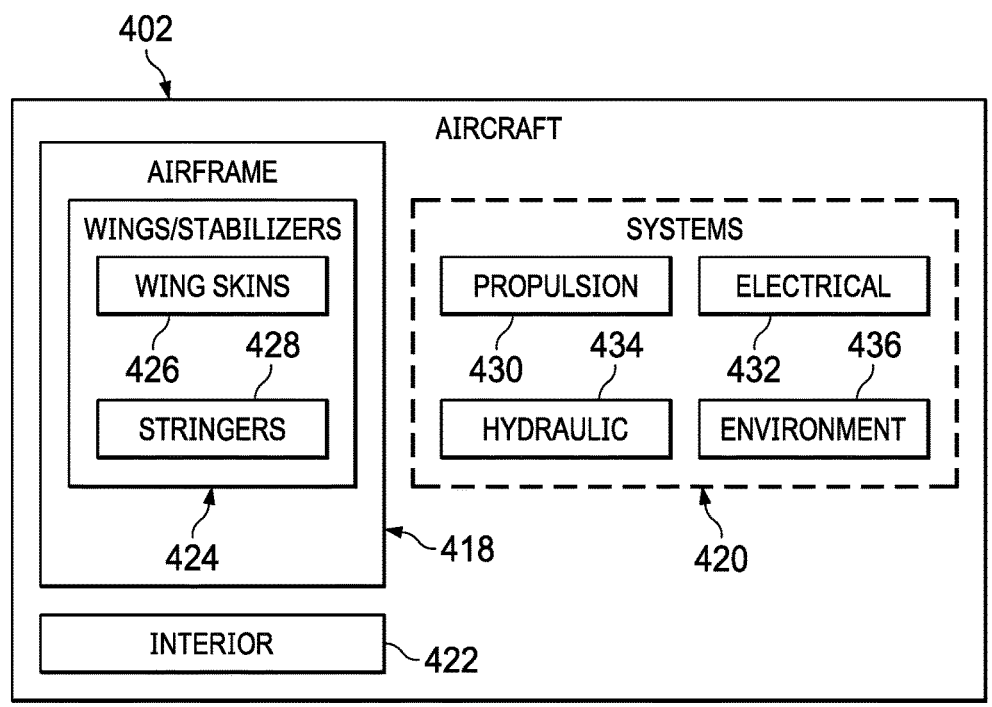
FIG. 67 is an illustration of a block diagram of an aircraft.

FIG. 65 illustrates a method of making a plurality of differently configured composite wing panels 75. Beginning at 346, layup mandrels 90 are moved along production line 88 through a plurality of workstations 92-98. At 348, configurations of wing panels 75 to be made are selected. At 350, wing skins 86 are made by laying up composite material on each of the mandrels 90 based on the selected configurations. At 352, composite stringer preforms 74 are placed on the wing skins 86 based on the selected configurations Examples of the disclosure may find use in a variety of potential applications, particularly in the transportation industry, including for example, aerospace, marine, automotive applications and other application utilizing composite skins reinforced with composite stiffeners. Thus, referring now to FIGS. 66 and 67, examples of the disclosure may be used in the context of an aircraft manufacturing and service method 400 as shown in FIG. 66 and an aircraft 402 as shown in FIG. 67. Aircraft applications of the disclosed examples may include a variety of airfoil type structures such as wings and stabilizers. During pre-production, exemplary method 400 may include specification and design 404 of the aircraft 402 and material procurement 406. During production, component and subassembly manufacturing 408 and system integration. 410 of the aircraft 402 takes place. Thereafter, the aircraft 402 may go through certification and delivery 412 in order to be placed in service 414. While in service by a customer, the aircraft 402 is scheduled for routine maintenance and service 416, which may also include modification, reconfiguration, refurbishment, and so on.

Each of the processes of method 400 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 67, the aircraft 402 produced by exemplary method 400 may include an airframe 418, a plurality of systems 420 and an interior 422. The airframe 418 includes wings and stabilizers 424, each comprising composite wing skins 426 stiffened with composite stringers 428. Examples of high-level systems 420 include one or more of a propulsion system 430, an electrical system 432, a hydraulic system 434 and an environmental system 436. Any number of other systems may be included. Although an aerospace example is shown, the principles of the disclosure may be applied to other industries, such as the marine and automotive industries.

Systems and methods embodied herein may be employed during any one or more of the stages of the aircraft manufacturing and service method 400. For example, components or subassemblies corresponding to production process 408 may be fabricated or manufactured in a manner similar to components or subassemblies produced while the aircraft 402 is in service. Also, one or more apparatus examples, method examples, or a combination thereof may be utilized during the production processes 408 and 410, for example, by substantially expediting assembly of or reducing the cost of an aircraft 402. Similarly, one or more of apparatus examples, method examples, or a combination thereof may be utilized while the aircraft 402 is in service, for example and without limitation, to maintenance and service 416.

As used herein, the phrase "at least one of", when used with a list of items, means different combinations of one or more of the listed items may be used and only one of each item in the list may be needed. For example, "at least one of item A, item B, and item C" may include, without limitation, item A, item A and item B, or item B. This example also may include item A, item B, and item C or item B and item C. The item may be a particular object, thing, or a category. In other words, at least one of means any combination items and number of items may be used from the list but not all of the items in the list are required.

The description of the different illustrative examples has been presented for purposes of illustration and description, and is not intended to be exhaustive or limited to the examples in the form disclosed. Many modifications and variations will be apparent to those of ordinary skill in the art. Further, different illustrative examples may provide different advantages as compared to other illustrative examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A method of making composite wing panels for aircraft, comprising:
    moving a plurality of mandrels along a production line of serially arranged workstations;

laying up composite wing skins on the mandrels at a lamination workstation along the production line as the mandrels move through the lamination workstation;

placing composite stringers on the composite wing skins at a stringer placement workstation along the production line; and moving the mandrels along the production line through the lamination workstation and the stringer placement workstation according to takt times that result in a desired wing panel production rate.

2. The method of claim 1, wherein moving the mandrels through the serially arranged workstations is performed by moving the mandrels continuously along the production line.

3. The method of claim 1, wherein moving the mandrels through the lamination workstation and through the stringer placement workstation is performed incrementally.

4. The method of claim 3, wherein moving the mandrels incrementally includes pulsing the mandrels along the production line.

5. The method of claim 4, wherein laying up the wing skins and placing the stringers is performed between pulses during the pulsing.

6. The method of claim 1, wherein laying up the composite wing skins on the mandrels at the lamination workstation includes laying up different sections of the composite wing skins respectively using separate laminators at the lamination workstation.

7. The method of claim 1, wherein laying up the composite wing skins is carried out in separate lamination workstations along the production line.

8. The method of claim 1, wherein placing the composite stringers on the composite wing skins is carried out in separate stringer placement workstations along the production line.

9. The method of claim 1, wherein placing the composite stringers on the composite wing skins includes using multiple placement machines to place sections of the composite stringers on the composite wing skins.

10. The method of claim 1, further comprising:
producing the composite stringers along a stringer feeder line; and
feeding the composite stringers from the stringer feeder line to the stringer placement workstation, just-in-time.

11. The method of claim 1, including indexing the mandrels to the lamination workstation and to the stringer placement workstation such that the composite wing skins are laid up at indexed positions on the mandrels and the composite stringers are placed at indexed positions on the composite wing skins.

12. The method of claim 11, wherein the indexing includes:
placing at least one indexing feature on at least one of the mandrels and the composite wing skins; and
detecting the indexing feature.

13. A method of making wing panels for aircraft, comprising:
moving mandrels along a production line through at least one lamination workstation and at least one stringer placement workstation arranged serially;
indexing the mandrels to the lamination workstation and;
laying up composite wing skins respectively on the mandrels at the lamination workstation as the mandrels move through the lamination workstation;
synchronizing moving of the mandrels through the lamination workstation with laying up the composite wing skins using the indexing of the mandrels to the lamination workstation;
indexing the mandrels to the stringer placement workstation;
placing composite stringers respectively on the composite wing skins at the stringer placement workstation; and
synchronizing moving the mandrels through the stringer placement workstation with placing the composite stringers on the composite wing skins using the indexing of the mandrels to the stringer placement workstation.

14. A method of making wing panels for aircraft, comprising:
moving a plurality of mandrels along a production line of serially arranged workstations;
laying up composite wing skins respectively on the plurality of mandrels as the mandrels move through a lamination workstation;
fabricating a plurality of composite stringers on a stringer feeder line;
moving the plurality of mandrels along the production line through a stringer placement workstation;
feeding the composite stringers from the stringer feeder line to the stringer placement workstation; and
placing the composite stringers on the composite wing skins at the stringer placement workstation.

15. The method of claim 14, wherein moving the mandrels through the serially arranged workstations is performed by moving the mandrels continuously along the production line.

16. The method of claim 14, wherein moving the mandrels through the lamination workstation and through the stringer placement workstation is performed incrementally.

17. The method of claim 16, wherein moving the mandrels incrementally includes pulsing the mandrels along the production line.

18. The method of claim 17, wherein laying up the wing skins and placing the stringers is performed between pulses during the pulsing.

19. The method of claim 14, wherein laying up the composite wing skins on the mandrels includes laying up different sections of the composite wing skins respectively using separate laminators at the lamination workstation.

20. The method of claim 14, wherein laying up the composite wing skins is carried out in separate lamination workstations along the production line.

21. The method of claim 14, wherein placing the composite stringers on the composite wing skins is carried out in separate stringer placement workstations along the production line.

22. The method of claim 14, wherein placing the composite stringers on the composite wing skins includes using multiple placement machines to place sections of the composite stringers on the composite wing skins.

23. The method of claim 14, including indexing the mandrels to the lamination workstation and to the stringer placement workstation such that the composite wing skins are laid up at indexed positions on the mandrels and the composite stringers are placed at indexed positions on the composite wing skins.

24. The method of claim 23, wherein the indexing includes:
placing at least one indexing feature on at least one of the mandrels and the composite wing skins; and
detecting the indexing feature.

25. A method of making wing skins for aircraft, comprising:
moving layup mandrels along a production line of serially arranged workstations; and
laying up different sections of a wing skin on the layup mandrels, respectively using different laminators as the layup mandrels move along the production line through the different laminators to lay down composite material continuously without interruption as the layup mandrels are moving.

26. A method of making wing panels for aircraft, comprising:
moving a plurality of mandrels along a production line of serially arranged workstations;
laying up composite wing skins on the mandrels as the mandrels move through a lamination workstation; and
placing stringer preforms on the composite wing skins at a stringer placement workstation along the production line as the composite wing skins move along the production line.

27. A method of making different wing panels for aircraft, comprising:
moving a plurality of mandrels along a production line of serially arranged workstations;
laying up different composite wing skins on the mandrels as the mandrels move through a lamination workstation;
producing sets of stringer preforms on a stringer feeder line, wherein each of the sets of the stringer preforms is associated with one of the different composite wing skins;
feeding the sets of stringer preforms to a stringer placement workstation along the production line such that the sets of stringer preforms arrive just-in-time at the stringer placement workstation to be placed on a composite wing skin; and
placing the sets of stringer preforms on the composite wing skins at the stringer placement workstation.

28. A method of making different wing panels for aircraft, comprising:
moving a plurality of mandrels along a production line of serially arranged workstations;
laying up different composite wing skins on the mandrels as the mandrels move through a lamination workstation;
producing stringer preforms on a stringer feeder line;
feeding the stringer preforms individually to a stringer placement workstation along the production line such that individual stringer preforms arrive just-in-time at the stringer placement workstation to be placed on a composite wing skin; and
placing the stringer preforms on the different composite wing skins at the stringer placement workstation.

29. A method of making wing panels, comprising:
moving a plurality of mandrels along a production line of serially arranged workstations;
laying up composite wing skins on the mandrels as the mandrels move through a lamination workstation; and
placing at least a first group of composite stringer preforms on the composite wing skins, wherein all of the composite stringer preforms in the first group of the composite stringer preforms are placed on a composite skin simultaneously.

30. A method of making composite wing panels for aircraft, comprising:
moving a plurality of mandrels through a plurality of workstations arranged serially along a production line including a lamination workstation;
laying up composite wing skins on the mandrels at the lamination workstation as the mandrels move through the lamination workstation; and
placing indexing features on the mandrels that index the mandrels to the lamination workstation.

31. A method of making a plurality of differently configured composite wing panels, comprising:
moving layup mandrels along a production line through a plurality of serially arranged workstations;
selecting configurations of composite wing panels to be made;
making wing skin preforms by laying up composite material on the layup mandrels based on the configurations as the layup mandrels move through a lamination workstation; and
placing composite stringer preforms on the wing skin preforms based on the selecting the configurations.

* * * * *